(12) United States Patent
Babaei

(10) Patent No.: US 11,902,882 B2
(45) Date of Patent: Feb. 13, 2024

(54) IDENTIFICATION OF A WIRELESS DEVICE WITH REDUCED CAPABILITIES

(71) Applicant: PanPsy Technologies, LLC, Fairfax, VA (US)

(72) Inventor: Alireza Babaei, Fairfax, VA (US)

(73) Assignee: PanPsy Technologies, LLC, Fairfax, VA (US)

( * ) Notice: Subject to any disclaimer, the term of this patent is extended or adjusted under 35 U.S.C. 154(b) by 0 days.

(21) Appl. No.: 17/981,565

(22) Filed: Nov. 7, 2022

(65) Prior Publication Data

US 2023/0059092 A1    Feb. 23, 2023

Related U.S. Application Data

(63) Continuation of application No. 17/713,669, filed on Apr. 5, 2022, now Pat. No. 11,516,730, which is a continuation of application No. 17/352,460, filed on Jun. 21, 2021, now Pat. No. 11,330,505, which is a continuation of application No. 17/153,768, filed on Jan. 20, 2021, now Pat. No. 11,076,344.

(60) Provisional application No. 62/963,484, filed on Jan. 20, 2020.

(51) Int. Cl.
*H04W 48/10* (2009.01)
*H04W 76/27* (2018.01)
*H04W 48/02* (2009.01)
*H04W 74/08* (2009.01)

(52) U.S. Cl.
CPC ........... *H04W 48/10* (2013.01); *H04W 48/02* (2013.01); *H04W 74/0833* (2013.01); *H04W 76/27* (2018.02)

(58) Field of Classification Search
None
See application file for complete search history.

(56) References Cited

U.S. PATENT DOCUMENTS

| 9,301,239 | B2 | 3/2016 | Jung et al. |
| 9,801,183 | B2 | 10/2017 | Young et al. |
| 10,142,914 | B2 | 11/2018 | Yang et al. |
| 10,159,110 | B2 | 12/2018 | Yamada et al. |
| 11,546,842 | B2 * | 1/2023 | Jang ....................... H04W 48/18 |

(Continued)

FOREIGN PATENT DOCUMENTS

| WO | 2011098992 A1 | 8/2011 |
| WO | 2019027291 A1 | 2/2019 |

(Continued)

OTHER PUBLICATIONS

3GPP TS 38.211 V16.0.0 (Dec. 2019); Technical Specification; 3rd Generation Partnership Project; Technical Specification Group Radio Access Network; NR; Physical channels and modulation; (Release 16).

(Continued)

*Primary Examiner* — Hong S Cho
(74) *Attorney, Agent, or Firm* — Alireza Babaei

(57) ABSTRACT

Systems, apparatuses, and methods are described for wireless communications. A wireless device may initiate a random access process comprising transmitting a transport block comprising data of a CCCH logical channel. The CCCH logical channel may be associated with an identifier indicating that the wireless device is a reduced capability wireless device.

20 Claims, 39 Drawing Sheets

(56) References Cited

U.S. PATENT DOCUMENTS

| | | | |
|---|---|---|---|
| 2011/0201307 A1 | 8/2011 | Segura | |
| 2017/0135024 A1 | 5/2017 | Burbidge et al. | |
| 2019/0045577 A1 | 2/2019 | Kim et al. | |
| 2019/0230585 A1 | 7/2019 | Chun | |
| 2019/0268852 A1* | 8/2019 | Ryu | H04W 74/0833 |
| 2019/0327661 A1 | 10/2019 | Li et al. | |
| 2022/0312530 A1* | 9/2022 | Turtinen | H04W 8/24 |

FOREIGN PATENT DOCUMENTS

| | | |
|---|---|---|
| WO | 2019142104 A1 | 7/2019 |
| WO | 2019194605 A1 | 10/2019 |

OTHER PUBLICATIONS

3GPP TS 38.212 V16.0.0 (Dec. 2019); Technical Specification; 3rd Generation Partnership Project; Technical Specification Group Radio Access Network; NR; Multiplexing and channel coding; (Release 16).

3GPP TS 38.213 V16.0.0 (Dec. 2019); Technical Specification; 3rd Generation Partnership Project; Technical Specification Group Radio Access Network; NR; Physical layer procedures for control; (Release 16).

3GPP TS 38.214 V16.0.0 (Dec. 2019); Technical Specification; 3rd Generation Partnership Project; Technical Specification Group Radio Access Network; NR; Physical layer procedures for data; (Release 16).

3GPP TS 38.300 V16.0.0 (Dec. 2019); Technical Specification; 3rd Generation Partnership Project; Technical Specification Group Radio Access Network; NR; NR and NG-RAN Overall Description; Stage 2; (Release 16).

3GPP TS 38.321 V15.8.0 (Dec. 2019); Technical Specification; 3rd Generation Partnership Project; Technical Specification Group Radio Access Network; NR; Medium Access Control (MAC) protocol specification; (Release 15).

3GPP TS 38.331 V15.8.0 (Dec. 2019); Technical Specification; 3rd Generation Partnership Project; Technical Specification Group Radio Access Network; NR; Radio Resource Control (RRC); Protocol specification; (Release 15 ).

3GPP TS 24.501 V16.3.0 (Dec. 2019); Technical Specification; 3rd Generation Partnership Project; Non-Access-Stratum (NAS) protocol for 5G System (5GS); Stage 3 (Release 16).

3GPP TS 38.304 V15.6.0 (Dec. 2019); 3rd Generation Partnership Project; Technical Specification Group Radio Access Network; NR; User Equipment (UE) procedures in Idle mode and RRC Inactive state (Release 15).

3GPP TS 22.261 V17.1.0 (Dec. 2019); 3rd Generation Partnership Project; Technical Specification Group Services and System Aspects; Service requirements for the 5G system; Stage 1 (Release 17).

3GPP TSG-RAN WG Meeting #86; RP-192539; Sitges, Spain, Dec. 9-12, 2019; Vivo; Views on NR light in Rel-17.

3GPP TSG RAN Meeting #86; RP-192568; Sitges, Spain, Dec. 9-12, 2019; Source: ZTE, Sanechips; Title: Discussion on NR Light for Rel-17; Agenda item: 9.1.1; Document for: Discussion.

3GPP TSG RAN Meeting #86; RP-192695; Sitges, Spain, Dec. 9-12, 2019; Agenda Item: 9.1.1; Source: Apple; Title: R17 enhancement for wearables; Document for: Discussion/Decision.

3GPP TSG RAN Meeting #86; RP-192788; Sitges, Spain, Dec. 9-12, 2019; Agenda Item: 9.1.1; Source: Huawei, HiSilicon; Title: Key points on NR Light SID; Document for: Discussion.

3GPP TSG RAN #86; RP-192836; Sitges, Spain, Dec. 9-12, 2019; Title: Smart-Home support by NR-Light; Source: TCL Communication, Lenovo, Motorola Mobility, Xiaomi; Agenda: 9.1.1; For: Discussion.

3GPP TSG RAN WG Meeting #86; RP-192859; Sitges, Spain, Dec. 9-12, 2019; Views on NR-Light in Rel-17; CATT; Document for: Discussion; Agenda Item: 9.1.1.

3GPP TSG RAN#86; RP-192956; Sitges, Spain, Dec. 9-12, 2019; Title: Path forward for NR Light; Source: Vodafone; Agenda: 9.1.1; For: Discussion.

3GPP RAN#86; RP-193101; Dec. 9-12, 2019; Sitges, Spain; Agenda Item 9.1.1; On the scope of NR-Light, Qualcomm.

3GPP TSG RAN Meeting #86; RP-193238; Sitges, Spain, Dec. 9-12, 2019; Source: Ericsson; Title: New SID on support of reduced capability NR devices; Document for: Information; Agenda Item: 9.1.1.

* cited by examiner

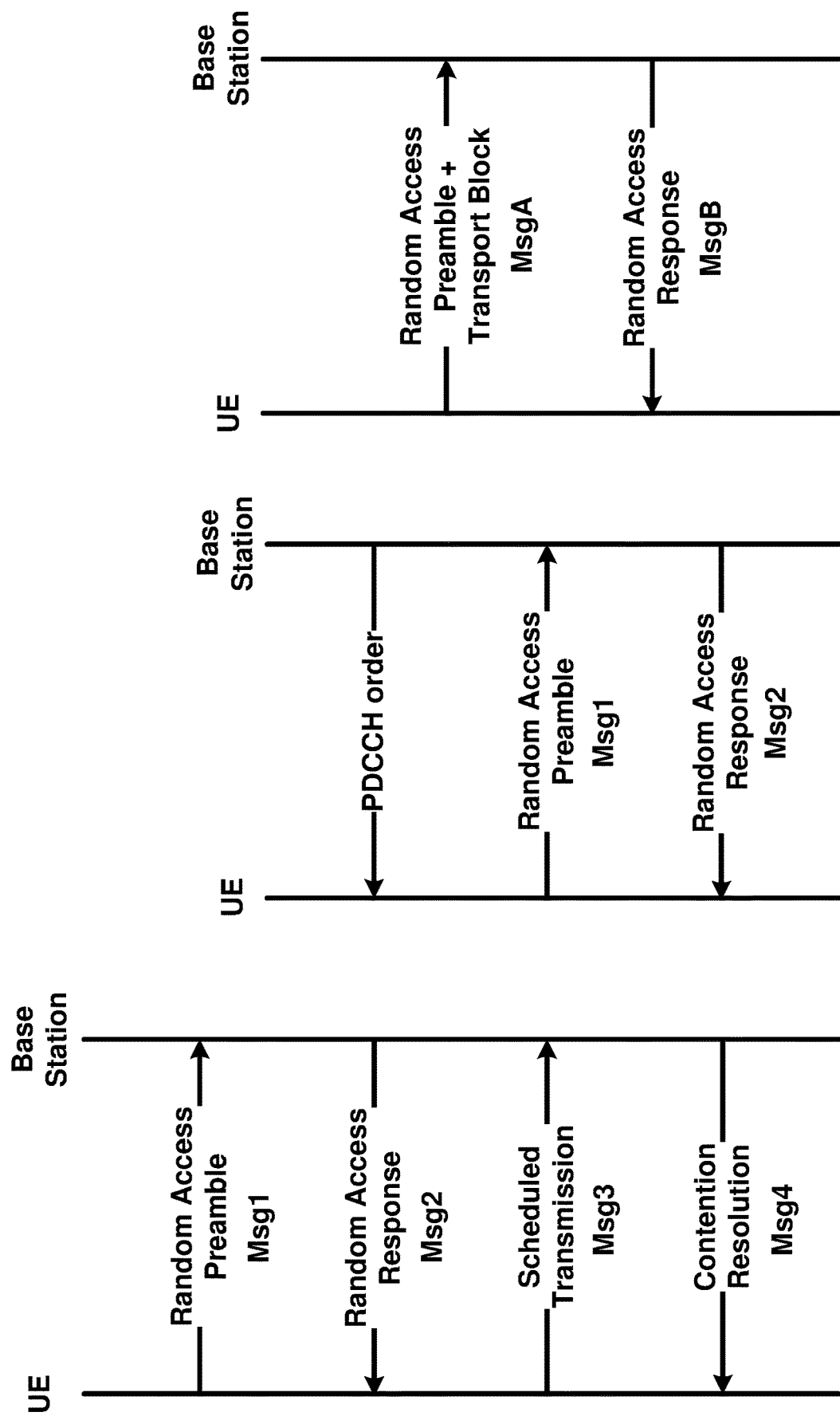

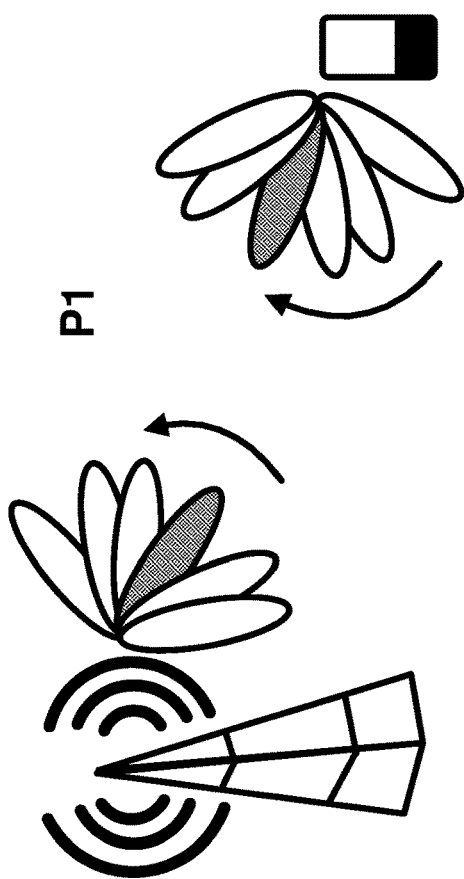
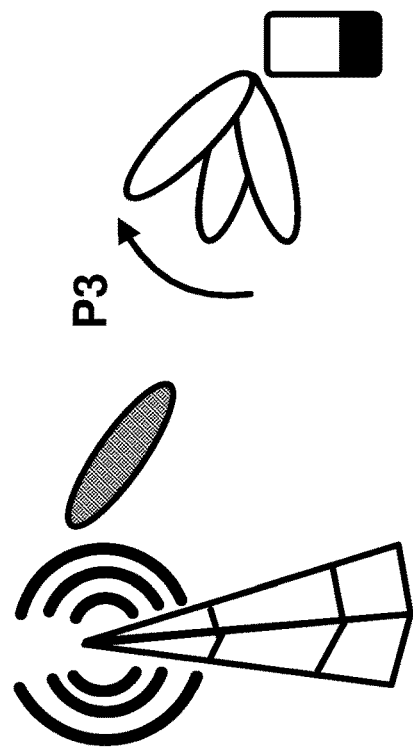
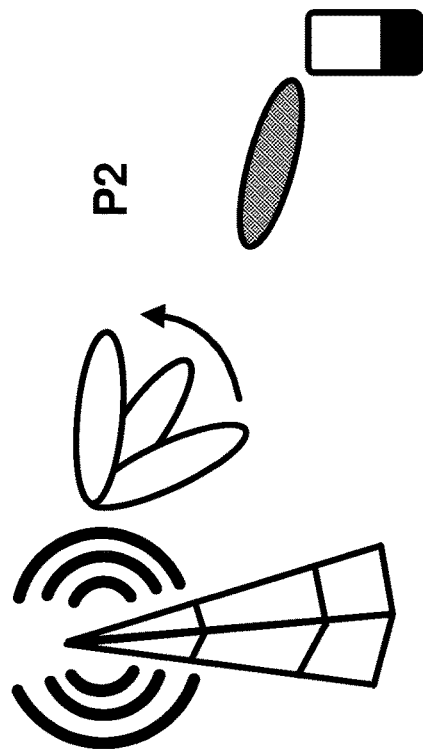
FIG. 14A
FIG. 14B
FIG. 14C

| Access Identity number | UE configuration |
|---|---|
| 0 | UE is not configured with any parameters from this table |
| 1 (NOTE 1) | UE is configured for Multimedia Priority Service (MPS). |
| 2 (NOTE 2) | UE is configured for Mission Critical Service (MCS). |
| 3 | UE for which Disaster Condition applies (note 4) |
| 3-10 | Reserved for future use |
| 11 (NOTE 3) | Access Class 11 is configured in the UE. |
| 12 (NOTE 3) | Access Class 12 is configured in the UE. |
| 13 (NOTE 3) | Access Class 13 is configured in the UE. |
| 14 (NOTE 3) | Access Class 14 is configured in the UE. |
| 15 (NOTE 3) | Access Class 15 is configured in the UE. |

NOTE 1: Access Identity 1 may be used by UEs configured for MPS, in the PLMNs where the configuration is valid. The PLMNs where the configuration is valid may be HPLMN, PLMNs equivalent to HPLMN, and visited PLMNs of the home country.
Access Identity 1 may be valid when the UE is explicitly authorized by the network based on specific configured PLMNs inside and outside the home country.

NOTE 2: Access Identity 2 may be used by UEs configured for MCS, in the PLMNs where the configuration is valid. The PLMNs where the configuration is valid may be HPLMN or PLMNs equivalent to HPLMN and visited PLMNs of the home country. Access Identity 2 may be valid when the UE is explicitly authorized by the network based on specific configured PLMNs inside and outside the home country.

NOTE 3: Access Identities 11 and 15 may be valid in Home PLMN only if the EHPLMN list is not present or in any EHPLMN. Access Identities 12, 13 and 14 are valid in Home PLMN and visited PLMNs of home country only. For this purpose, the home country may be defined as the country of the MCC part of the IMSI.

NOTE 4: The configuration may be valid for PLMNs that indicate to potential Disaster Inbound Roamers that the UEs can access the PLMN.

FIG. 17

| Access Category number | Conditions related to UE | Type of access attempt |
|---|---|---|
| 0 | All | MO signalling resulting from paging |
| 1 (NOTE 1) | UE is configured for delay tolerant service and subject to access control for Access Category 1, which is judged based on relation of UE's HPLMN and the selected PLMN. | All except for Emergency, or MO exception data |
| 2 | All | Emergency |
| 3 | All except for the conditions in Access Category 1. | MO signalling on NAS level resulting from other than paging |
| 4 | All except for the conditions in Access Category 1. | MMTEL voice (NOTE 3) |
| 5 | All except for the conditions in Access Category 1. | MMTEL video |
| 6 | All except for the conditions in Access Category 1. | SMS |
| 7 | All except for the conditions in Access Category 1. | MO data that do not belong to any other Access Categories (NOTE 4) |
| 8 | All except for the conditions in Access Category 1 | MO signalling on RRC level resulting from other than paging |
| 9 | All except for the conditions in Access Category 1 | MO IMS registration related signalling (NOTE 5) |
| 10 (NOTE 6) | All | MO exception data |
| 11-31 | | Reserved standardized Access Categories |
| 32-63 (NOTE 2) | All | Based on operator classification |

NOTE 1: The barring parameter for Access Category 1 may be accompanied with information that define whether Access Category applies to UEs within one or more categories comprising:
a) UEs that are configured for delay tolerant service;
b) UEs that are configured for delay tolerant service and are neither in their HPLMN nor in a PLMN that is equivalent to it;
c) UEs that are configured for delay tolerant service and are neither in the PLMN listed as most preferred PLMN of the country where the UE is roaming in the operator-defined PLMN selector list on the SIM/USIM, nor in their HPLMN nor in a PLMN that is equivalent to their HPLMN.
When a UE is configured for EAB, the UE may be configured for delay tolerant service. In case a UE is configured both for EAB and for EAB override, when upper layer indicates to override Access Category 1, then Access Category 1 may not be applicable.

NOTE 2: When there are an Access Category based on operator classification and a standardized Access Category to both of which an access attempt can be categorized, and the standardized Access Category may neither be 0 nor 2, the UE may apply the Access Category based on operator classification. When there are an Access Category based on operator classification and a standardized Access Category to both of which an access attempt can be categorized, and the standardized Access Category is 0 or 2, the UE may apply the standardized Access Category.

NOTE 3: May includes Real-Time Text (RTT).
NOTE 4: May includes IMS Messaging.
NOTE 5: May include IMS registration related signalling, e.g. IMS initial registration, re-registration, and subscription refresh.
NOTE 6: May apply to an NB-IoT UE, using NB-IOT connectivity to 5GC.

FIG. 18

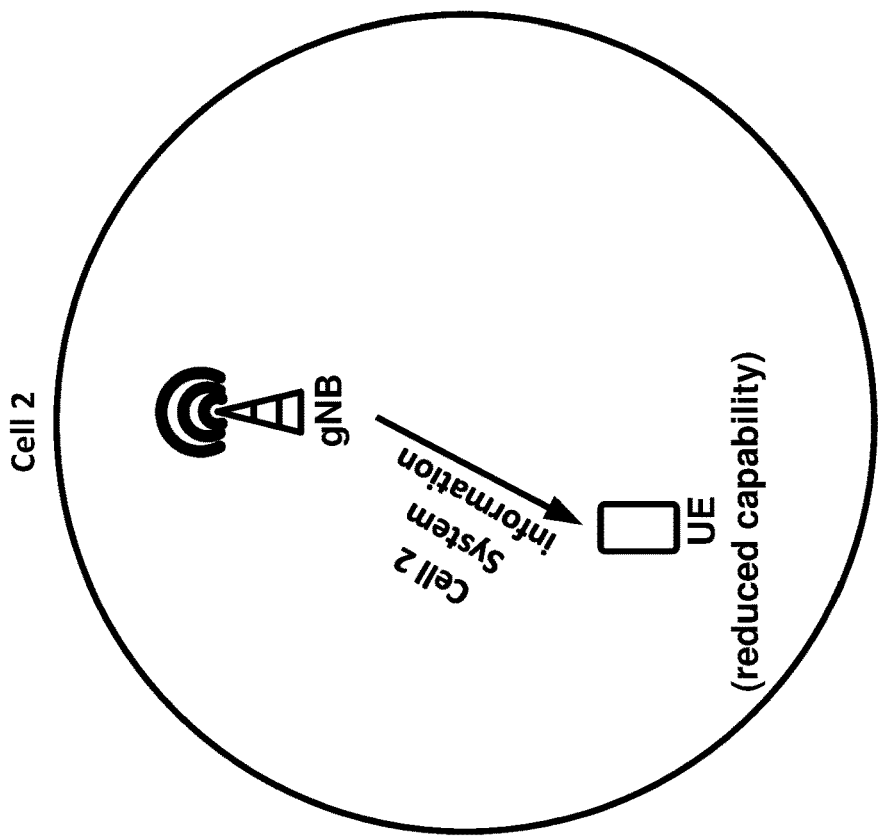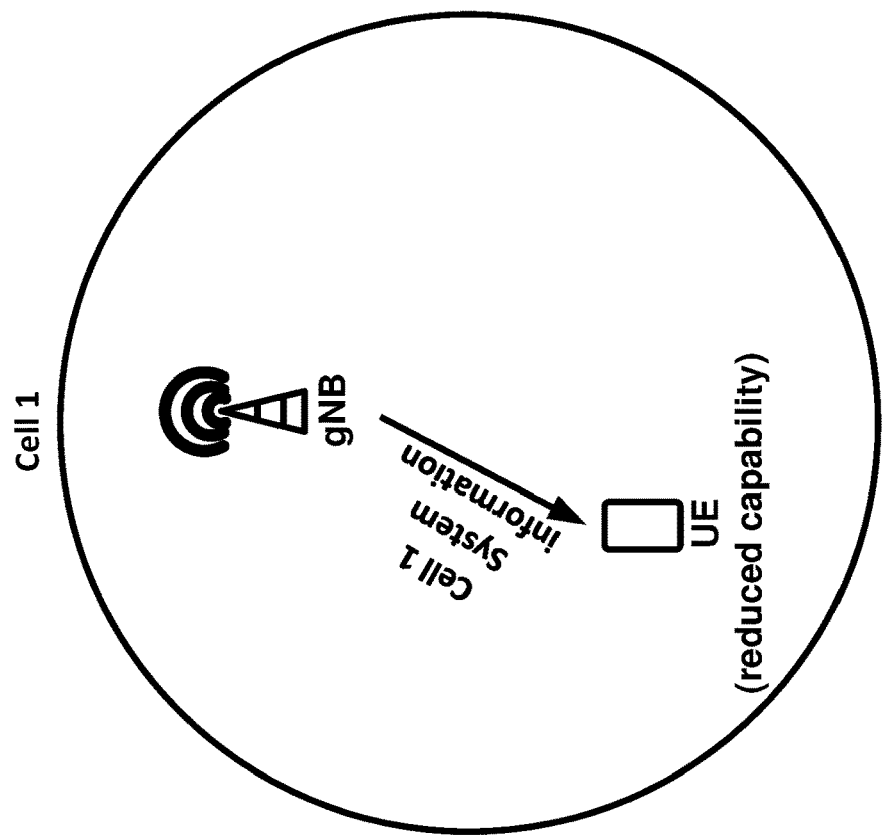
FIG. 20B

```
MIB ::=     SEQUENCE {
systemFrameNumber           BIT STRING (SIZE (6)),
subCarrierSpacingCommon     ENUMERATED {scs15or60, scs30or120},
ssb-SubcarrierOffset        INTEGER (0..15),
dmrs-TypeA-Position         ENUMERATED {pos2, pos3},
pdcch-ConfigSIB1            PDCCH-ConfigSIB1,
cellBarred                  ENUMERATED {barred, 1stTypeBarred, notBarred},
intraFreqReselection        ENUMERATED {allowed, notAlowed},
spare                       BIT STRING (SIZE (1))
}
```

FIG. 23

```
SIB1 ::=        SEQUENCE {
    ...
    uac-BarringInfo                              SEQUENCE {
        uac-BarringForCommon                         UAC-BarringPerCatList
        uac-BarringPerPLMN-List                      UAC-BarringPerPLMN-List
        uac-BarringInfoSetList                       UAC-BarringInfoSetList,
        uac-AccessCategory1-SelectionAssistanceInfo CHOICE {
            plmnCommon                                   UAC-AccessCategory1-SelectionAssistanceInfo,
            individualPLMNList                           SEQUENCE (SIZE (2..maxPLMN)) OF UAC-
AccessCategory1-SelectionAssistanceInfo
        }
    }
    ...
}
```

FIG. 24

```
MIB ::=                    SEQUENCE {
  systemFrameNumber           BIT STRING (SIZE (6)),
  subCarrierSpacingCommon     ENUMERATED {scs15or60, scs30or120},
  ssb-SubcarrierOffset        INTEGER (0..15),
  dmrs-TypeA-Position         ENUMERATED {pos2, pos3},
  pdcch-ConfigSIB1            PDCCH-ConfigSIB1,
  pdcch-ConfigSIB1FirstType   PDCCH-ConfigSIB1,
  cellBarred                  ENUMERATED {barred, notBarred},
  intraFreqReselection        ENUMERATED {allowed, notAlowed},
  spare                       BIT STRING (SIZE (1))
}
```

FIG. 27

```
SIB1 ::=         SEQUENCE {
    ...
    servingCellConfigCommon              ServingCellConfigCommonSIB
    servingCellConfigCommonFirstType     ServingCellConfigCommonSIB
    ...
}
```

FIG. 28

Receive message(s) comprising 1st access barring parameter(s) associated with at least one of a 1st access category and a 1st access identity The at least one of the 1st access category and the 1st access identity is associated with a wireless device with reduced capability The 1st access barring parameter(s) are used in an access control procedure

3710

Perform a 1st access barring check based on the 1st access barring parameter(s) and based on the access control procedure

3720

Determine whether an access attempt is barred or allowed based on the access barring check

IDENTIFICATION OF A WIRELESS DEVICE WITH REDUCED CAPABILITIES

CROSS-REFERENCE TO RELATED APPLICATIONS

This application is a continuation of U.S. application Ser. No. 17/713,669, filed Apr. 5, 2022, which is a continuation of U.S. application Ser. No. 17/352,460, filed Jun. 21, 2021, which is a continuation of U.S. patent application Ser. No. 17/153,768, filed Jan. 20, 2021, which claims the benefit of U.S. Provisional Application No. 62/963,484, filed Jan. 20, 2020, which is hereby incorporated by reference in its entirety.

BRIEF DESCRIPTION OF THE DRAWINGS

FIG. 12A, FIG. 12B and FIG. 12C show example random access processes in accordance with several of various embodiments of the present disclosure.

FIG. 14A, FIG. 14B and FIG. 14C show example beam management processes in accordance with several of various embodiments of the present disclosure.

FIG. 17 shows example access identities in accordance with several of various embodiments of the present disclosure.

FIG. 18 shows example access categories in accordance with several of various embodiments of the present disclosure.

FIG. 20B shows example system information transmission in accordance with several of various embodiments of the present disclosure.

FIG. 23 shows an example Master Information Block (MIB) in accordance with several of various embodiments of the present disclosure.

FIG. 24 shows example information elements in System Information Block 1 (SIB1) in accordance with several of various embodiments of the present disclosure.

FIG. 27 shows an example MIB in accordance with several of various embodiments of the present disclosure.

FIG. 28 shows example information elements in SIB1 in accordance with several of various embodiments of the present disclosure.

FIG. 37 shows an example flow diagram in accordance with several of various embodiments of the present disclosure.

DETAILED DESCRIPTION

The exemplary embodiments of the disclosed technology enable operation of a wireless device, including a wireless device with reduced capability, and/or one or more base stations. The exemplary disclosed embodiments may be implemented in the technical field of wireless communication systems. More particularly, the embodiment of the disclosed technology may enable access control for a wireless device.

Figure 1A:
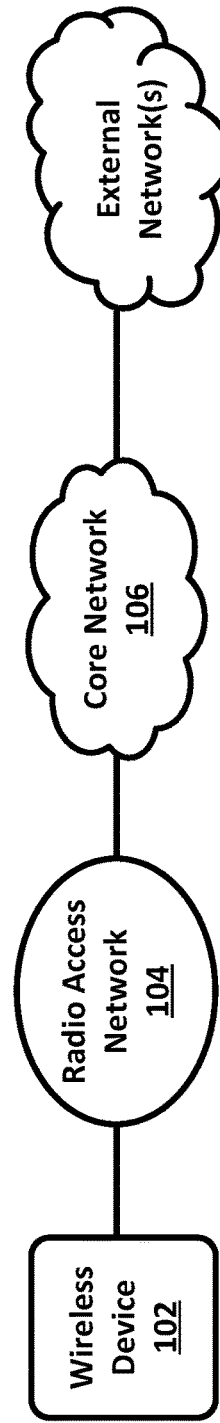
FIG. 1A and FIG. 1B show examples of mobile communications systems in accordance with several of various embodiments of the present disclosure.

The devices and/or nodes of the mobile communications system disclosed herein may be implemented based on various technologies and/or various releases/versions/ amendments of a technology. The various technologies include various releases of long-term evolution (LTE) technologies, various releases of 5G new radio (NR) technologies, various wireless local area networks technologies and/ or a combination thereof and/or alike. For example, a base station may support a given technology and may communicate with wireless devices with different characteristics. The wireless devices may have different categories that define their capabilities in terms of supporting various features. The wireless device with the same category may have different capabilities. The wireless devices may support various technologies such as various releases of LTE technologies, various releases of 5G NR technologies and/or a combination thereof and/or alike. At least some of the wireless devices in the mobile communications system of the present disclosure may be stationary or almost stationary. In this disclosure, the terms "mobile communications system" and "wireless communications system" may be used interchangeably. FIG. 1A shows an example of a mobile communications system 100 in accordance with several of various embodiments of the present disclosure. The mobile communications system 100 may be, for example, run by a mobile network operator (MNO) or a mobile virtual network operator (MVNO). The mobile communications system 100 may be a public land mobile network (PLMN) run by a network operator providing a variety of service including voice, data, short messaging service (SMS), multimedia messaging service (MMS), emergency calls, etc. The mobile communications system 100 includes a core network (CN) 106, a radio access network (RAN) 104 and at least one wireless device 102.

The CN 106 connects the RAN 104 to one or more external networks (e.g., one or more data networks such as the Internet) and is responsible for functions such as authentication, charging and end-to-end connection establishment. Several radio access technologies (RATs) may be served by the same CN 106.

The RAN 104 may implement a RAT and may operate between the at least one wireless device 102 and the CN 106. The RAN 104 may handle radio related functionalities such as scheduling, radio resource control, modulation and coding, multi-antenna transmissions and retransmission protocols. The wireless device and the RAN may share a portion of the radio spectrum by separating transmissions from the wireless device to the RAN and the transmissions from the RAN to the wireless device. The direction of the transmissions from the wireless device to the RAN is known as the uplink and the direction of the transmissions from the RAN to the wireless device is known as the downlink. The separation of uplink and downlink transmissions may be achieved by employing a duplexing technique. Example duplexing techniques include frequency division duplexing (FDD), time division duplexing (TDD) or a combination of FDD and TDD.

In this disclosure, the term wireless device may refer to a device that communicates with a network entity or another device using wireless communication techniques. The wireless device may be a mobile device or a non-mobile (e.g., fixed) device. Examples of the wireless device include cellular phone, smart phone, tablet, laptop computer, wearable device (e.g., smart watch, smart shoe, fitness trackers, smart clothing, etc.), wireless sensor, wireless meter, extended reality (XR) devices including augmented reality (AR) and virtual reality (VR) devices, Internet of Things (IoT) device, vehicle to vehicle communications device, road-side units (RSU), automobile, relay node or any combination thereof. In some examples, the wireless device (e.g., a smart phone, tablet, etc.) may have an interface (e.g., a graphical user interface (GUI)) for configuration by an end user. In some examples, the wireless device (e.g., a wireless sensor device, etc.) may not have an interface for configuration by an end user. The wireless device may be referred to as a user equipment (UE), a mobile station (MS), a subscriber unit, a handset, an access terminal, a user terminal, a wireless transmit and receive unit (WTRU) and/or other terminology.

The at least one wireless device may communicate with at least one base station in the RAN 104. In this disclosure, the term base station may encompass terminologies associated with various RATs. For example, a base station may be referred to as a Node B in a 3G cellular system such as Universal Mobile Telecommunication Systems (UMTS), an evolved Node B (eNB) in a 4G cellular system such as evolved universal terrestrial radio access (E-UTRA), a next generation eNB (ng-eNB), a Next Generation Node B (gNB) in NR and/or a 5G system, an access point (AP) in Wi-Fi and/or other wireless local area networks. A base station may be referred to as a remote radio head (RRH), a baseband unit (BBU) in connection with one or more RRHs, a repeater or relay for coverage extension and/or any combination thereof. In some examples, all protocol layers of a base station may be implemented in one unit. In some example, some of the protocol layers (e.g., upper layers) of the base station may be implemented in a first unit (e.g., a central unit (CU)) and some other protocol layer (e.g., lower layers) may be implemented in one or more second units (e.g., distributed units (DUs)).

A base station in the RAN 104 includes one or more antennas to communicate with the at least one wireless device. The base station may communicate with the at least one wireless device using radio frequency (RF) transmissions and receptions via RF transceivers. The base station antennas may control one or more cells (or sectors). The size and/or radio coverage area of a cell may depend on the range that transmissions by a wireless device can be successfully received by the base station when the wireless device transmits using the RF frequency of the cell. The base station may be associated with cells of various sizes. At a given location, the wireless device may be in coverage area of a first cell of the base station and may not be in coverage area of a second cell of the base station depending on the sizes of the first cell and the second cell.

A base station in the RAN 104 may have various implementations. For example, a base station may be implemented by connecting a BBU (or a BBU pool) coupled to one or more RRHs and/or one or more relay nodes to extend the cell coverage. The BBU pool may be located at a centralized site like a cloud or data center. The BBU pool may be connected to a plurality of RRHs that control a plurality of cells. The combination of BBU with the one or more RRHs may be referred to as a centralized or cloud RAN (C-RAN) architecture. In some implementations, the BBU functions may be implemented on virtual machines (VMs) on servers at a centralized location. This architecture may be referred to as virtual RAN (vRAN). All, most or a portion of the protocol layer functions (e.g., all or portions of physical layer, medium access control (MAC) layer and/or higher layers) may be implemented at the BBU pool and the processed data may be transmitted to the RRHs for further processing and/or RF transmission. The links between the BBU pool and the RRHs may be referred to as fronthaul.

In some deployment scenarios, the RAN 104 may include macrocell base stations with high transmission power levels and large coverage areas. In other deployment scenarios, the RAN 104 may include base stations that employ different transmission power levels and/or have cells with different coverage areas. For example, some base station may be macrocell base stations with high transmission powers and/ or large coverage areas and other base station may be small cell base stations with comparatively smaller transmission powers and/or coverage areas. In some deployment scenarios, a small cell base station may have coverage that is within or has overlap with coverage area of a macrocell base station. A wireless device may communicate with the macrocell base station while within the coverage area of the macrocell base station. For additional capacity, the wireless device may communicate with both the macrocell base station and the small cell base station while in the overlapped coverage area of the macrocell base station and the small cell base station. Depending on their coverage areas, a small cell base station may be referred to as a microcell base station, a picocell base station, a femtocell base station or a home base station.

Different standard development organizations (SDOs) have specified, or may specify in future, mobile communications systems that have similar characteristics as the mobile communications system 100 of FIG. 1A. For example, the Third-Generation Partnership Project (3GPP) is a group of SDOs that provides specifications that define 3GPP technologies for mobile communications systems that are akin to the mobile communications system 100. The 3GPP has developed specifications for third generation (3G) mobile networks, fourth generation (4G) mobile networks and fifth generation (5G) mobile networks. The 3G, 4G and 5G networks are also known as Universal Mobile Telecommunications System (UMTS), Long Term Evolution (LTE) and 5G system (5GS), respectively. In this disclosure, embodiments are described with respect to the RAN implemented in a 3GPP 5G mobile network that is also referred to as next generation RAN (NG-RAN). The embodiments may also be implemented in other mobile communications systems such as 3G or 4G mobile networks or mobile networks that may be standardized in future such as sixth generation (6G) mobile networks or mobile networks that are implemented by standards bodies other than 3GPP. The NG-RAN may be based on a new RAT known as new radio (NR) and/or other radio access technologies such as LTE and/or non-3GPP RATs.

Figure 1B:
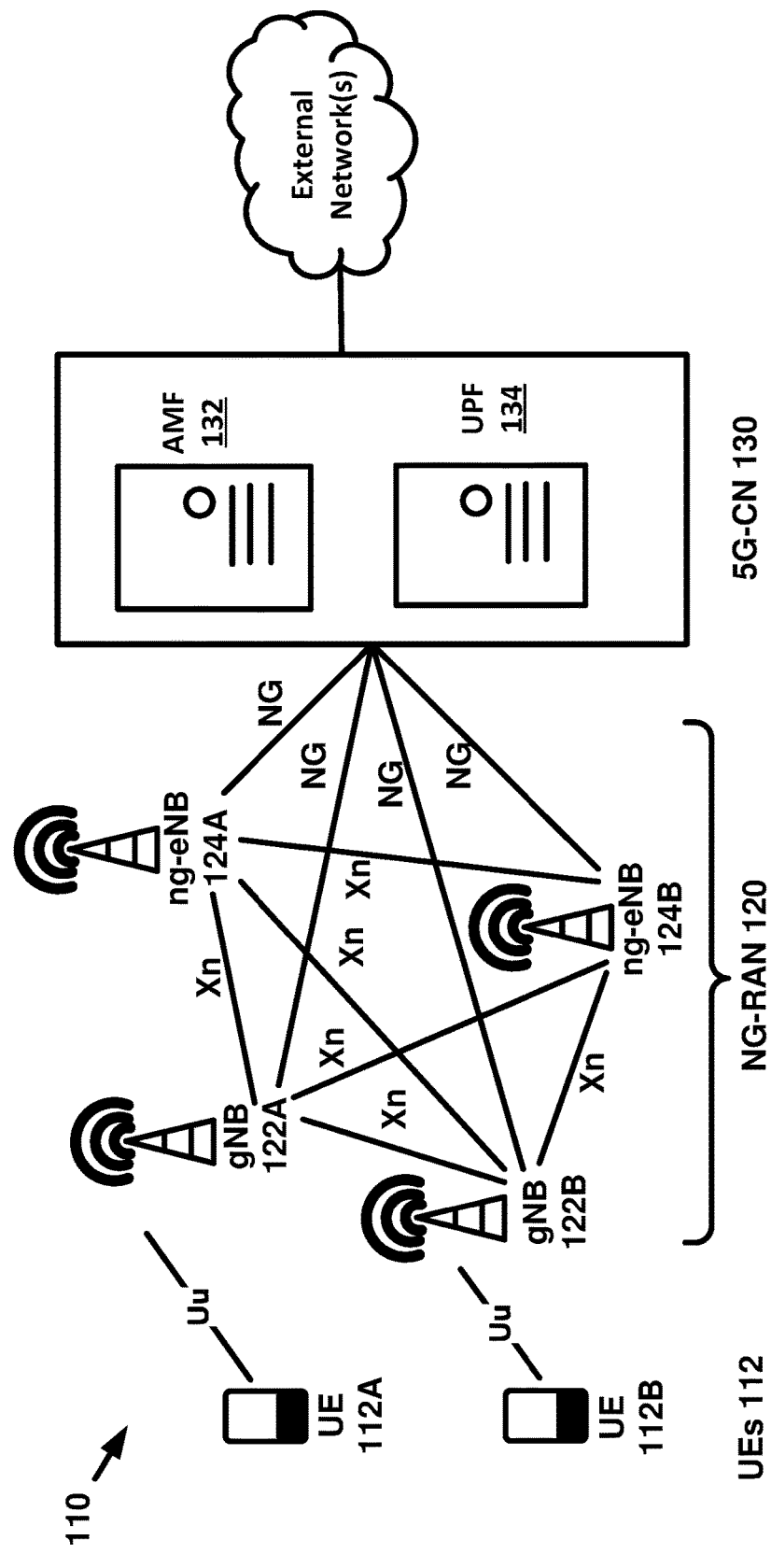

FIG. 1B shows an example of a mobile communications system 110 in accordance with several of various embodiments of the present disclosure. The mobile communications system 110 of FIG. 1B is an example of a 5G mobile network and includes a 5G CN (5G-CN) 130, an NG-RAN 120 and UEs (collectively 112 and individually UE 112A and UE 112B). The 5G-CN 130, the NG-RAN 120 and the UEs 112 of FIG. 1B operate substantially alike the CN 106, the RAN 104 and the at least one wireless device 102, respectively, as described for FIG. 1A.

The 5G-CN 130 of FIG. 1B connects the NG-RAN 120 to one or more external networks (e.g., one or more data networks such as the Internet) and is responsible for functions such as authentication, charging and end-to-end connection establishment. The 5G-CN has new enhancements compared to previous generations of CNs (e.g., evolved packet core (EPC) in the 4G networks) including service-based architecture, support for network slicing and control plane/user plane split. The service-based architecture of the 5G-CN provides a modular framework based on service and functionalities provided by the core network wherein a set of network functions are connected via service-based interfaces. The network slicing enables multiplexing of independent logical networks (e.g., network slices) on the same physical network infrastructure. For example, a network slice may be for mobile broadband applications with full mobility support and a different network slice may be for non-mobile latency-critical applications such as industry automation. The control plane/user plane split enables independent scaling of the control plane and the user plane. For example, the control plane capacity may be increased without affecting the user plane of the network.

The 5G-CN 130 of FIG. 1B includes an access and mobility management function (AMF) 132 and a user plane function (UPF) 134. The AMF 132 may support termination of non-access stratum (NAS) signaling, NAS signaling security such as ciphering and integrity protection, inter-3GPP access network mobility, registration management, connection management, mobility management, access authentication and authorization and security context management. The NAS is a functional layer between a UE and the CN and the access stratum (AS) is a functional layer between the UE and the RAN. The UPF 134 may serve as an interconnect point between the NG-RAN and an external data network. The UPF may support packet routing and forwarding, packet inspection and Quality of Service (QoS) handling and packet filtering. The UPF may further act as a Protocol Data Unit (PDU) session anchor point for mobility within and between RATs.

The 5G-CN 130 may include additional network functions (not shown in FIG. 1B) such as one or more Session Management Functions (SMFs), a Policy Control Function (PCF), a Network Exposure Function (NEF), a Unified Data Management (UDM), an Application Function (AF), and/or an Authentication Server Function (AUSF). These network functions along with the AMF 132 and UPF 134 enable a service-based architecture for the 5G-CN.

The NG-RAN 120 may operate between the UEs 112 and the 5G-CN 130 and may implement one or more RATs. The NG-RAN 120 may include one or more gNBs (e.g., gNB 122A or gNB 122B or collectively gNBs 122) and/or one or more ng-eNBs (e.g., ng-eNB 124A or ng-eNB 124B or collectively ng-eNB s 124). The general terminology for gNB s 122 and/or an ng-eNBs 124 is a base station and may be used interchangeably in this disclosure. The gNBs 122 and the ng-eNBs 124 may include one or more antennas to communicate with the UEs 112. The one or more antennas of the gNB s 122 or ng-eNBs 124 may control one or more cells (or sectors) that provide radio coverage for the UEs 112.

A gNB and/or an ng-eNB of FIG. 1B may be connected to the 5G-CN 130 using an NG interface. A gNB and/or an ng-eNB may be connected with other gNBs and/or ng-eNBs using an Xn interface. The NG or the Xn interfaces are logical connections that may be established using an underlying transport network. The interface between a UE and a gNB or between a UE and an ng-eNBs may be referred to as the Uu interface. An interface (e.g., Uu, NG or Xn) may be established by using a protocol stack that enables data and control signaling exchange between entities in the mobile communications system of FIG. 1B. When a protocol stack is used for transmission of user data, the protocol stack may be referred to as user plane protocol stack. When a protocol stack is used for transmission of control signaling, the protocol stack may be referred to as control plane protocol stack. Some protocol layer may be used in both of the user plane protocol stack and the control plane protocol stack while other protocol layers may be specific to the user plane or control plane.

The NG interface of FIG. 1B may include an NG-User plane (NG-U) interface between a gNB and the UPF 134 (or an ng-eNB and the UPF 134) and an NG-Control plane (NG-C) interface between a gNB and the AMF 132 (or an ng-eNB and the AMF 132). The NG-U interface may provide non-guaranteed delivery of user plane PDUs between a gNB and the UPF or an ng-eNB and the UPF. The NG-C interface may provide services such as NG interface management, UE context management, UE mobility management, transport of NAS messages, paging, PDU session management, configuration transfer and/or warning message transmission.

The UEs 112 and a gNB may be connected using the Uu interface and using the NR user plane and control plane protocol stack. The UEs 112 and an ng-eNB may be connected using the Uu interface using the LTE user plane and control plane protocol stack.

In the example mobile communications system of FIG. 1B, a 5G-CN is connected to a RAN comprised of 4G LTE and/or 5G NR RATs. In other example mobile communications systems, a RAN based on the 5G NR RAT may be connected to a 4G CN (e.g., EPC). For example, earlier releases of 5G standards may support a non-standalone mode of operation where a NR based RAN is connected to the 4G EPC. In an example non-standalone mode, a UE may be connected to both a NR gNB and a 4G LTE eNB (e.g., a ng-eNB) and the control plane functionalities (such as initial access, paging and mobility) may be provided through the 4G LTE eNB. In a standalone of operation, the 5G NR gNB is connected to a 5G-CN and the user plane and the control plane functionalities are provided by the 5G NR gNB.

Figure 2A:
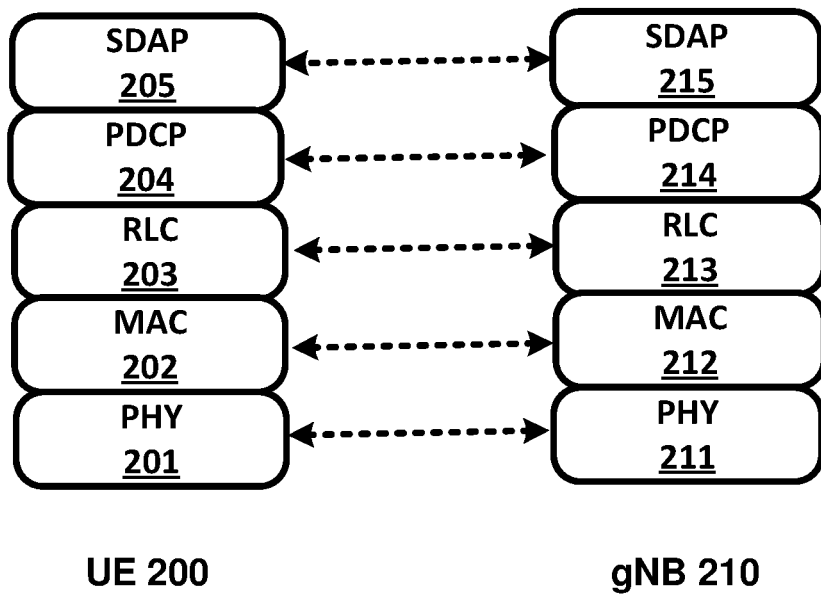
FIG. 2A and FIG. 2B show examples of user plane and control plane protocol layers in accordance with several of various embodiments of the present disclosure.

FIG. 2A shows an example of the protocol stack for the user plan of an NR Uu interface in accordance with several of various embodiments of the present disclosure. The user plane protocol stack comprises five protocol layers that terminate at the UE 200 and the gNB 210. The five protocol layers, as shown in FIG. 2A, include physical (PHY) layer referred to as PHY 201 at the UE 200 and PHY 211 at the gNB 210, medium access control (MAC) layer referred to as MAC 202 at the UE 200 and MAC 212 at the gNB 210, radio link control (RLC) layer referred to as RLC 203 at the UE 200 and RLC 213 at the gNB 210, packet data convergence protocol (PDCP) layer referred to as PDCP 204 at the UE 200 and PDCP 214 at the gNB 210, and service data application protocol (SDAP) layer referred to as SDAP 205 at the UE 200 and SDAP 215 at the gNB 210. The PHY layer, also known as layer 1 (L1), offers transport services to higher layers. The other four layers of the protocol stack (MAC, RLC, PDCP and SDAP) are collectively known as layer 2 (L2).

Figure 2B:
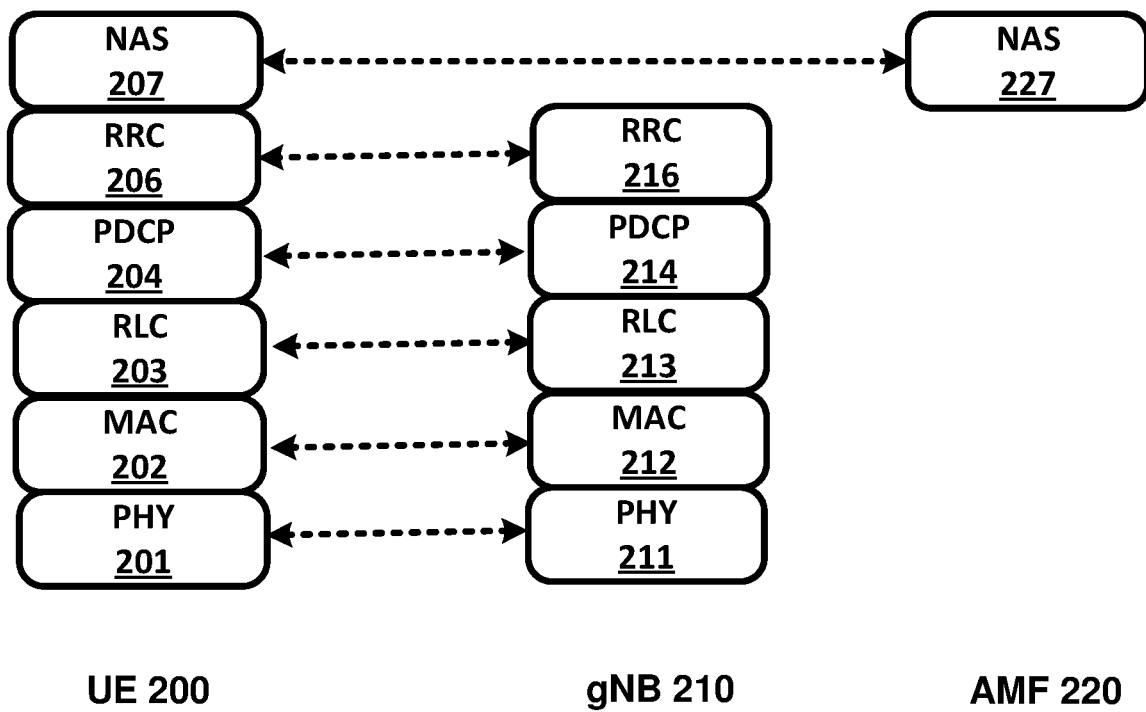

FIG. 2B shows an example of the protocol stack for the control plan of an NR Uu interface in accordance with several of various embodiments of the present disclosure. Some of the protocol layers (PHY, MAC, RLC and PDCP) are common between the user plane protocol stack shown in FIG. 2A and the control plan protocol stack. The control plane protocol stack also includes the RRC layer, referred to RRC 206 at the UE 200 and RRC 216 at the gNB 210, that also terminates at the UE 200 and the gNB 210. In addition, the control plane protocol stack includes the NAS layer that terminates at the UE 200 and the AMF 220. In FIG. 2B, the NAS layer is referred to as NAS 207 at the UE 200 and NAS 227 at the AMF 220.

Figure 3:
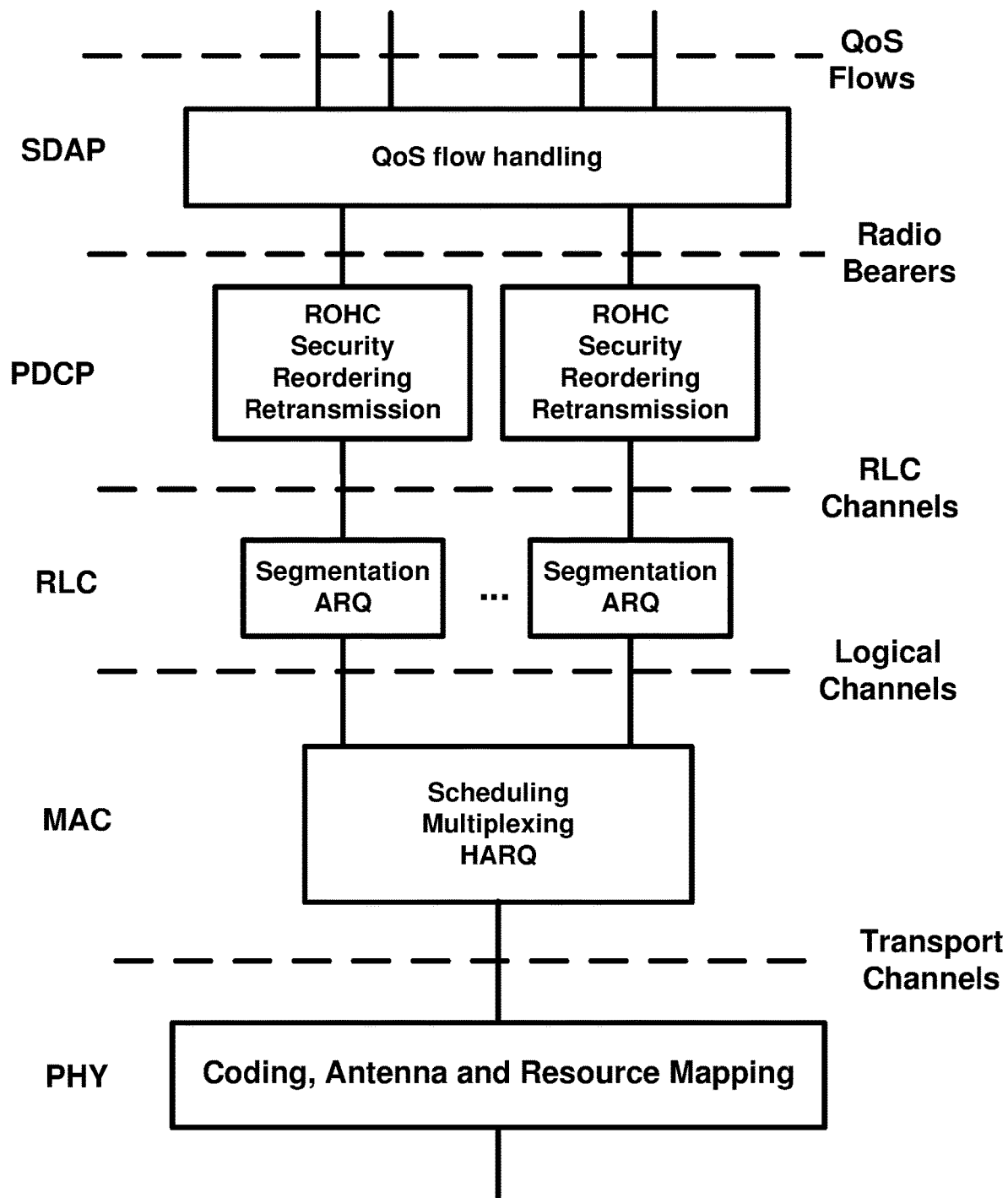
FIG. 3 shows example functions and services offered by protocol layers in a user plane protocol stack in accordance with several of various embodiments of the present disclosure.

FIG. 3 shows example functions and services offered to other layers by a layer in the NR user plane protocol stack of FIG. 2A in accordance with several of various embodiments of the present disclosure. For example, the SDAP layer of FIG. 3 (shown in FIG. 2A as SDAP 205 at the UE side and SDAP 215 at the gNB side) may perform mapping and de-mapping of QoS flows to data radio bearers. The mapping and de-mapping may be based on QoS (e.g., delay, throughput, jitter, error rate, etc.) associated with a QoS flow. A QoS flow may be a QoS differentiation granularity for a PDU session which is a logical connection between a UE 200 and a data network. A PDU session may contain one or more QoS flows. The functions and services of the SDAP layer include mapping and de-mapping between one or more QoS flows and one or more data radio bearers. The SDAP layer may also mark the uplink and/or downlink packets with a QoS flow ID (QFI).

The PDCP layer of FIG. 3 (shown in FIG. 2A as PDCP 204 at the UE side and PDCP 214 at the gNB side) may perform header compression and decompression (e.g., using Robust Header Compression (ROHC) protocol) to reduce the protocol header overhead, ciphering and deciphering and integrity protection and verification to enhance the security over the air interface, reordering and in-order delivery of packets and discarding of duplicate packets. A UE may be configured with one PDCP entity per bearer.

In an example scenario not shown in FIG. 3, a UE may be configured with dual connectivity and may connect to two different cell groups provided by two different base stations. For example, a base station of the two base stations may be referred to as a master base station and a cell group provided by the master base station may be referred to as a master cell group (MCG). The other base station of the two base stations may be referred to as a secondary base station and the cell group provided by the secondary base station may be referred to as a secondary cell group (SCG). A bearer may be configured for the UE as a split bearer that may be handled by the two different cell groups. The PDCP layer may perform routing of packets corresponding to a split bearer to and/or from RLC channels associated with the cell groups.

In an example scenario not shown in FIG. 3, a bearer of the UE may be configured (e.g., with control signaling) with PDCP packet duplication. A bearer configured with PDCP duplication may be mapped to a plurality of RLC channels each corresponding to different one or more cells. The PDCP layer may duplicate packets of the bearer configured with PDCP duplication and the duplicated packets may be mapped to the different RLC channels. With PDCP packet duplication, the likelihood of correct reception of packets increases thereby enabling higher reliability. The RLC layer of FIG. 3 (shown in FIG. 2A as RLC 203 at the UE side and RLC 213 at the gNB side) provides service to upper layers in the form of RLC channels. The RLC layer may include three transmission modes: transparent mode (TM), Unacknowledged mode (UM) and Acknowledged mode (AM). The RLC layer may perform error correction through automatic repeat request (ARQ) for the AM transmission mode, segmentation of RLC service data units (SDUs) for the AM and UM transmission modes and re-segmentation of RLC SDUs for AM transmission mode, duplicate detection for the AM transmission mode, RLC SDU discard for the AM and UM transmission modes, etc. The UE may be configured with one RLC entity per RLC channel.

The MAC layer of FIG. 3 (shown in FIG. 2A as MAC 202 at the UE side and MAC 212 at the gNB side) provides services to the RLC layer in form of logical channels. The MAC layer may perform mapping between logical channels and transport channels, multiplexing/demultiplexing of MAC SDUs belonging to one or more logical channels into/from transport blocks (TB s) delivered to/from the physical layer on transport channels, reporting of scheduling information, error correction through hybrid automatic repeat request (HARQ), priority handling between UEs by means of dynamic scheduling, priority handling between logical channels of one UE by means of logical channel prioritization and/or padding. In case of carrier aggregation, a MAC entity may comprise one HARQ entity per cell. A MAC entity may support multiple numerologies, transmission timings and cells. The control signaling may configure logical channels with mapping restrictions. The mapping restrictions in logical channel prioritization may control the numerology(ies), cell(s), and/or transmission timing(s)/duration(s) that a logical channel may use.

The PHY layer of FIG. 3 (shown in FIG. 2A as PHY 201 at the UE side and PHY 211 at the gNB side) provides transport services to the MAC layer in form of transport channels. The physical layer may handle coding/decoding, HARQ soft combining, rate matching of a coded transport channel to physical channels, mapping of coded transport channels to physical channels, modulation and demodulation of physical channels, frequency and time synchronization, radio characteristics measurements and indication to higher layers, RF processing, and mapping to antennas and radio resources.

Figure 4:
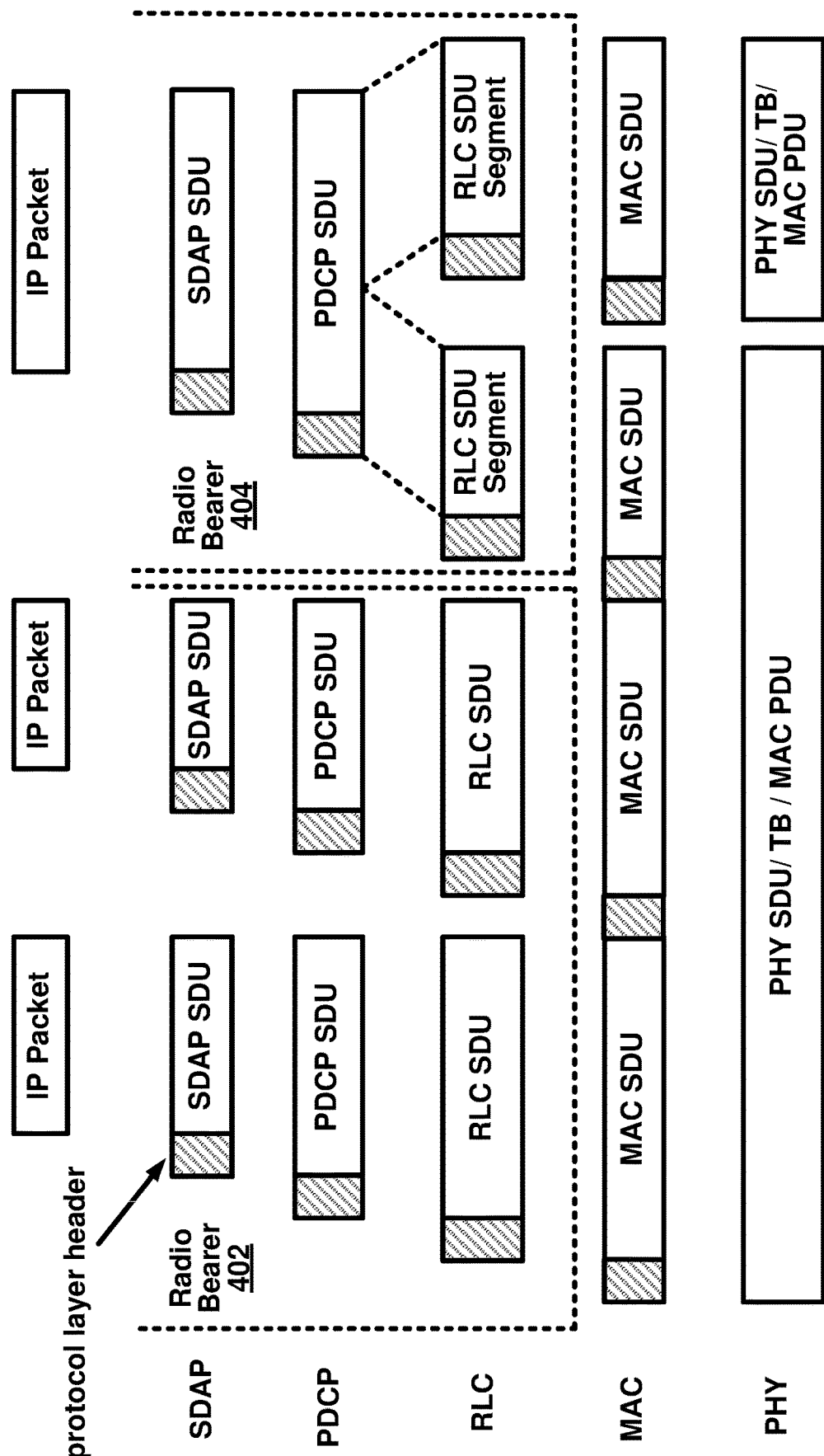
FIG. 4 shows example flow of packets through the protocol layers in accordance with several of various embodiments of the present disclosure.

FIG. 4 shows example processing of packets at different protocol layers in accordance with several of various embodiments of the present disclosure. In this example, three Internet Protocol (IP) packets that are processed by the different layers of the NR protocol stack. The term SDU shown in FIG. 4 is the data unit that is entered from/to a higher layer. In contrast, a protocol data unit (PDU) is the data unit that is entered to/from a lower layer. The flow of packets in FIG. 4 is for downlink. An uplink data flow through layers of the NR protocol stack is similar to FIG. 4. In this example, the two leftmost IP packets are mapped by the SDAP layer (shown as SDAP 205 and SDAP 215 in FIG. 2A) to radio bearer 402 and the rightmost packet is mapped by the SDAP layer to the radio bearer 404. The SDAP layer adds SDAP headers to the IP packets which are entered into the PDCP layer as PDCP SDUs. The PDCP layer is shown as PDCP 204 and PDCP 214 in FIG. 2A. The PDCP layer adds the PDCP headers to the PDCP SDUs which are entered into the RLC layer as RLC SDUs. The RLC layer is shown as RLC 203 and RLC 213 in FIG. 2A. An RLC SDU may be segmented at the RLC layer. The RLC layer adds RLC headers to the RLC SDUs after segmentation (if segmented) which are entered into the MAC layer as MAC SDUs. The MAC layer adds the MAC headers to the MAC SDUs and multiplexes one or more MAC SDUs to form a PHY SDU (also referred to as a transport block (TB) or a MAC PDU).

In FIG. 4, the MAC SDUs are multiplexed to form a transport block. The MAC layer may multiplex one or more MAC control elements (MAC CEs) with zero or more MAC SDUs to form a transport block. The MAC CEs may also be referred to as MAC commands or MAC layer control signaling and may be used for in-band control signaling. The MAC CEs may be transmitted by a base station to a UE (e.g., downlink MAC CEs) or by a UE to a base station (e.g., uplink MAC CEs). The MAC CEs may be used for transmission of information useful by a gNB for scheduling (e.g., buffer status report (BSR) or power headroom report (PHR)), activation/deactivation of one or more cells, activation/deactivation of configured radio resources for or one or more processes, activation/deactivation of one or more processes, indication of parameters used in one or more processes, etc.

Figure 5A:
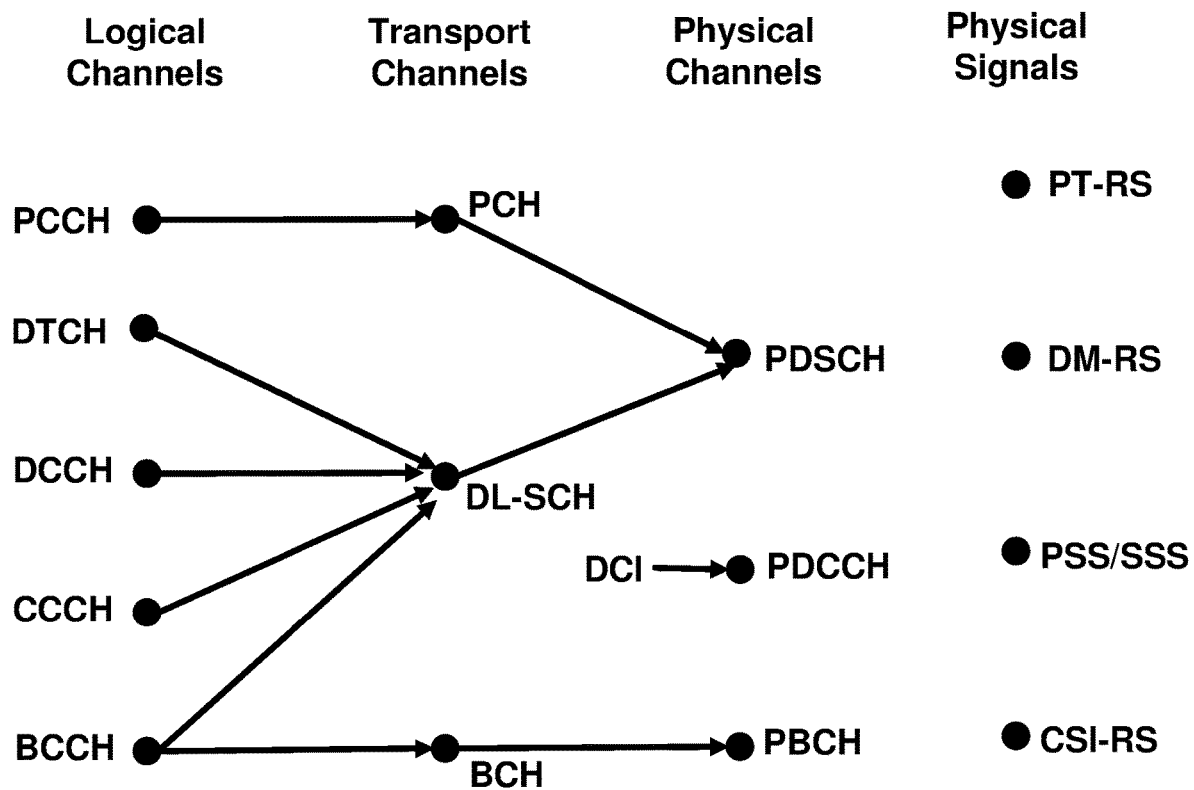
FIG. 5A shows example mapping of channels between layers of the protocol stack and different physical signals in downlink in accordance with several of various embodiments of the present disclosure.
Figure 5B:
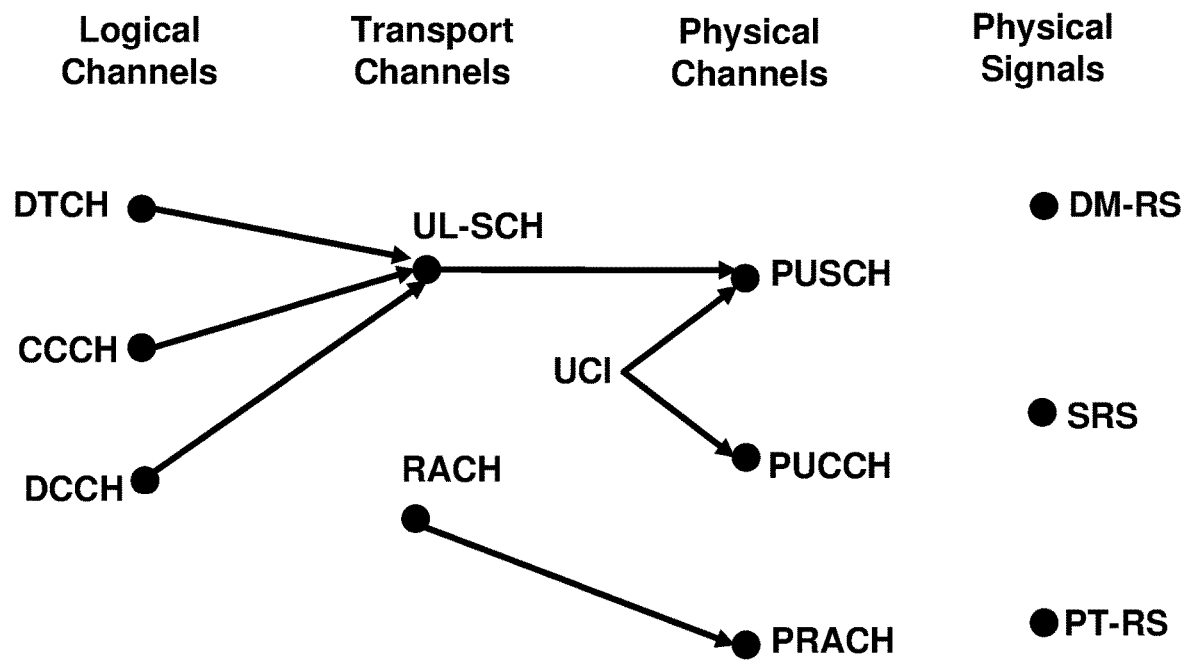
FIG. 5B shows example mapping of channels between layers of the protocol stack and different physical signals in uplink in accordance with several of various embodiments of the present disclosure.

FIG. 5A and FIG. 5B show example mapping between logical channels, transport channels and physical channels for downlink and uplink, respectively in accordance with several of various embodiments of the present disclosure. As discussed before, the MAC layer provides services to higher layer in the form of logical channels. A logical channel may be classified as a control channel, if used for transmission of control and/or configuration information, or a traffic channel if used for transmission of user data. Example logical channels in NR include Broadcast Control Channel (BCCH) used for transmission of broadcast system control information, Paging Control Channel (PCCH) used for carrying paging messages for wireless devices with unknown locations, Common Control Channel (CCCH) used for transmission of control information between UEs and network and for UEs that have no RRC connection with the network, Dedicated Control Channel (DCCH) which is a point-to-point bi-directional channel for transmission of dedicated control information between a UE that has an RRC connection and the network and Dedicated Traffic Channel (DTCH) which is point-to-point channel, dedicated to one UE, for the transfer of user information and may exist in both uplink and downlink.

As discussed before, the PHY layer provides services to the MAC layer and higher layers in the form of transport channels. Example transport channels in NR include Broadcast Channel (BCH) used for transmission of part of the BCCH referred to as master information block (MIB), Downlink Shared Channel (DL-SCH) used for transmission of data (e.g., from DTCH in downlink) and various control information (e.g., from DCCH and CCCH in downlink and part of the BCCH that is not mapped to the BCH), Uplink Shared Channel (UL-SCH) used for transmission of uplink data (e.g., from DTCH in uplink) and control information (e.g., from CCCH and DCCH in uplink) and Paging Channel (PCH) used for transmission of paging information from the PCCH. In addition, Random Access Channel (RACH) is a transport channel used for transmission of random access preambles. The RACH does not carry a transport block. Data on a transport channel (except RACH) may be organized in transport blocks, wherein One or more transport blocks may be transmitted in a transmission time interval (TTI).

The PHY layer may map the transport channels to physical channels. A physical channel may correspond to time-frequency resources that are used for transmission of information from one or more transport channels. In addition to mapping transport channels to physical channels, the physical layer may generate control information (e.g., downlink control information (DCI) or uplink control information (UCI)) that may be carried by the physical channels. Example DCI include scheduling information (e.g., downlink assignments and uplink grants), request for channel state information report, power control command, etc. Example UCI include HARQ feedback indicating correct or incorrect reception of downlink transport blocks, channel state information report, scheduling request, etc. Example physical channels in NR include a Physical Broadcast Channel (PBCH) for carrying information from the BCH, a Physical Downlink Shared Channel (PDSCH) for carrying information form the PCH and the DL-SCH, a Physical Downlink Control Channel (PDCCH) for carrying DCI, a Physical Uplink Shared Channel (PUSCH) for carrying information from the UL-SCH and/or UCI, a Physical Uplink Control Channel (PUCCH) for carrying UCI and Physical Random Access Channel (PRACH) for transmission of RACH (e.g., random access preamble).

The PHY layer may also generate physical signals that are not originated from higher layers. As shown in FIG. 5A, example downlink physical signals include Demodulation Reference Signal (DM-RS), Phase Tracking Reference Signal (PT-RS), Channel State Information Reference Signal (CSI-RS), Primary Synchronization Signal (PSS) and Secondary Synchronization Signal (SSS). As shown in FIG. 5B, example uplink physical signals include DM-RS, PT-RS and sounding reference signal (SRS).

As indicated earlier, some of the protocol layers (PHY, MAC, RLC and PDCP) of the control plane of an NR Uu interface, are common between the user plane protocol stack (as shown in FIG. 2A) and the control plane protocol stack (as shown in FIG. 2B). In addition to PHY, MAC, RLC and PDCP, the control plane protocol stack includes the RRC protocol layer and the NAS protocol layer.

The NAS layer, as shown in FIG. 2B, terminates at the UE 200 and the AMF 220 entity of the 5G-C 130. The NAS layer is used for core network related functions and signaling including registration, authentication, location update and session management. The NAS layer uses services from the AS of the Uu interface to transmit the NAS messages.

The RRC layer, as shown in FIG. 2B, operates between the UE 200 and the gNB 210 (more generally NG-RAN 120) and may provide services and functions such as broadcast of system information (SI) related to AS and NAS as well as paging initiated by the 5G-C 130 or NG-RAN 120. In addition, the RRC layer is responsible for establishment, maintenance and release of an RRC connection between the UE 200 and the NG-RAN 120, carrier aggregation configuration (e.g., addition, modification and release), dual connectivity configuration (e.g., addition, modification and release), security related functions, radio bearer configuration/maintenance and release, mobility management (e.g., maintenance and context transfer), UE cell selection and reselection, inter-RAT mobility, QoS management functions, UE measurement reporting and control, radio link failure (RLF) detection and NAS message transfer. The RRC layer uses services from PHY, MAC, RLC and PDCP layers to transmit RRC messages using signaling radio bearers (SRBs). The SRBs are mapped to CCCH logical channel during connection establishment and to DCCH logical channel after connection establishment.

Figure 6:
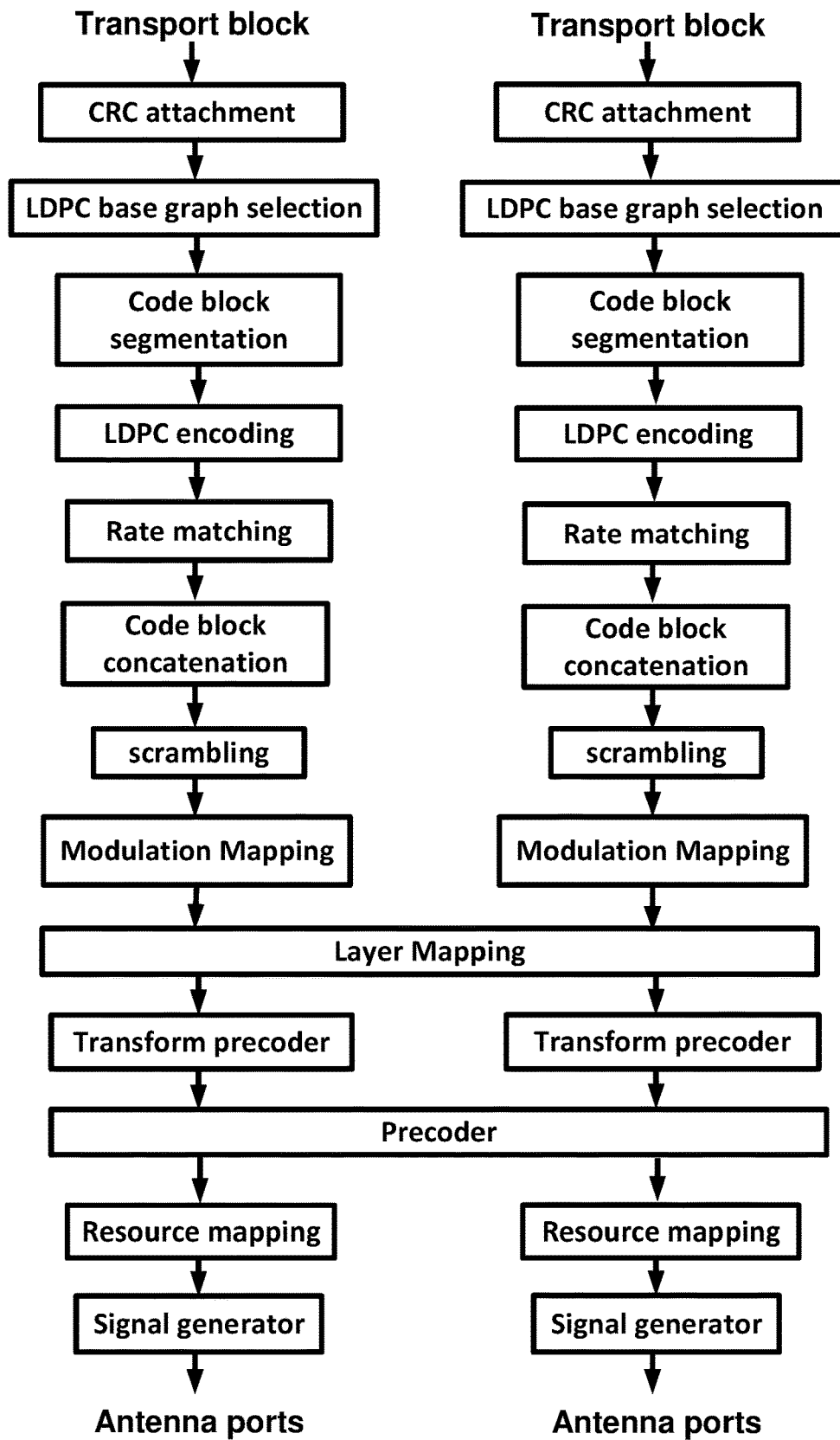
FIG. 6 shows example physical layer processes for signal transmission in accordance with several of various embodiments of the present disclosure.

FIG. 6 shows example physical layer processes for signal transmission in accordance with several of various embodiments of the present disclosure. Data and/or control streams from MAC layer may be encoded/decoded to offer transport and control services over the radio transmission link. For example, one or more (e.g., two as shown in FIG. 6) transport blocks may be received from the MAC layer for transmission via a physical channel (e.g., a physical downlink shared channel or a physical uplink shared channel). A cyclic redundancy check (CRC) may be calculated and attached to a transport block in the physical layer. The CRC calculation may be based on one or more cyclic generator polynomials. The CRC may be used by the receiver for error detection. Following the transport block CRC attachment, a low-density parity check (LDPC) base graph selection may be performed. In example embodiments, two LDPC base graphs may be used wherein a first LDPC base graph may be optimized for small transport blocks and a second LDPC base graph may be optimized for comparatively larger transport blocks.

The transport block may be segmented into code blocks and code block CRC may be calculated and attached to a code block. A code block may be LDPC coded and the LDPC coded blocks may be individually rate matched. The code blocks may be concatenated to create one or more codewords. The contents of a codeword may be scrambled and modulated to generate a block of complex-valued modulation symbols. The modulation symbols may be mapped to a plurality of transmission layers (e.g., multiple-input multiple-output (MIMO) layers) and the transmission layers may be subject to transform precoding and/or precoding. The precoded complex-valued symbols may be mapped to radio resources (e.g., resource elements). The signal generator block may create a baseband signal and up-convert the baseband signal to a carrier frequency for transmission via antenna ports. The signal generator block may employ mixers, filters and/or other radio frequency (RF) components prior to transmission via the antennas. The functions and blocks in FIG. 6 are illustrated as examples and other mechanisms may be implemented in various embodiments.

Figure 7:
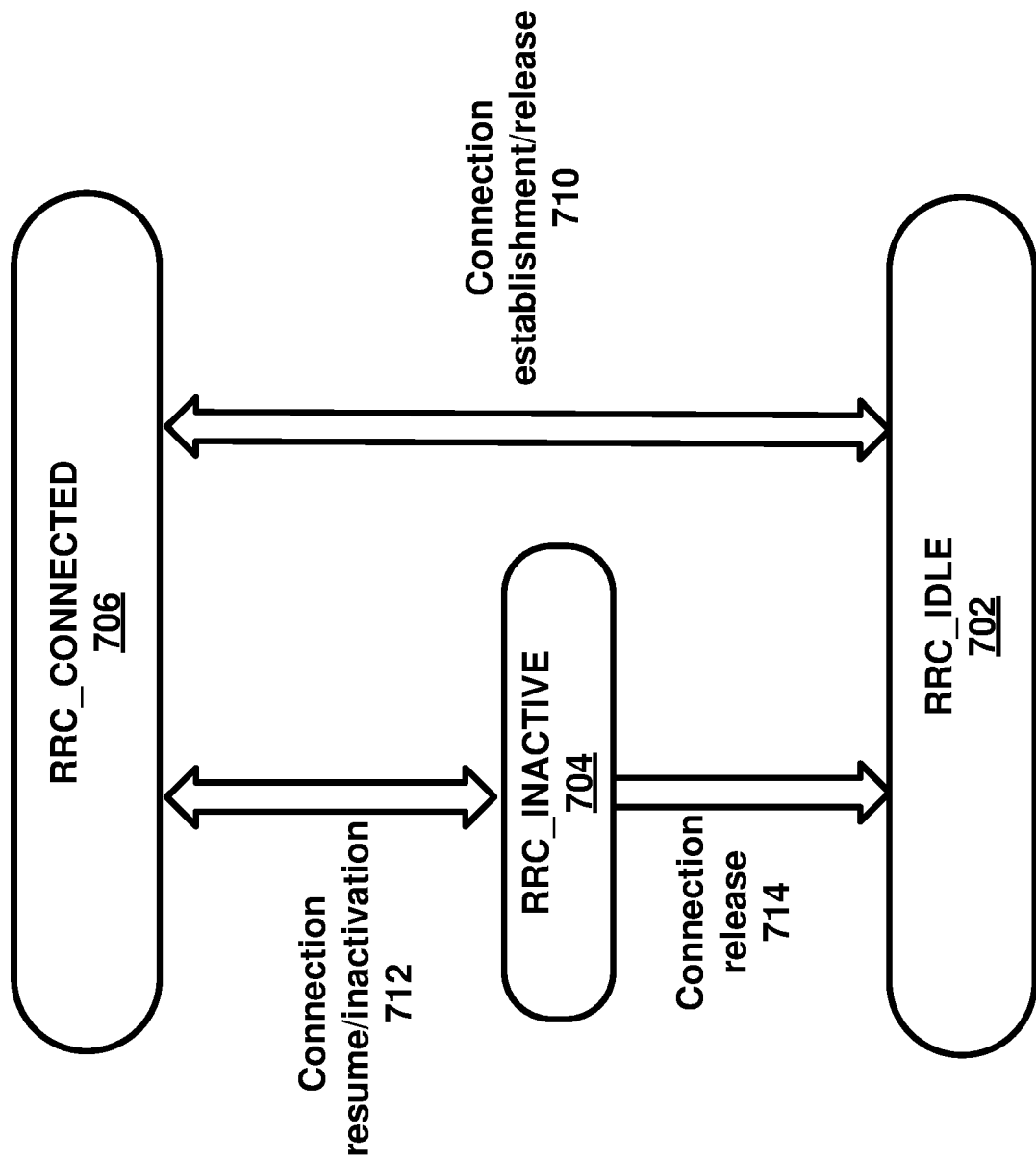
FIG. 7 shows examples of RRC states and RRC state transitions in accordance with several of various embodiments of the present disclosure.

FIG. 7 shows examples of RRC states and RRC state transitions at a UE in accordance with several of various embodiments of the present disclosure. A UE may be in one of three RRC states: RRC_IDLE 702, RRC INACTIVE 704 and RRC_CONNECTED 706. In RRC_IDLE 702 state, no RRC context (e.g., parameters needed for communications between the UE and the network) may be established for the UE in the RAN. In RRC_IDLE 702 state, no data transfer between the UE and the network may take place and uplink synchronization is not maintained. The wireless device may sleep most of the time and may wake up periodically to receive paging messages. The uplink transmission of the UE may be based on a random access process and to enable transition to the RRC_CONNECTED 706 state. The mobility in RRC_IDLE 702 state is through a cell reselection procedure where the UE camps on a cell based on one or more criteria including signal strength that is determined based on the UE measurements.

In RRC_CONNECTED 706 state, the RRC context is established and both the UE and the RAN have necessary parameters to enable communications between the UE and the network. In the RRC_CONNECTED 706 state, the UE is configured with an identity known as a Cell Radio Network Temporary Identifier (C-RNTI) that is used for signaling purposes (e.g., uplink and downlink scheduling, etc.) between the UE and the RAN. The wireless device mobility in the RRC_CONNECTED 706 state is managed by the RAN. The wireless device provides neighboring cells and/or current serving cell measurements to the network and the network may make hand over decisions. Based on the wireless device measurements, the current serving base station may send a handover request message to a neighboring base station and may send a handover command to the wireless device to handover to a cell of the neighboring base station. The transition of the wireless device from the RRC_IDLE 702 state to the RRC_CONNECTED 706 state or from the RRC_CONNECTED 706 state to the RRC_IDLE 702 state may be based on connection establishment and connection release procedures (shown collectively as connection establishment/release 710 in FIG. 7).

To enable a faster transition to the RRC_CONNECTED 706 state (e.g., compared to transition from RRC_IDLE 702 state to RRC_CONNECTED 706 state), an RRC_INACTIVE 704 state is used for an NR UE wherein, the RRC context is kept at the UE and the RAN. The transition from the RRC_INACTIVE 704 state to the RRC_CONNECTED 706 state is handled by RAN without CN signaling. Similar to the RRC_IDLE 702 state, the mobility in RRC_INACTIVE 704 state is based on a cell reselection procedure without involvement from the network. The transition of the wireless device from the RRC_INACTIVE 704 state to the RRC_CONNECTED 706 state or from the RRC_CONNECTED 706 state to the RRC_INACTIVE 704 state may be based on connection resume and connection inactivation procedures (shown collectively as connection resume/inactivation 712 in FIG. 7). The transition of the wireless device from the RRC_INACTIVE 704 state to the RRC_IDLE 702 state may be based on a connection release 714 procedure as shown in FIG. 7.

In NR, Orthogonal Frequency Division Multiplexing (OFDM), also called cyclic prefix OFDM (CP-OFDM), is the baseline transmission scheme in both downlink and uplink of NR and the Discrete Fourier Transform (DFT) spread OFDM (DFT-s-OFDM) is a complementary uplink transmission in addition to the baseline OFDM scheme. OFDM is multi-carrier transmission scheme wherein the transmission bandwidth may be composed of several narrowband sub-carriers. The subcarriers are modulated by the complex valued OFDM modulation symbols resulting in an OFDM signal. The complex valued OFDM modulation symbols are obtained by mapping, by a modulation mapper, the input data (e.g., binary digits) to different points of a modulation constellation diagram. The modulation constellation diagram depends on the modulation scheme. NR may use different types of modulation schemes including Binary Phase Shift Keying (BPSK), π/2-BPSK, Quadrature Phase Shift Keying (QPSK), 16 Quadrature Amplitude Modulation (16QAM), 64QAM and 256QAM. Different and/or higher order modulation schemes (e.g., M-QAM in general) may be used. An OFDM signal with N subcarriers may be generated by processing N subcarriers in parallel for example by using Inverse Fast Fourier Transform (IFFT) processing. The OFDM receiver may use FFT processing to recover the transmitted OFDM modulation symbols. The subcarrier spacing of subcarriers in an OFDM signal is inversely proportional to an OFDM modulation symbol duration. For example, for a 15 KHz subcarrier spacing, duration of an OFDM signal is nearly 66.7 μs. To enhance the robustness of OFDM transmission in time dispersive channels, a cyclic prefix (CP) may be inserted at the beginning of an OFDM symbol. For example, the last part of an OFDM symbol may be copied and inserted at the beginning of an OFDM symbol. The CP insertion enhanced the OFDM transmission scheme by preserving subcarrier orthogonality in time dispersive channels.

In NR, different numerologies may be used for OFDM transmission. A numerology of OFDM transmission may indicate a subcarrier spacing and a CP duration for the OFDM transmission. For example, a subcarrier spacing in NR may generally be a multiple of 15 KHz and expressed as $\Delta f = 2^\mu \cdot 15$ KHz ($\mu=0, 1, 2, \ldots$). Example subcarrier spacings used in NR include 15 KHz ($\mu=0$), 30 KHz ($\mu=1$), 60 KHz ($\mu=2$), 120 KHz ($\mu=3$) and 240 KHz ($\mu=4$). As discussed before, a duration of OFDM symbol is inversely proportional to the subcarrier spacing and therefor OFDM symbol duration may depend on the numerology (e.g. the μ value).

Figure 8:
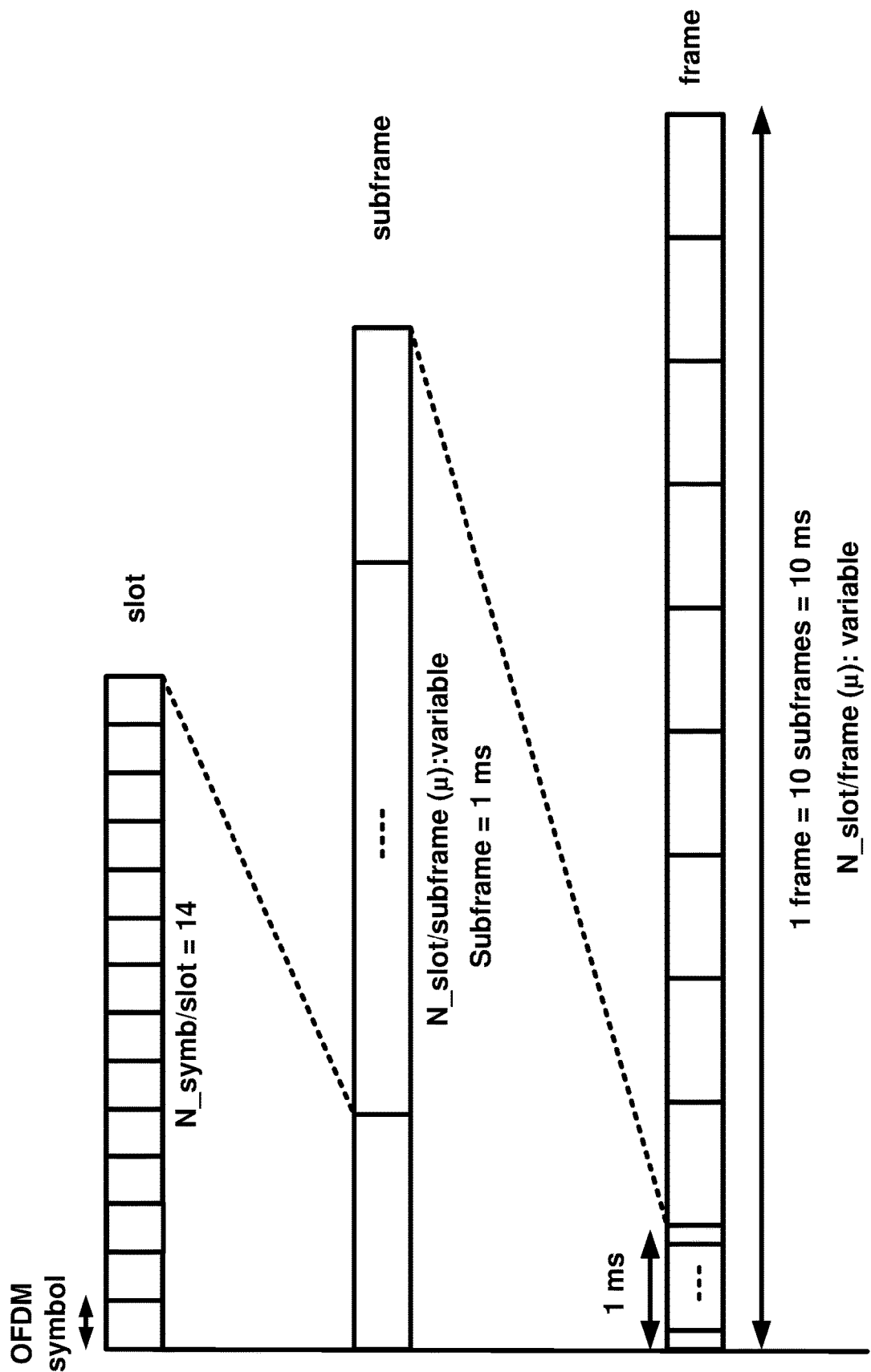
FIG. 8 shows an example time domain transmission structure in NR by grouping OFDM symbols into slots, subframes and frames in accordance with several of various embodiments of the present disclosure.

FIG. 8 shows an example time domain transmission structure in NR wherein OFDM symbols are grouped into slots, subframes and frames in accordance with several of various embodiments of the present disclosure. A slot is a group of $N_{symb}^{slot}$ OFDM symbols, wherein the $N_{symb}^{slot}$ may have a constant value (e.g., 14). Since different numerologies results in different OFDM symbol durations, duration of a slot may also depend on the numerology and may be variable. A subframe may have a duration of 1 ms and may be composed of one or more slots, the number of which may depend on the slot duration. The number of slots per subframe is therefore a function of μ and may generally expressed as $N_{slot}^{subframe,\mu}$ and the number of symbols per subframe may be expressed as $N_{symb}^{subframe,\mu} = N_{symb}^{slot} N_{slot}^{subframe,\mu}$. A frame may have a duration of 10 ms and may consist of 10 subframes. The number of slots per frame may depend on the numerology and therefore may be variable. The number of slots per frame may generally be expressed as $N_{slot}^{frame,\mu}$.

An antenna port may be defined as a logical entity such that channel characteristics over which a symbol on the antenna port is conveyed may be inferred from the channel characteristics over which another symbol on the same antenna port is conveyed. For example, for DM-RS associated with a PDSCH, the channel over which a PDSCH symbol on an antenna port is conveyed may be inferred from the channel over which a DM-RS symbol on the same antenna port is conveyed, for example, if the two symbols are within the same resource as the scheduled PDSCH and/or in the same slot and/or in the same precoding resource block group (PRG). For example, for DM-RS associated with a PDCCH, the channel over which a PDCCH symbol on an antenna port is conveyed may be inferred from the channel over which a DM-RS symbol on the same antenna port is conveyed if, for example, the two symbols are within resources for which the UE may assume the same precoding being used. For example, for DM-RS associated with a PBCH, the channel over which a PBCH symbol on one antenna port is conveyed may be inferred from the channel over which a DM-RS symbol on the same antenna port is conveyed if, for example, the two symbols are within a SS/PBCH block transmitted within the same slot, and with the same block index. The antenna port may be different from a physical antenna. An antenna port may be associated with an antenna port number and different physical channels may correspond to different ranges of antenna port numbers.

Figure 9:
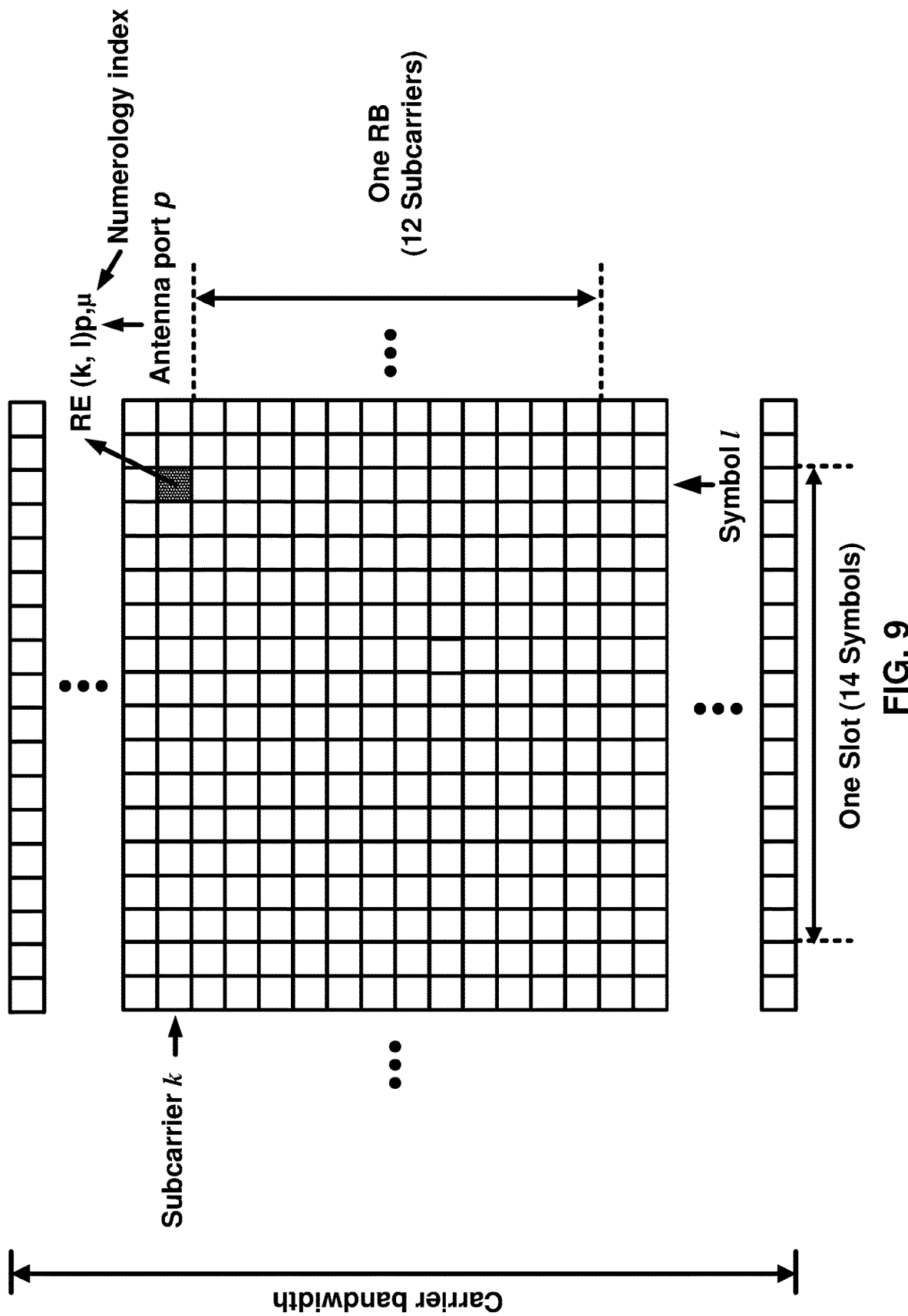
FIG. 9 shows an example of time-frequency resource grid in accordance with several of various embodiments of the present disclosure.

FIG. 9 shows an example of time-frequency resource grid in accordance with several of various embodiments of the present disclosure. The number of subcarriers in a carrier bandwidth may be based on the numerology of OFDM transmissions in the carrier. A resource element, corresponding to one symbol duration and one subcarrier, may be the smallest physical resource in the time-frequency grid. A resource element (RE) for antenna port p and subcarrier spacing configuration μ may be uniquely identified by $(k,l)_{p,\mu}$ where k is the index of a subcarrier in the frequency domain and l may refer to the symbol position in the time domain relative to some reference point. A resource block may be defined as $N_{SC}^{RB}=12$ subcarriers. Since subcarrier spacing depends on the numerology of OFDM transmission, the frequency domain span of a resource block may be variable and may depend on the numerology. For example, for a subcarrier spacing of 15 KHz (e.g., µ=0), a resource block may be 180 KHz and for a subcarrier spacing of 30 KHz (e.g., µ=1), a resource block may be 360 KHz.

With large carrier bandwidths defined in NR and due to limited capabilities for some UEs (e.g., due to hardware limitations), a UE may not support an entire carrier bandwidth. Receiving on the full carrier bandwidth may imply high energy consumption. For example, transmitting downlink control channels on the full downlink carrier bandwidth may result in high power consumption for wide carrier bandwidths. NR may use a bandwidth adaptation procedure to dynamically adapt the transmit and receive bandwidths. The transmit and receive bandwidth of a UE on a cell may be smaller than the bandwidth of the cell and may be adjusted. For example, the width of the transmit and/or receive bandwidth may change (e.g., shrink during period of low activity to save power); the location of the transmit and/or receive bandwidth may move in the frequency domain (e.g., to increase scheduling flexibility); and the subcarrier spacing of the transmit or receive bandwidth may change (e.g., to allow different services). A subset of the cell bandwidth may be referred to as a Bandwidth Part (BWP) and bandwidth adaptation may be achieved by configuring the UE with one or more BWPs. The base station may configure a UE with a set of downlink BWPs and a set of uplink BWPs. A BWP may be characterized by a numerology (e.g., subcarrier spacing and cyclic prefix) and a set of consecutive resource blocks in the numerology of the BWP. One or more first BWPs of the one or more BWPs of the cell may be active at a time. An active BWP may be an active downlink BWP or an active uplink BWP.

Figure 10:
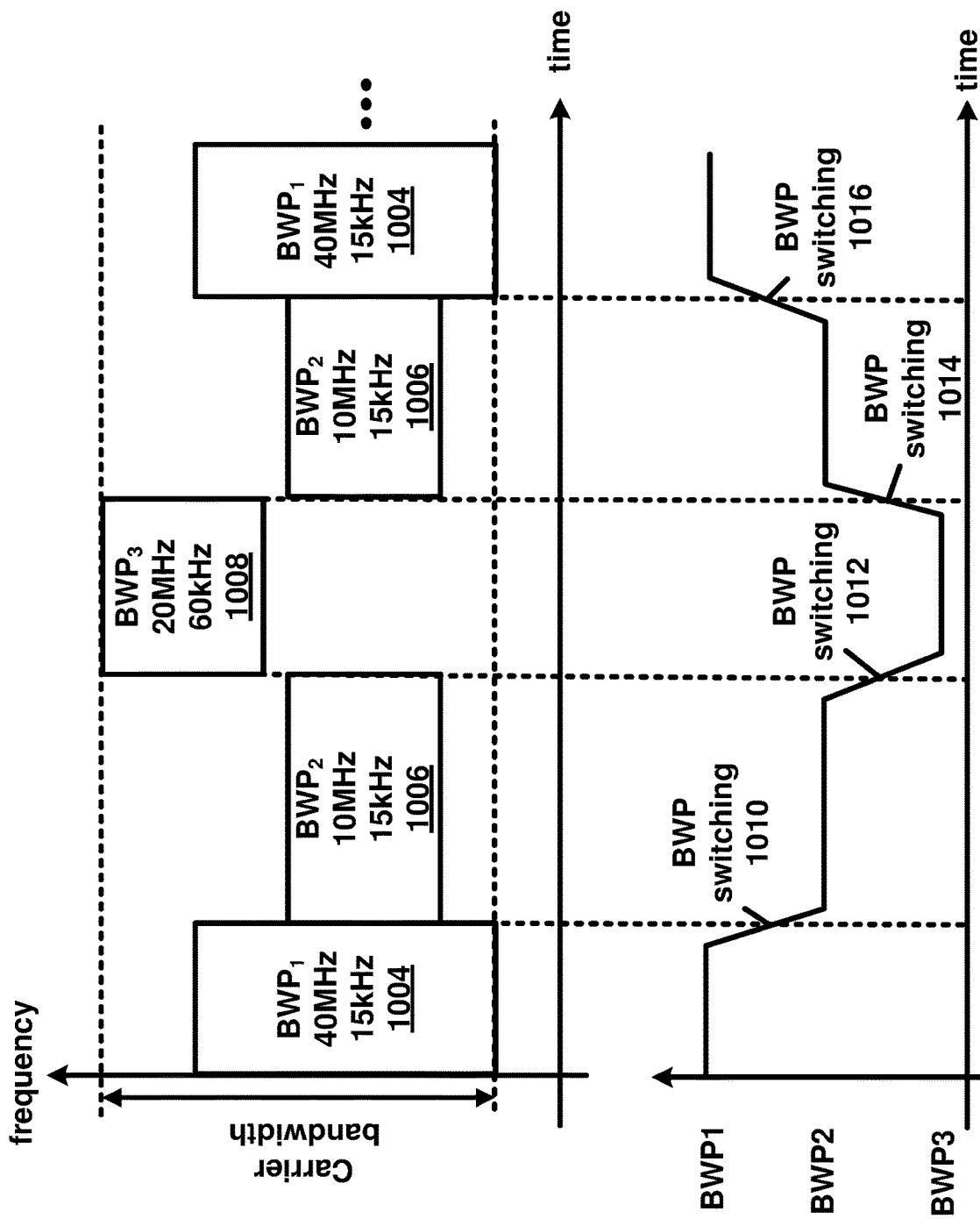
FIG. 10 shows example adaptation and switching of bandwidth parts in accordance with several of various embodiments of the present disclosure.

FIG. 10 shows an example of bandwidth part adaptation and switching. In this example, three BWPs (BWP$_1$ 1004, BWP$_2$ 1006 and BWP$_3$ 1008) are configured for a UE on a carrier bandwidth. The BWP$_1$ is configured with a bandwidth of 40 MHz and a numerology with subcarrier spacing of 15 KHz, the BWP$_2$ is configured with a bandwidth of 10 MHz and a numerology with subcarrier spacing of 15 KHz and the BWP$_3$ is configured with a bandwidth of 20 MHz and a subcarrier spacing of 60 KHz. The wireless device may switch from a first BWP (e.g., BWP$_1$) to a second BWP (e.g., BWP$_2$). An active BWP of the cell may change from the first BWP to the second BWP in response to the BWP switching.

The BWP switching (e.g., BWP switching 1010, BWP switching 1012, BWP switching 1014, or BWP switching 1016 in FIG. 10) may be based on a command from the base station. The command may be a DCI comprising scheduling information for the UE in the second BWP. In case of uplink BWP switching, the first BWP and the second BWP may be uplink BWPs and the scheduling information may be an uplink grant for uplink transmission via the second BWP. In case of downlink BWP switching, the first BWP and the second BWP may be downlink BWPs and the scheduling information may be a downlink assignment for downlink reception via the second BWP.

The BWP switching (e.g., BWP switching 1010, BWP switching 1012, BWP switching 1014, or BWP switching 1016 in FIG. 10) may be based on an expiry of a timer. The base station may configure a wireless device with a BWP inactivity timer and the wireless device may switch to a default BWP (e.g., default downlink BWP) based on the expiry of the BWP inactivity timer. The expiry of the BWP inactivity timer may be an indication of low activity on the current active downlink BWP. The base station may configure the wireless device with the default downlink BWP. If the base station does not configure the wireless device with the default BWP, the default BWP may be an initial downlink BWP. The initial active BWP may be the BWP that the wireless device receives scheduling information for remaining system information upon transition to an RRC_CONNECTED state.

A wireless device may monitor a downlink control channel of a downlink BWP. For example, the UE may monitor a set of PDCCH candidates in configured monitoring occasions in one or more configured COntrol REsource SETs (CORESETs) according to the corresponding search space configurations. A search space configuration may define how/where to search for PDCCH candidates. For example, the search space configuration parameters may comprise a monitoring periodicity and offset parameter indicating the slots for monitoring the PDCCH candidates. The search space configuration parameters may further comprise a parameter indicating a first symbol with a slot within the slots determined for monitoring PDCCH candidates. A search space may be associated with one or more CORESETs and the search space configuration may indicate one or more identifiers of the one or more CORESETs. The search space configuration parameters may further indicate that whether the search space is a common search space or a UE-specific search space. A common search space may be monitored by a plurality of wireless devices and a UE-specific search space may be dedicated to a specific UE.

Figure 11A:
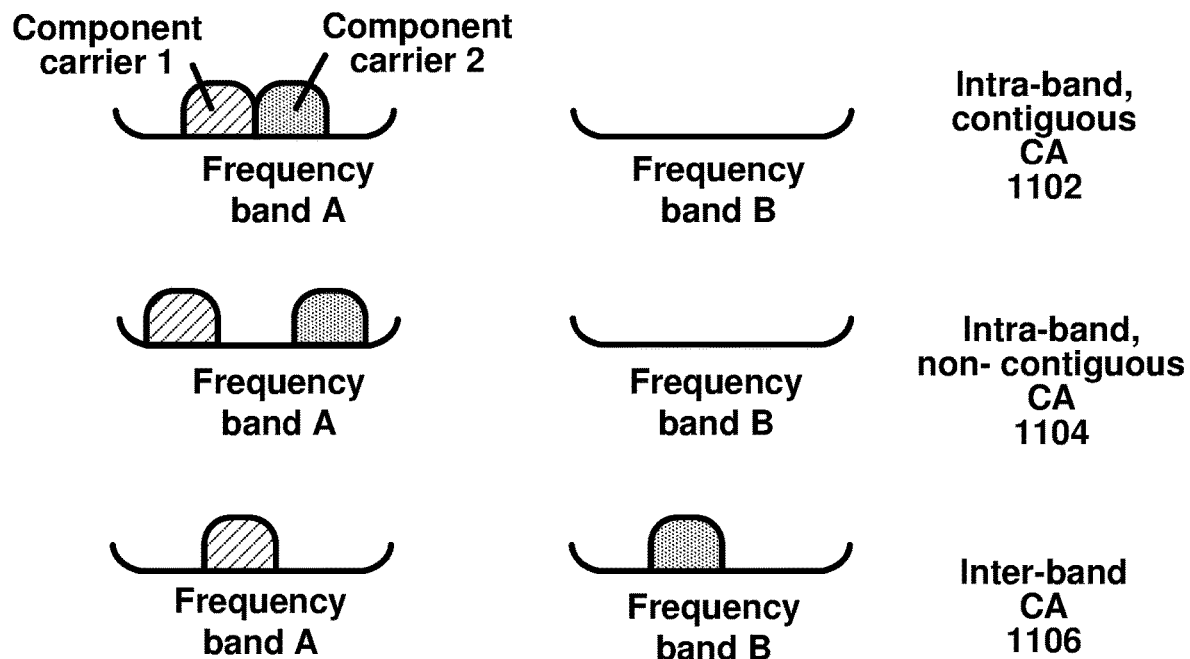
FIG. 11A shows example arrangements of carriers in carrier aggregation in accordance with several of various embodiments of the present disclosure.

FIG. 11A shows example arrangements of carriers in carrier aggregation in accordance with several of various embodiments of the present disclosure. With carrier aggregation, multiple NR component carriers (CCs) may be aggregated. Downlink transmissions to a wireless device may take place simultaneously on the aggregated downlink CCs resulting in higher downlink data rates. Uplink transmissions from a wireless device may take place simultaneously on the aggregated uplink CCs resulting in higher uplink data rates. The component carriers in carrier aggregation may be on the same frequency band (e.g., intra-band carrier aggregation) or on different frequency bands (e.g., inter-band carrier aggregation). The component carriers may also be contiguous or non-contiguous. This results in three possible carrier aggregation scenarios, intra-band contiguous CA 1102, intra-band non-contiguous CA 1104 and inter-band CA 1106 as shown in FIG. 11A. Depending on the UE capability for carrier aggregation, a UE may transmit and/or receive on multiple carriers or for a UE that is not capable of carrier aggregation, the UE may transmit and/or receive on one component carrier at a time. In this disclosure, the carrier aggregation is described using the term cell and a carrier aggregation capable UE may transmit and/or receive via multiple cells.

In carrier aggregation, a UE may be configured with multiple cells. A cell of the multiple cells configured for the UE may be referred to as a Primary Cell (PCell). The PCell may be the first cell that the UE is initially connected to. One or more other cells configured for the UE may be referred to as Secondary Cells (SCells). The base station may configure a UE with multiple SCells. The configured SCells may be deactivated upon configuration and the base station may dynamically activate or deactivate one or more of the configured SCells based on traffic and/or channel conditions. The base station may activate or deactivate configured SCells using a SCell Activation/Deactivation MAC CE. The SCell Activation/Deactivation MAC CE may comprise a bitmap, wherein each bit in the bitmap may correspond to a SCell and the value of the bit indicates an activation status or deactivation status of the SCell.

An SCell may also be deactivated in response to expiry of a SCell deactivation timer of the SCell. The expiry of an SCell deactivation timer of an SCell may be an indication of low activity (e.g., low transmission or reception activity) on the SCell. The base station may configure the SCell with an SCell deactivation timer. The base station may not configure an SCell deactivation timer for an SCell that is configured with PUCCH (also referred to as a PUCCH SCell). The configuration of the SCell deactivation timer may be per configured SCell and different SCells may be configured with different SCell deactivation timer values. The SCell deactivation timer may be restarted based on one or more criteria including reception of downlink control information on the SCell indicating uplink grant or downlink assignment for the SCell or reception of downlink control information on a scheduling cell indicating uplink grant or downlink assignment for the SCell or transmission of a MAC PDU based on a configured uplink grant or reception of a configured downlink assignment.

A PCell for a UE may be an SCell for another UE and a SCell for a UE may be PCell for another UE. The configuration of PCell may be UE-specific. One or more SCells of the multiple SCells configured for a UE may be configured as downlink-only SCells, e.g., may only be used for downlink reception and may not be used for uplink transmission. In case of self-scheduling, the base station may transmit signaling for uplink grants and/or downlink assignments on the same cell that the corresponding uplink or downlink transmission takes place. In case of cross-carrier scheduling, the base station may transmit signaling for uplink grants and/or downlink assignments on a cell different from the cell that the corresponding uplink or downlink transmission takes place.

Figure 11B:
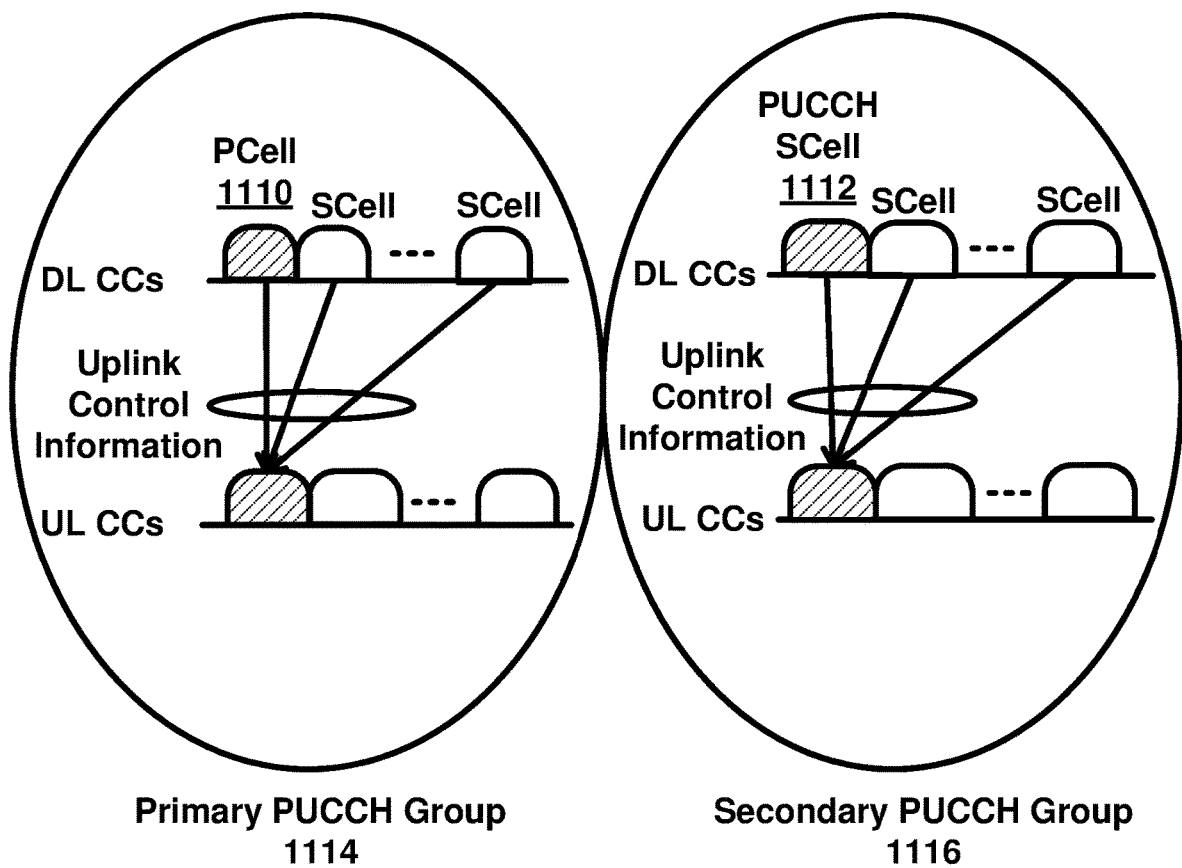
FIG. 11B shows examples of uplink control channel groups in accordance with several of various embodiments of the present disclosure.

FIG. 11B shows examples of uplink control channel groups in accordance with several of various embodiments of the present disclosure. A base station may configure a UE with multiple PUCCH groups wherein a PUCCH group comprises one or more cells. For example, as shown in FIG. 11B, the base station may configure a UE with a primary PUCCH group 1114 and a secondary PUCCH group 1116. The primary PUCCH group may comprise the PCell 1110 and one or more first SCells. First UCI corresponding to the PCell and the one or more first SCells of the primary PUCCH group may be transmitted by the PUCCH of the PCell. The first UCI may be, for example, HARQ feedback for downlink transmissions via downlink CCs of the PCell and the one or more first SCells. The secondary PUCCH group may comprise a PUCCH SCell and one or more second SCells. Second UCI corresponding to the PUCCH SCell and the one or more second SCells of the secondary PUCCH group may be transmitted by the PUCCH of the PUCCH SCell. The second UCI may be, for example, HARQ feedback for downlink transmissions via downlink CCs of the PUCCH SCell and the one or more second SCells.

FIG. 12A, FIG. 12B and FIG. 12C show example random access processes in accordance with several of various embodiments of the present disclosure. FIG. 12A shows an example of four step contention-based random access (CBRA) procedure. The four-step CBRA procedure includes exchanging four messages between a UE and a base station. Msg1 may be for transmission (or retransmission) of a random access preamble by the wireless device to the base station. Msg2 may be the random access response (RAR) by the base station to the wireless device. Msg3 is the scheduled transmission based on an uplink grant indicated in Msg2 and Msg4 may be for contention resolution.

The base station may transmit one or more RRC messages comprising configuration parameters of the random access parameters. The random access parameters may indicate radio resources (e.g., time-frequency resources) for transmission of the random access preamble (e.g., Msg1), configuration index, one or more parameters for determining the power of the random access preamble (e.g., a power ramping parameter, a preamble received target power, etc.), a parameter indicating maximum number of preamble transmission, RAR window for monitoring RAR, cell-specific random access parameters and UE specific random access parameters. The UE-specific random access parameters may indicate one or more PRACH occasions for random access preamble (e.g., Msg1) transmissions. The random access parameters may indicate association between the PRACH occasions and one or more reference signals (e.g., SSB or CSI-RS). The random access parameters may further indicate association between the random access preambles and one or more reference signals (e.g., SBB or CSI-RS). The UE may use one or more reference signals (e.g., SSB(s) or CSI-RS(s)) and may determine a random access preamble to use for Msg1 transmission based on the association between the random access preambles and the one or more reference signals. The UE may use one or more reference signals (e.g., SSB(s) or CSI-RS(s)) and may determine the PRACH occasion to use for Msg1 transmission based on the association between the PRACH occasions and the reference signals. The UE may perform a retransmission of the random access preamble if no response is received with the RAR window following the transmission of the preamble. UE may use a higher transmission power for retransmission of the preamble. UE may determine the higher transmission power of the preamble based on the power ramping parameter.

Msg2 is for transmission of RAR by the base station. Msg2 may comprise a plurality of RARs corresponding to a plurality of random access preambles transmitted by a plurality of UEs. Msg2 may be associated with a random access temporary radio identifier (RA-RNTI) and may be received in a common search space of the UE. The RA-RNTI may be based on the PRACH occasion (e.g., time and frequency resources of a PRACH) in which a random access preamble is transmitted. RAR may comprise a timing advance command for uplink timing adjustment at the UE, an uplink grant for transmission of Msg3 and a temporary C-RNTI. In response to the successful reception of Msg2, the UE may transmit the Msg3. Msg3 and Msg4 may enable contention resolution in case of CBRA. In a CBRA, a plurality of UEs may transmit the same random access preamble and may consider the same RAR as being corresponding to them. UE may include a device identifier in Msg3 (e.g., a C-RNTI, temporary C-RNTI or other UE identity). Base station may transmit the Msg4 with a PDSCH and UE may assume that the contention resolution is successful in response to the PDSCH used for transmission of Msg4 being associated with the UE identifier included in Msg3.

FIG. 12B shows an example of a contention-free random access (CFRA) process. Msg 1 (random access preamble) and Msg 2 (random access response) in FIG. 12B for CFRA may be analogous to Msg 1 and Msg 2 in FIG. 12A for CBRA. In an example, the CFRA procedure may be initiated in response to a PDCCH order from a base station. The PDCCH order for initiating the CFRA procedure by the wireless device may be based on a DCI having a first format (e.g., format 1_0). The DCI for the PDCCH order may comprise a random access preamble index, an UL/SUL indicator indicating an uplink carrier of a cell (e.g., normal uplink carrier or supplementary uplink carrier) for transmission of the random access preamble, a SS/PBCH index indicating the SS/PBCH that may be used to determine a RACH occasion for PRACH transmission, a PRACH mask index indicating the RACH occasion associated with the SS/PBCH indicated by the SS/PBCH index for PRACH transmission, etc. In an example, the CFRA process may be started in response to a beam failure recovery process. The wireless device may start the CFRA for the beam failure recovery without a command (e.g., PDCCH order) from the base station and by using the wireless device dedicated resources.

FIG. 12C shows an example of a two-step random access process comprising two messages exchanged between a wireless device and a base station. Msg A may be transmitted by the wireless device to the base station and may comprise one or more transmissions of a preamble and/or one or more transmissions of a transport block. The transport block in Msg A and Msg 3 in FIG. 12A may have similar and/or equivalent contents. The transport block of Msg A may comprise data and control information (e.g., SR, HARQ feedback, etc.). In response to the transmission of Msg A, the wireless device may receive Msg B from the base station. Msg B in FIG. 12C and Msg 2 (e.g., RAR) illustrated in FIGS. 12A and 12B may have similar and/or equivalent content.

The base station may periodically transmit synchronization signals (SS s), e.g., primary SS (PSS) and secondary SS (SSS) along with PBCH on each NR cell. The PSS/SSS together with PBCH is jointly referred to as a SS/PBCH block. The SS/PBCH block enables a wireless device to find a cell when entering to the mobile communications network or find new cells when moving within the network. The SS/PBCH block spans four OFDM symbols in time domain. The PSS is transmitted in the first symbol and occupies 127 subcarriers in frequency domain. The SSS is transmitted in the third OFDM symbol and occupies the same 127 subcarriers as the PSS. There are eight and nine empty subcarriers on each side of the SSS. The PBCH is transmitted on the second OFDM symbol occupying 240 subcarriers, the third OFDM symbol occupying 48 subcarriers on each side of the SSS, and on the fourth OFDM symbol occupying 240 subcarriers. Some of the PBCH resources indicated above may be used for transmission of the demodulation reference signal (DMRS) for coherent demodulation of the PBCH. The SS/PBCH block is transmitted periodically with a period ranging from 5 ms to 160 ms. For initial cell search or for cell search during inactive/idle state, a wireless device may assume that that the SS/PBCH block is repeated at least every 20 ms.

In NR, transmissions using of antenna arrays, with many antenna elements, and beamforming plays an important role specially in higher frequency bands. Beamforming enables higher capacity by increasing the signal strength (e.g., by focusing the signal energy in a specific direction) and by lowering the amount interference received at the wireless devices. The beamforming techniques may generally be divided to analog beamforming and digital beamforming techniques. With digital beamforming, signal processing for beamforming is carried out in the digital domain before digital-to-analog conversion and detailed control of both amplitude and phase of different antenna elements may be possible. With analog beamforming, the signal processing for beamforming is carried out in the analog domain and after the digital to analog conversion. The beamformed transmissions may be in one direction at a time. For example, the wireless devices that are in different directions relative to the base station may receive their downlink transmissions at different times. For analog receiver-side beamforming, the receiver may focus its receiver beam in one direction at a time.

In NR, the base station may use beam sweeping for transmission of SS/PBCH blocks. The SS/PBCH blocks may be transmitted in different beams using time multiplexing. The set of SS/PBCH blocks that are transmitted in one beam sweep may be referred to as a SS/PBCH block set. The period of PBCH/SSB block transmission may be a time duration between a SS/PBCH block transmission in a beam and the next SS/PBCH block transmission in the same beam. The period of SS/PBCH block is, therefore, also the period of the SS/PBCH block set.

Figure 13A:
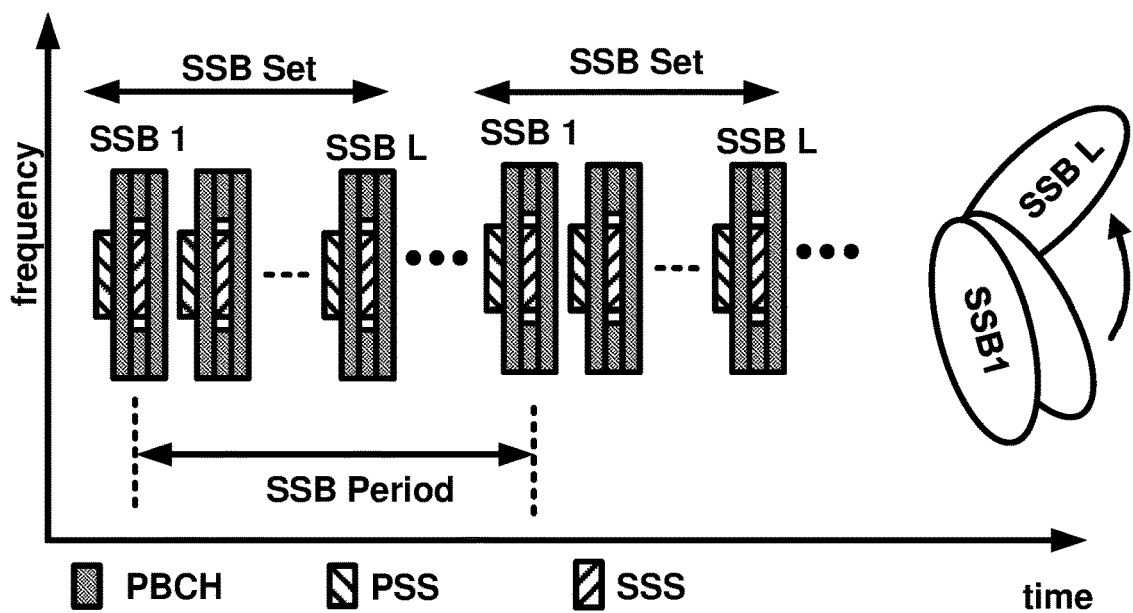
FIG. 13A shows example time and frequency structure of SSBs and their associations with beams in accordance with several of various embodiments of the present disclosure.

FIG. 13A shows example time and frequency structure of SS/PBCH blocks and their associations with beams in accordance with several of various embodiments of the present disclosure. In this example, a SS/PBCH block (also referred to as SSB) set comprise L SSBs wherein an SSB in the SSB set is associated with (e.g., transmitted in) one of L beams of a cell. The transmission of SBBs of an SSB set may be confined within a 5 ms interval, either in a first half-frame or a second half-frame of a 10 ms frame. The number of SSBs in an SSB set may depend on the frequency band of operation. For example, the number of SSBs in a SSB set may be up to four SSBs in frequency bands below 3 GHz enabling beam sweeping of up to four beams, up to eight SSBs in frequency bands between 3 GHz and 6 GHz enabling beam sweeping of up to eight beams, and up to sixty four SSBs in higher frequency bands enabling beam sweeping of up to sixty four beams. The SSs of an SSB may depend on a physical cell identity (PCI) of the cell and may be independent of which beam of the cell is used for transmission of the SSB. The PBCH of an SSB may indicate a time index parameter and the wireless device may determine the relative position of the SSB within the SSB set using the time index parameter. The wireless device may use the relative position of the SSB within an SSB set for determining the frame timing and/or determining RACH occasions for a random access process.

A wireless device entering the mobile communications network may first search for the PSS. After detecting the PSS, the wireless device may determine the synchronization up to the periodicity of the PSS. By detecting the PSS, the wireless device may determine the transmission timing of the SSS. The wireless device may determine the PCI of the cell after detecting the SSS. The PBCH of a SS/PBCH block is a downlink physical channel that carries the MIB. The MIB may be used by the wireless device to obtain remaining system information (RMSI) that is broadcast by the network. The RMSI may include System Information Block 1 (SIB1) that contains information required for the wireless device to access the cell.

As discussed earlier, the wireless device may determine a time index parameter from the SSB. The PBCH comprises a half-frame parameter indicating whether the SSB is in the first 5 ms half or the second 5 ms half of a 10 ms frame. The wireless device may determine the frame boundary using the time index parameter and the half-frame parameter. In addition, the PBCH may comprise a parameter indicating the system frame number (SFN) of the cell.

The base station may transmit CSI-RS and a UE may measure the CSI-RS to obtain channel state information (CSI). The base station may configure the CSI-RS in a UE-specific manner. In some scenarios, same set of CSI-RS resources may be configured for multiple UEs and one or more resource elements of a CSI-RS resource may be shared among multiple UEs. A CSI-RS resource may be configured such that it does not collide with a CORESET configured for the wireless device and/or with a DMRS of a PDSCH scheduled for the wireless device and/or transmitted SSBs. The UE may measure one or more CSI-RS s configured for the UE and may generate a CSI report based on the CSI-RS measurements and may transmit the CSI report to the base station for scheduling, link adaptation and/or other purposes.

NR supports flexible CSI-RS configurations. A CSI-RS resource may be configured with single or multiple antenna ports and with configurable density. Based on the number of configured antenna ports, a CSI-RS resource may span different number of OFDM symbols (e.g., 1, 2, and 4 symbols). The CSI-RS may be configured for a downlink BWP and may use the numerology of the downlink BWP. The CSI-RS may be configured to cover the full bandwidth of the downlink BWP or a portion of the downlink BWP. In some case, the CSI-RS may be repeated in every resource block of the CSI-RS bandwidth, referred to as CSI-RS with density equal to one. In some cases, the CSI-RS may be configured to be repeated in every other resource block of the CSI-RS bandwidth. CSI-RS may be non-zero power (NZP) CSI-RS or zero-power (ZP) CSI-RS.

The base station may configure a wireless device with one or more sets of NZP CSI-RS resources. The base station may configure the wireless device with a NZP CSI-RS resource set using an RRC information element (IE) NZP-CSI-RS-ResourceSet indicating a NZP CSI-RS resource set identifier (ID) and parameters specific to the NZP CSI-RS resource set. An NZP CSI-RS resource set may comprise one or more CSI-RS resources. An NZP CSI-RS resource set may be configured as part of the CSI measurement configuration.

The CSI-RS may be configured for periodic, semi-persistent or aperiodic transmission. In case of the periodic and semi-persistent CSI-RS configurations, the wireless device may be configured with a CSI resource periodicity and offset parameter that indicate a periodicity and corresponding offset in terms of number of slots. The wireless device may determine the slots that the CSI-RS s are transmitted. For semi-persistent CSI-RS, the CSI-RS resources for CSI-RS transmissions may be activated and deactivated by using a semi-persistent (SP) CSI-CSI Resource Set Activation/Deactivation MAC CE. In response to receiving a MAC CE indicating activation of semi-persistent CSI-RS resources, the wireless device may assume that the CSI-RS transmissions will continue until the CSI-RS resources for CSI-RS transmissions are activated.

As discussed before, CSI-RS may be configured for a wireless device as NZP CSI-RS or ZP CSI-RS. The configuration of the ZP CSI-RS may be similar to the NZP CSI-RS with the difference that the wireless device may not carry out measurements for the ZP CSI-RS. By configuring ZP CSI-RS, the wireless device may assume that a scheduled PDSCH that includes resource elements from the ZP CSI-RS is rate matched around those ZP CSI-RS resources. For example, a ZP CSI-RS resource configured for a wireless device may be an NZP CSI-RS resource for another wireless device. For example, by configuring ZP CSI-RS resources for the wireless device, the base station may indicate to the wireless device that the PDSCH scheduled for the wireless device is rate matched around the ZP CSI-RS resources.

A base station may configure a wireless device with channel state information interference measurement (CSI-IM) resources. Similar to the CSI-RS configuration, configuration of locations and density of CSI-IM resources may be flexible. The CSI-IM resources may be periodic (configured with a periodicity), semi-persistent (configured with a periodicity and activated and deactivated by MAC CE) or aperiodic (triggered by a DCI).

Tracking reference signals (TRSs) may be configured for a wireless device as a set of sparse reference signals to assist the wireless in time and frequency tracking and compensating time and frequency variations in its local oscillator. The wireless device may further use the TRSs for estimating channel characteristics such as delay spread or doppler frequency. The base station may use a CSI-RS configuration for configuring TRS for the wireless device. The TRS may be configured as a resource set comprising multiple periodic NZP CSI-RS resources.

A base station may configure a UE and the UE may transmit sounding reference signals (SRSs) to enable uplink channel sounding/estimation at the base station. The SRS may support up to four antenna ports and may be designed with low cubic metric enabling efficient operation of the wireless device amplifier. The SRS may span one or more (e.g., one, two or four) consecutive OFDM symbols in time domain and may be located within the last n (e.g., six) symbols of a slot. In the frequency domain, the SRS may have a structure that is referred to as a comb structure and may be transmitted on every Nth subcarrier. Different SRS transmissions from different wireless devices may have different comb structures and may be multiplexed in frequency domain.

A base station may configure a wireless device with one or more SRS resource sets and an SRS resource set may comprise one or more SRS resources. The SRS resources in an SRS resources set may be configured for periodic, semi-persistent or aperiodic transmission. The periodic SRS and the semi-persistent SRS resources may be configured with periodicity and offset parameters. The Semi-persistent SRS resources of a configured semi-persistent SRS resource set may be activated or deactivated by a semi-persistent (SP) SRS Activation/Deactivation MAC CE. The set of SRS resources included in an aperiodic SRS resource set may be activated by a DCI. A value of a field (e.g., an SRS request field) in the DCI may indicate activation of resources in an aperiodic SRS resource set from a plurality of SRS resource sets configured for the wireless device.

An antenna port may be associated with one or more reference signals. The receiver may assume that the one or more reference signals, associated with the antenna port, may be used for estimating channel corresponding to the antenna port. The reference signals may be used to derive channel state information related to the antenna port. Two antenna ports may be referred to as quasi co-located if characteristics (e.g., large-scale properties) of the channel over which a symbol is conveyed on one antenna port may be inferred from the channel over which a symbol is conveyed from another antenna port. For example, a UE may assume that radio channels corresponding to two different antenna ports have the same large-scale properties if the antenna ports are specified as quasi co-located. In some cases, the UE may assume that two antenna ports are quasi co-located based on signaling received from the base station. Spatial quasi-colocation (QCL) between two signals may be, for example, due to the two signals being transmitted from the same location and in the same beam. If a receive beam is good for a signal in a group of signals that are spatially quasi co-located, it may be assumed also be good for the other signals in the group of signals.

The CSI-RS in the downlink and the SRS in uplink may serve as quasi-location (QCL) reference for other physical downlink channels and physical uplink channels, respectively. For example, a downlink physical channel (e.g., PDSCH or PDCCH) may be spatially quasi co-located with a downlink reference signal (e.g., CSI-RS or SSB). The wireless device may determine a receive beam based on measurement on the downlink reference signal and may assume that the determined received beam is also good for reception of the physical channels (e.g., PDSCH or PDCCH) that are spatially quasi co-located with the downlink reference signal. Similarly, an uplink physical channel (e.g., PUSCH or PUCCH) may be spatially quasi co-located with an uplink reference signal (e.g., SRS). The base station may determine a receive beam based on measurement on the uplink reference signal and may assume that the determined received beam is also good for reception of the physical channels (e.g., PUSCH or PUCCH) that are spatially quasi co-located with the uplink reference signal.

The Demodulation Reference Signals (DM-RS s) enables channel estimation for coherent demodulation of downlink physical channels (e.g., PDSCH, PDCCH and PBH) and uplink physical channels (e.g., PUSCH and PUCCH). The DM-RS may be located early in the transmission (e.g., front-loaded DM-RS) and may enable the receiver to obtain the channel estimate early and reduce the latency. The time-domain structure of the DM-RS (e.g., symbols wherein the DM-RS are located in a slot) may be based on different mapping types.

The Phase Tracking Reference Signals (PT-RSs) enables tracking and compensation of phase variations across the transmission duration. The phase variations may be, for example, due to oscillator phase noise. The oscillator phase noise may become more sever in higher frequencies (e.g., mmWave frequency bands). The base station may configure the PT-RS for uplink and/or downlink. The PT-RS configuration parameters may indicate frequency and time density of PT-RS, maximum number of ports (e.g., uplink ports), resource element offset, configuration of uplink PT-RS without transform precoder (e.g., CP-OFDM) or with transform precoder (e.g., DFT-s-OFDM), etc. The subcarrier number and/or resource blocks used for PT-RS transmission may be based on the C-RNTI of the wireless device to reduce risk of collisions between PT-RS s of wireless devices scheduled on overlapping frequency domain resources.

Figure 13B:
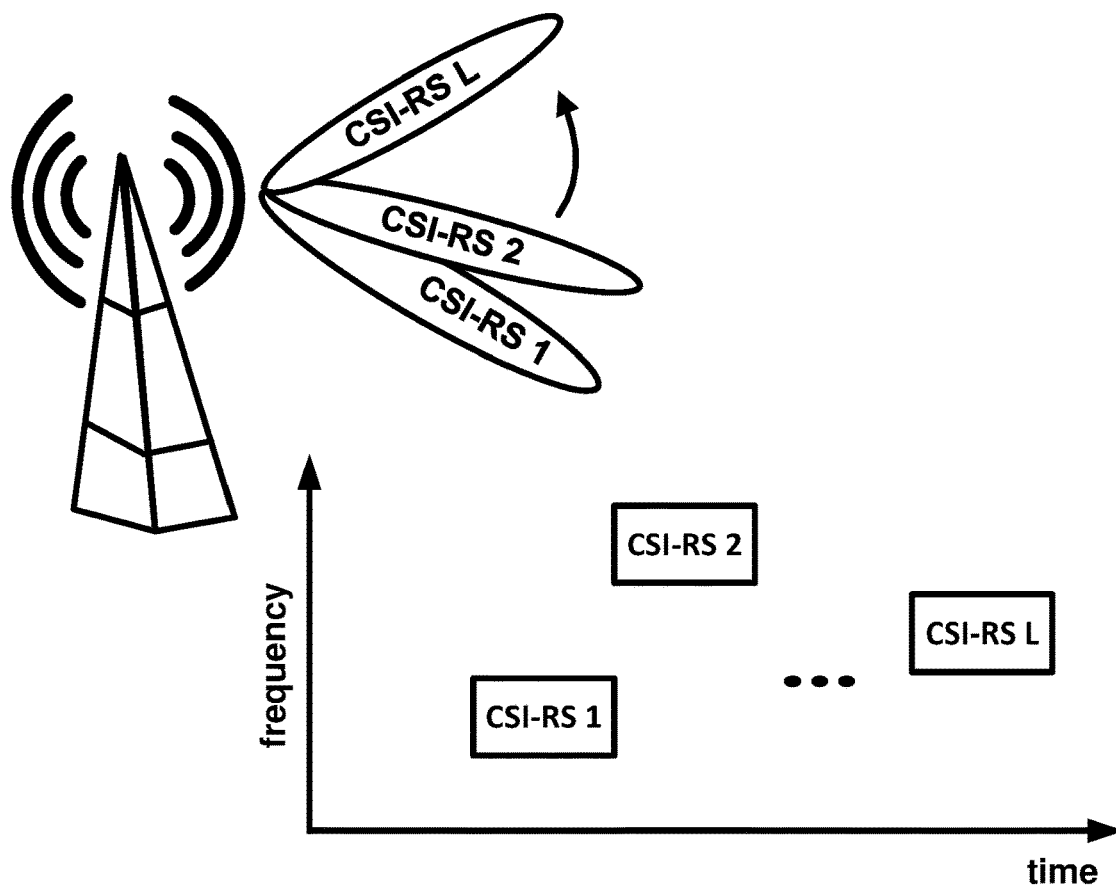
FIG. 13B shows example time and frequency structure of CSI-RS s and their association with beams in accordance with several of various embodiments of the present disclosure.

FIG. 13B shows example time and frequency structure of CSI-RS s and their association with beams in accordance with several of various embodiments of the present disclosure. A beam of the L beams shown in FIG. 13B may be associated with a corresponding CSI-RS resource. The base station may transmit the CSI-RS s using the configured CSI-RS resources and a UE may measure the CSI-RS s (e.g., received signal received power (RSRP) of the CSI-RS s) and report the CSI-RS measurements to the base station based on a reporting configuration. For example, the base station may determine one or more transmission configuration indication (TCI) states and may indicate the one or more TCI states to the UE (e.g., using RRC signaling, a MAC CE and/or a DCI). Based on the one or more TCI states indicated to the UE, the UE may determine a downlink receive beam and receive downlink transmissions using the receive beam. In case of a beam correspondence, the UE may determine a spatial domain filter of a transmit beam based on spatial domain filter of a corresponding receive beam. Otherwise, the UE may perform an uplink beam selection procedure to determine the spatial domain filter of the transmit beam. The UE may transmit one or more SRSs using the SRS resources configured for the UE and the base station may measure the SRSs and determine/select the transmit beam for the UE based the SRS measurements. The base station may indicate the selected beam to the UE. The CSI-RS resources shown in FIG. 13B may be for one UE. The base station may configure different CSI-RS resources associated with a given beam for different UEs by using frequency division multiplexing.

A base station and a wireless device may perform beam management procedures to establish beam pairs (e.g., transmit and receive beams) that jointly provide good connectivity. For example, in the downlink direction, the UE may perform measurements for a beam pair and estimate channel quality for a transmit beam by the base station (or a transmission reception point (TRP) more generally) and the receive beam by the UE. The UE may transmit a report indicating beam pair quality parameters. The report may comprise one or more parameters indicating one or more beams (e.g., a beam index, an identifier of reference signal associated with a beam, etc.), one or more measurement parameters (e.g., RSRP), a precoding matrix indicator (PMI), a channel quality indicator (CQI), and/or a rank indicator (RI).

FIG. 14A, FIG. 14B and FIG. 14C show example beam management processes (referred to as P1, P2 and P3, respectively) in accordance with several of various embodiments of the present disclosure. The P1 process shown in FIG. 14A may enable, based on UE measurements, selection of a base station (or TRP more generally) transmit beam and/or a wireless device receive beam. The TRP may perform a beam sweeping procedure where the TRP may sequentially transmit reference signals (e.g., SSB and/or CSI-RS) on a set of beams and the UE may select a beam from the set of beams and may report the selected beam to the TRP. The P2 procedure as shown in FIG. 14B may be a beam refinement procedure. The selection of the TRP transmit beam and the UE receive beam may be regularly reevaluated due to movements and/or rotations of the UE or movement of other objects. In an example, the base station may perform the beam sweeping procedure over a smaller set of beams and the UE may select the best beam over the smaller set. In an example, the beam shape may be narrower compared to beam selected based on the P1 procedure. Using the P3 procedure as shown in FIG. 14C, the TRP may fix its transmit beam and the UE may refine its receive beam.

A wireless device may receive one or more messages from a base station. The one or more messages may comprise one or more RRC messages. The one or more messages may comprise configuration parameters of a plurality of cells for the wireless device. The plurality of cells may comprise a primary cell and one or more secondary cells. For example, the plurality of cells may be provided by a base station and the wireless device may communicate with the base station using the plurality of cells. For example, the plurality of cells may be provided by multiple base station (e.g., in case of dual and/or multi-connectivity). The wireless device may communicate with a first base station, of the multiple base stations, using one or more first cells of the plurality of cells. The wireless device may communicate with a second base station of the multiple base stations using one or more second cells of the plurality of cells.

The one or more messages may comprise configuration parameters used for processes in physical, MAC, RLC, PCDP, SDAP, and/or RRC layers of the wireless device. For example, the configuration parameters may include values of timers used in physical, MAC, RLC, PCDP, SDAP, and/or RRC layers. For example, the configuration parameters may include parameters for configuring different channels (e.g., physical layer channel, logical channels, RLC channels, etc.) and/or signals (e.g., CSI-RS, SRS, etc.).

Upon starting a timer, the timer may start running until the timer is stopped or until the timer expires. A timer may be restarted if it is running. A timer may be started if it is not running (e.g., after the timer is stopped or after the timer expires). A timer may be configured with or may be associated with a value (e.g., an initial value). The timer may be started or restarted with the value of the timer. The value of the timer may indicate a time duration that the timer may be running upon being started or restarted and until the timer expires. The duration of a timer may not be updated until the timer is stopped or expires (e.g., due to BWP switching). This specification may disclose a process that includes one or more timers. The one or more timers may be implemented in multiple ways. For example, a timer may be used by the wireless device and/or base station to determine a time window [t1, t2], wherein the timer is started at time t1 and expires at time t2 and the wireless device and/or the base station may be interested in and/or monitor the time window [t1, t2], for example to receive a specific signaling. Other examples of implementation of a timer may be provided.

Figure 15:
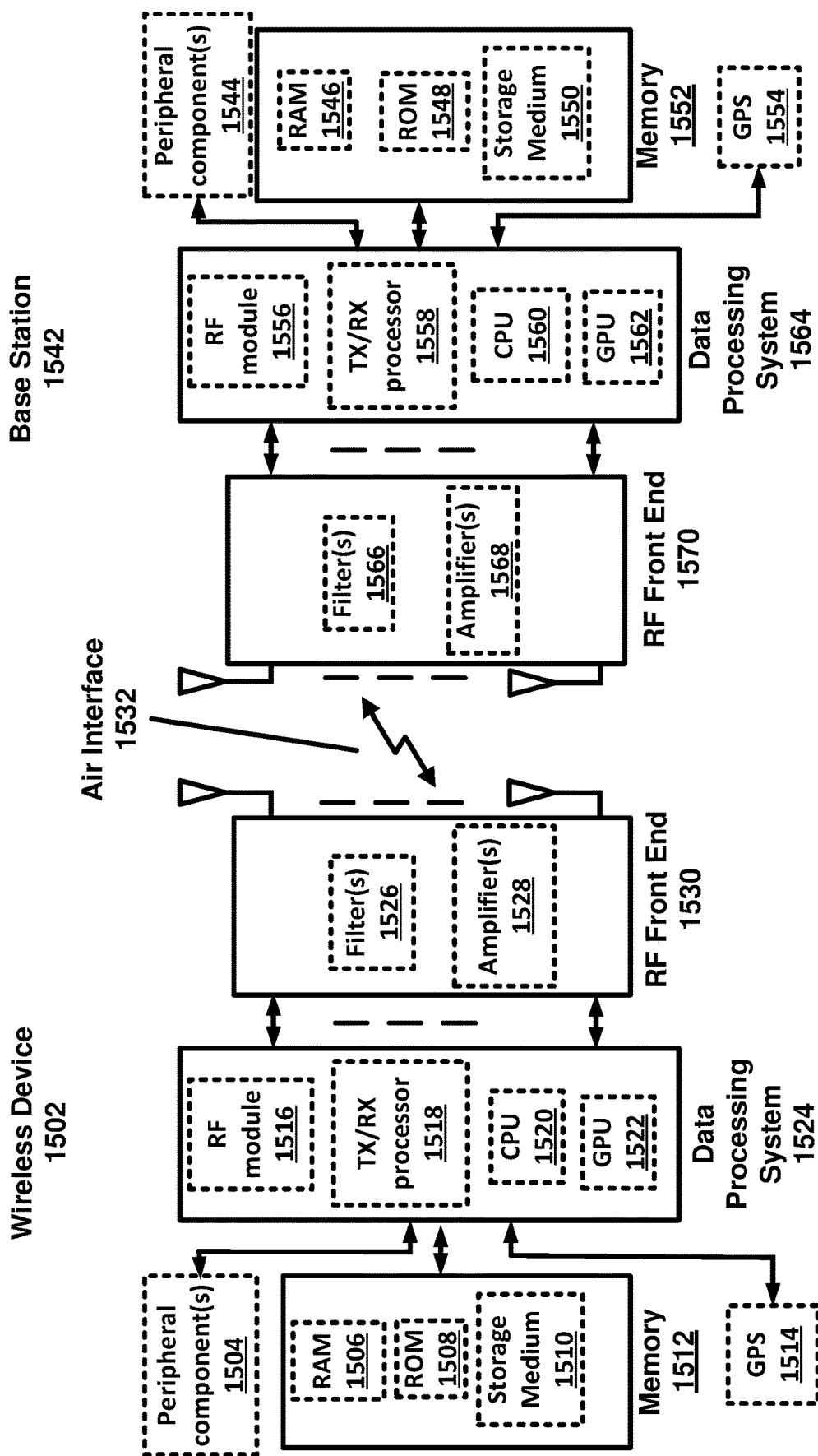
FIG. 15 shows example components of a wireless device and a base station that are in communication via an air interface in accordance with several of various embodiments of the present disclosure.

FIG. 15 shows example components of a wireless device and a base station that are in communication via an air interface in accordance with several of various embodiments of the present disclosure. The wireless device 1502 may communicate with the base station 1542 over the air interface 1532. The wireless device 1502 may include a plurality of antennas. The base station 1542 may include a plurality of antennas. The plurality of antennas at the wireless device 1502 and/or the base station 1542 enables different types of multiple antenna techniques such as beamforming, single-user and/or multi-user MIMO, etc.

The wireless device 1502 and the base station 1542 may have one or more of a plurality of modules/blocks, for example RF front end (e.g., RF front end 1530 at the wireless device 1502 and RF front end 1570 at the base station 1542), Data Processing System (e.g., Data Processing System 1524 at the wireless device 1502 and Data Processing System 1564 at the base station 1542), Memory (e.g., Memory 1512 at the wireless device 1502 and Memory 1542 at the base station 1542). Additionally, the wireless device 1502 and the base station 1542 may have other modules/blocks such as GPS (e.g., GPS 1514 at the wireless device 1502 and GPS 1554 at the base station 1542).

An RF front end module/block may include circuitry between antennas and a Data Processing System for proper conversion of signals between these two modules/blocks. An RF front end may include one or more filters (e.g., Filter(s) 1526 at RF front end 1530 or Filter(s) 1566 at the RF front end 1570), one or more amplifiers (e.g., Amplifier(s) 1528 at the RF front end 1530 and Amplifier(s) 1568 at the RF front end 1570). The Amplifier(s) may comprise power amplifier(s) for transmission and low-noise amplifier(s) (LNA(s)) for reception.

The Data Processing System 1524 and the Data Processing System 1564 may process the data to be transmitted or the received signals by implementing functions at different layers of the protocol stack such as PHY, MAC, RLC, etc. Example PHY layer functions that may be implemented by the Data Processing System 1524 and/or 1564 may include forward error correction, interleaving, rate matching, modulation, precoding, resource mapping, MIMO processing, etc. Similarly, one or more functions of the MAC layer, RLC layer and/or other layers may be implemented by the Data Processing System 1524 and/or the Data Processing System 1564. One or more processes described in the present disclosure may be implemented by the Data Processing System 1524 and/or the Data Processing System 1564. A Data Processing System may include an RF module (RF module 1516 at the Data Processing System 1524 and RF module 1556 at the Data Processing System 1564) and/or a TX/RX processor (e.g., TX/RX processor 1518 at the Data Processing System 1524 and TX/RX processor 1558 at the Data Processing System 1566) and/or a central processing unit (CPU) (e.g., CPU 1520 at the Data Processing System 1524 and CPU 1560 at the Data Processing System 1564) and/or a graphical processing unit (GPU) (e.g., GPU 1522 at the Data Processing System 1524 and GPU 1562 at the Data Processing System 1564).

The Memory 1512 may have interfaces with the Data Processing System 1524 and the Memory 1552 may have interfaces with Data Processing System 1564, respectively. The Memory 1512 or the Memory 1552 may include non-transitory computer readable mediums (e.g., Storage Medium 1510 at the Memory 1512 and Storage Medium 1550 at the Memory 1552) that may store software code or instructions that may be executed by the Data Processing System 1524 and Data Processing System 1564, respectively, to implement the processes described in the present disclosure. The Memory 1512 or the Memory 1552 may include random-access memory (RAM) (e.g., RAM 1506 at the Memory 1512 or RAM 1546 at the Memory 1552) or read-only memory (ROM) (e.g., ROM 1508 at the Memory 1512 or ROM 1548 at the Memory 1552) to store data and/or software codes.

The Data Processing System 1524 and/or the Data Processing System 1564 may be connected to other components such as a GPS module 1514 and a GPS module 1554, respectively, wherein the GPS module 1514 and a GPS module 1554 may enable delivery of location information of the wireless device 1502 to the Data Processing System 1524 and location information of the base station 1542 to the Data Processing System 1564. One or more other peripheral components (e.g., Peripheral Component(s) 1504 or Peripheral Component(s) 1544) may be configured and connected to the data Processing System 1524 and data Processing System 1564, respectively.

In example embodiments, a wireless device may be configured with parameters and/or configuration arrangements. For example, the configuration of the wireless device with parameters and/or configuration arrangements may be based on one or more control messages that may be used to configure the wireless device to implement processes and/or actions. The wireless device may be configured with the parameters and/or the configuration arrangements regardless of the wireless device being in operation or not in operation. For example, software, firmware, memory, hardware and/or a combination thereof and/or alike may be configured in a wireless device regardless of the wireless device being in operation or not operation. The configured parameters and/or settings may influence the actions and/or processes performed by the wireless device when in operation.

In example embodiments, a wireless device may receive one or more message comprising configuration parameters. For example, the one or more messages may comprise radio resource control (RRC) messages. A parameter of the configuration parameters may be in at least one of the one or more messages. The one or more messages may comprise information element (IEs). An information element may be a structural element that includes single or multiple fields.

The fields in an IE may be individual contents of the IE. The terms configuration parameter, IE and field may be used equally in this disclosure. The IEs may be implemented using a nested structure, wherein an IE may include one or more other IEs and an IE of the one or more other IEs may include one or more additional IEs. With this structure, a parent IE contains all the offspring IEs as well. For example, a first IE containing a second IE, the second IE containing a third IE, and the third IE containing a fourth IE may imply that the first IE contains the third IE and the fourth IE.

The usage scenarios for 5G may include enhanced mobile broadband (eMBB), massive machine-type communication (mMTC), and Ultra-Reliable and Low Latency communication (URLLC). A usage scenario that is located at the boundary between mMTC and URLLC may be time sensitive communication (TSC). The mMTC, URLLC and TSC may be associated with IoT use cases. In an example, eMBB, mMTC, URLLC and TSC use cases may be supported in the same network.

In an example, reduced capability wireless devices may support reduced number of UE RX/TX antennas, reduced UE Bandwidth, half-Duplex-FDD, relaxed UE processing time, and relaxed UE processing capability.

In an example, to enable UE power saving and battery lifetime enhancement for reduced capability UEs, the reduced capability UE may support reduced PDCCH monitoring by smaller numbers of blind decodes and CCE limits, extended DRX for RRC Inactive and/or Idle, and RRM relaxation for stationary devices.

In an example, the reduced capability UEs may support coverage recovery to compensate for potential coverage reduction due to the device complexity reduction.

Example embodiments may enable functionality that may allow devices with reduced capabilities to be explicitly identifiable to networks and network operators, and allow operators to restrict their access, if desired.

In an example, System Information (SI) may comprise a MIB and a number of SIBs, which may be divided into Minimum system information (SI) and Other SI.

In an example, minimum SI may comprise basic information required for initial access and information for acquiring any other SI. Minimum SI may comprise MIB and SIB1. MIB may comprise cell barred status information and essential physical layer information of the cell required to receive further system information, e.g., CORESET #0 configuration. MIB may be periodically broadcast on BCH. SIB1 may define the scheduling of other system information blocks and may comprise information required for initial access. SIB1 may be referred to as Remaining Minimum SI (RMSI) and may be periodically broadcast on DL-SCH or sent in a dedicated manner on DL-SCH to UEs in RRC_CONNECTED.

Figure 16:
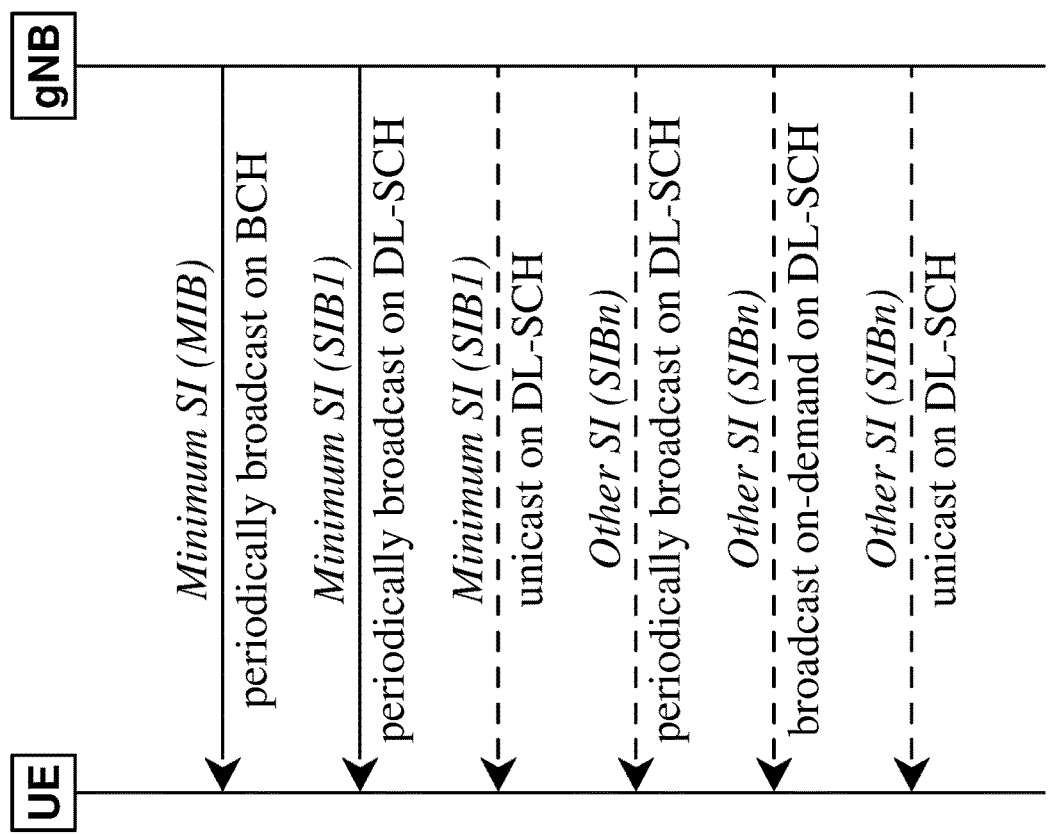
FIG. 16 shows example system information provisioning in accordance with several of various embodiments of the present disclosure.

In an example, other SI may comprise SIBs not broadcast in the Minimum SI. Those SIBs may be periodically broadcast on DL-SCH, may be broadcast on-demand on DL-SCH (e.g., upon request from UEs in RRC_IDLE or RRC_INACTIVE), or may be sent in a dedicated manner on DL-SCH to UEs in RRC_CONNECTED. Other SI may comprise SIB2, SIB3, SIB4, SIB5, SIB6, SIB7, SIB8 and SIB9. SIB2 may comprise cell re-selection information, mainly related to the serving cell; SIB3 may comprise information about the serving frequency and intra-frequency neighboring cells relevant for cell re-selection (including cell re-selection parameters common for a frequency as well as cell specific re-selection parameters); SIB4 may comprise information about other NR frequencies and inter-frequency neighboring cells relevant for cell re-selection (including cell re-selection parameters common for a frequency as well as cell specific re-selection parameters); SIB5 may comprise information about E-UTRA frequencies and E-UTRA neighboring cells relevant for cell re-selection (including cell re-selection parameters common for a frequency as well as cell specific re-selection parameters); SIB6 may comprise an Earthquake and Tsunami Earning System (ETWS) primary notification; SIB7 may comprise an ETWS secondary notification; SIB8 may comprise a Commercial Mobile Alerting System (CMAS) warning notification; and SIB9 may comprise information related to GPS time and Coordinated Universal Time (UTC). Example system information provisioning is shown in FIG. 16.

In an example, if the UE cannot determine the full contents of the minimum SI of a cell by receiving from that cell, the UE may consider that cell as barred.

In an example, the master information block (MIB) message may include the system information transmitted on BCH. Example embodiments may enhance the MIB message and/or one or more parameters in the MIB message. A parameter cellBarred may have comprise a plurality of values comprising a first value Barred and a second value notBarred. The value Barred may indicate the cell is barred (e.g., from accessing or camping on). A parameter dmrs-TypeA-Position may indicate position of (first) DM-RS for downlink. A parameter pdcch-ConfigSIB1 may indicate a common ControlResourceSet (CORESET), a common search space and necessary PDCCH parameters. If the field ssb-SubcarrierOffset indicates that SIB1 is absent, the field pdcch-ConfigSIB1 may indicate the frequency positions where the UE may find SS/PBCH block with SIB1 or the frequency range where the network does not provide SS/PBCH block with SIB1. In an example, a parameter ssb-SubcarrierOffset may indicate a frequency domain offset between SSB and the overall resource block grid in number of subcarriers. This field may indicate that this cell does not provide SIB1 and that there is hence no CORESET #0 configured in MIB. In this case, the field pdcch-ConfigSIB1 may indicate the frequency positions where the UE may (not) find a SS/PBCH with a control resource set and search space for SIB1. In an example, a parameter subCarrierSpacingCommon may indicate subcarrier spacing for SIB1, Msg.2/4 for initial access, paging and broadcast SI-messages. In an example, a parameter systemFrameNumber may indicate 6 most significant bits (MSB) of the 10-bit System Frame Number (SFN). The 4 LSB of the SFN may be conveyed in the PBCH transport block as part of channel coding (e.g., outside the MIB encoding).

In an example, a message SIB1 may contain information relevant when evaluating if a UE is allowed to access a cell and may define the scheduling of other system information. Example embodiments may enhance the SIB1 message and/or one or more parameters in the SIB1 message. It may contain radio resource configuration information that is common for all UEs and barring information applied to a unified access control. In an example, a parameter/IE cellSelectionInfo may comprise parameter for cell selection related to the serving cell. In an example, a parameter servingCellConfigCommon may comprise configuration parameters of the serving cell. In an example, a parameter uac-AccessCategory1-SelectionAssistanceInfo may indicate information used to determine whether Access Category 1 applies to the UE. In an example, a parameter uac-BarringForCommon may indicate common access control parameters for each access category. Common values may be used for all PLMNs, unless overwritten by the PLMN specific configuration provided in uac-BarringPerPLMN- List. The parameters may be specified by providing an index to the set of configurations (uac-BarringInfoSetList).

In an example, an IE UAC-BarringInfoSetIndex may provide the index of the entry in uac-BarringInfoSetList. Value 1 may correspond to the first entry in uac-BarringInfoSetList, value 2 may correspond to the second entry in this list and so on. An index value referring to an entry not included in uac-BarringInfoSetList may indicates no barring.

In an example, an IE UAC-BarringInfoSetList may provide a list of access control parameter sets. An access category can be configured with access parameters according to one of the sets. In an example, a parameter uac-BarringInfoSetList may indicate list of access control parameter sets. An access category may be configured with access parameters corresponding to a particular set by uac-barringInfoSetIndex. Association of an access category with an index that has no corresponding entry in the uac-BarringInfoSetList may be valid configuration and may indicate no barring. In an example, a parameter uac-BarringForAccessIdentity may indicate whether access attempt is allowed for an Access Identity. The leftmost bit, bit 0 in the bit string may correspond to Access Identity 1, bit 1 in the bit string may correspond to Access Identity 2, bit 2 in the bit string may correspond to Access Identity 11, bit 3 in the bit string may correspond to Access Identity 12, bit 4 in the bit string may correspond to Access Identity 13, bit 5 in the bit string may correspond to Access Identity 14, and bit 6 in the bit string may correspond to Access Identity 15. Value 0 may mean that access attempt is allowed for the corresponding access identity. In an example, a parameter uac-BarringFactor may represent the probability that access attempt would be allowed during access barring check. In an example, a parameter uac-BarringTime may indicate the minimum time in seconds before a new access attempt is to be performed after an access attempt was barred at access barring check for the same access category.

In an example, an IE UAC-BarringPerCatList may provide access control parameters for a list of access categories. A parameter accessCategory may indicate an Access Category.

In an example, an IE UAC-BarringPerPLMN-List may provide access category specific access control parameters, which may be configured per PLMN. In an example, a parameter uac-ACBarringListType may indicate access control parameters for an access category valid for a specific PLMN. In an example, a parameter plmn-IdentityIndex may indicate index of the PLMN across the plmn-IdentityList fields included in SIB1.

In an example, an IE ServingCellConfigCommonSIB may be used to configure cell specific parameters of a UE's serving cell in SIB1. In an example, a parameter groupPresence may be present when maximum number of SS/PBCH blocks per half frame equals to 64. The first/leftmost bit may correspond to the SS/PBCH index 0-7, the second bit may correspond to SS/PBCH block 8-15, and so on. Value 0 in the bitmap may indicate that the SSBs according to inOneGroup are absent. Value 1 may indicate that the SS/PBCH blocks are transmitted in accordance with inOneGroup. In an example, a parameter ssb-PositionsInBurst may indicate time domain positions of the transmitted SS-blocks in an SS-burst.

In an example, an IE UplinkConfigCommonSIB may provide common uplink parameters of a cell. A parameter InitialUplinkBWP may indicate the initial uplink BWP configuration for a SpCell (PCell of MCG or SCG).

In an example, an IE BWP-UplinkCommon may be used to configure the common parameters of an uplink BWP. In an example, a parameter pucch-ConfigCommon may indicate cell-specific parameters for the PUCCH of this BWP. In an example, a parameter pusch-ConfigCommon may indicate cell-specific parameters of the PUSCH of this BWP. In an example, a parameter rach-ConfigCommon may indicate configuration of cell specific random access parameters which the UE may use for contention based and contention free random access as well as for contention based beam failure recovery in this BWP. The NW may configure SSB-based RA (and hence RACH-ConfigCommon) for UL BWPs if the linked DL BWPs (same bwp-Id as UL-BWP) are the initial DL BWPs or DL BWPs containing the SSB associated to the initial DL BWP. The network may configure rach-ConfigCommon, when it configures contention free random access (for reconfiguration with sync or for beam failure recovery).

In an example, upon receiving a MIB, a wireless device may store the acquired MIB. The wireless device may be in RRC_IDLE or in RRC_INACTIVE, or the wireless device may be in RRC_CONNECTED while a T311 is running. If the cellBarred in the acquired MIB is set to barred: the wireless device may consider the cell as barred in accordance. If intraFreqReselection is set to notAllowed, the wireless device may consider cell re-selection to other cells on the same frequency as the barred cell as not allowed. Otherwise, if intraFreqReselection is set to Allowed, the wireless device may consider cell re-selection to other cells on the same frequency as the barred cell as allowed.

In an example, a barred Cell may be a cell that a wireless device is not allowed to camp on.

In an example, cell status and cell reservations may be indicated in the MIB or SIB1 message by means of three fields: cellBarred (IE type: "barred" or "not barred"): Indicated in MIB message. In case of multiple PLMNs indicated in SIB1, this field may be common for all PLMNs; cellReservedForOperatorUse (IE type: "reserved" or "not reserved"): Indicated in SIB1 message. In case of multiple PLMNs indicated in SIB1, this field may be specified per PLMN; cellReservedForOtherUse (IE type: "true"): Indicated in SIB1 message. In case of multiple PLMNs indicated in SIB1, this field may be common for all PLMNs.

In an example, depending on operator's policies, deployment scenarios, subscriber profiles, and available services, different criterion may be used in determining which access attempt should be allowed or blocked when congestion occurs in the 5G System. These different criteria for access control may be associated with Access Identities and Access Categories. The 5G system may provide a single unified access control where operators control accesses based on these two.

In an example, in unified access control, an access attempt may be categorized into one or more of the Access Identities and one of the Access Categories. Based on the access control information applicable for the corresponding Access Identity and Access Category of the access attempt, the UE may perform a test whether the actual access attempt may be made or not.

In an example, the unified access control may support extensibility to allow inclusion of additional standardized Access Identities and Access Categories and may support flexibility to allow operators to define operator-defined Access Categories using their own criterion (e.g. network slicing, application, and application server).

In an example, based on operator's policy, the 5G system may be able to prevent UEs from accessing the network using relevant barring parameters that may vary depending on Access Identity and Access Category. Access Identities may be configured at the UE as shown in FIG. 17. Access Categories may be defined by the combination of conditions related to UE and the type of access attempt as shown in FIG. 18. One or more Access Identities and one Access Category may be selected and tested for an access attempt.

In an example, the 5G network may broadcast barring control information (e.g., a list of barring parameters associated with an Access Identity and an Access Category) in one or more areas of the RAN.

In an example, a UE may determine whether or not a particular new access attempt is allowed based on barring parameters that the UE receives from the broadcast barring control information and the configuration in the UE.

In an example, in the case of multiple core networks sharing the same RAN, the RAN may apply access control for the different core networks individually.

In an example, the unified access control framework may be applicable to UEs accessing the 5G CN using E-UTRA and to UEs accessing the 5G CN using NR.

In an example, the unified access control framework may be applicable to UEs in RRC Idle, RRC Inactive, and RRC Connected at the time of initiating a new access attempt (e.g., new session request).

In an example, the 5G system may support means by which the operator can define operator-defined Access Categories to be mutually exclusive.

In an example, the unified access control framework may be applicable to inbound roamers to a PLMN.

In an example, the serving PLMN may provide the definition of operator-defined Access Categories to the UE.

In an example, Access Category 0 may not be barred, irrespective of Access Identities.

In an example, unified access control procedure may be used to perform access barring check for an access attempt associated with a given Access Category and one or more Access Identities.

In an example, after a PCell change in RRC_CONNECTED the UE may defer access barring checks until it has obtained SIB1 from the target cell.

In an example, an RRCSetupRequest message may be used to request the establishment of an RRC connection. In an example, a parameter establishmentCause may provide the establishment cause for the RRCSetupRequest in accordance with the information received from upper layers. The gNB may not be expected to reject an RRCSetupRequest due to unknown cause value being used by the UE. In an example, a ue-Identity may indicate UE identity included to facilitate contention resolution by lower layers.

In an example, once Msg3 is transmitted, the MAC entity may: start the ra-ContentionResolutionTimer and restart the ra-ContentionResolutionTimer at each HARQ retransmission in the first symbol after the end of the Msg3 transmission; monitor the PDCCH while the ra-ContentionResolutionTimer is running regardless of the possible occurrence of a measurement gap.

In an example, once Msg3 is transmitted, if notification of a reception of a PDCCH transmission of the SpCell is received from lower layers: if the C-RNTI MAC CE was included in Msg3: if the Random Access procedure was initiated for beam failure recovery and the PDCCH transmission is addressed to the C-RNTI; or if the Random Access procedure was initiated by a PDCCH order and the PDCCH transmission is addressed to the C-RNTI; or if the Random Access procedure was initiated by the MAC sublayer itself or by the RRC sublayer and the PDCCH transmission is addressed to the C-RNTI and contains a UL grant for a new transmission: the MAC entity may consider this Contention Resolution successful; may stop ra-ContentionResolutionTimer; may discard the TEMPORARY C-RNTI; and may consider this Random Access procedure successfully completed.

In an example, once Msg3 is transmitted, if notification of a reception of a PDCCH transmission of the SpCell is received from lower layers: if the CCCH SDU was included in Msg3 and the PDCCH transmission is addressed to its TEMPORARY C-RNTI: if the MAC PDU is successfully decoded: the MAC entity may stop ra-ContentionResolutionTimer; if the MAC PDU contains a UE Contention Resolution Identity MAC CE; and if the UE Contention Resolution Identity in the MAC CE matches the CCCH SDU transmitted in Msg3: the MAC entity may consider this Contention Resolution successful and finish the disassembly and demultiplexing of the MAC PDU; if this Random Access procedure was initiated for SI request: the MAC entity may indicate the reception of an acknowledgement for SI request to upper layers. Otherwise, the MAC entity may set the C-RNTI to the value of the TEMPORARY_C-RNTI; the MAC entity may discard the TEMPORARY_C-RNTI; the MAC entity may consider this Random Access procedure successfully completed. Otherwise, the MAC entity may discard the TEMPORARY_C-RNTI; the MAC entity may consider this Contention Resolution not successful and discard the successfully decoded MAC PDU.

In an example, if ra-ContentionResolutionTimer expires: the MAC entity may discard the TEMPORARY_C-RNTI; the MAC entity may consider the Contention Resolution not successful.

In an example, if the Contention Resolution is considered not successful: the MAC entity may flush the HARQ buffer used for transmission of the MAC PDU in the Msg3 buffer; the MAC entity may increment PREAMBLE_TRANSMISSION_COUNTER by 1; if PREAMBLE_TRANSMISSION_COUNTER=preambleTransMax+1: the MAC entity may indicate a Random Access problem to upper layers. If this Random Access procedure was triggered for SI request: the MAC entity may consider the Random Access procedure unsuccessfully completed.

In an example, if the Contention Resolution is considered not successful: if the Random Access procedure is not completed: the MAC entity may select a random backoff time according to a uniform distribution between 0 and the PREAMBLE_BACKOFF; if the criteria to select contention-free Random Access Resources is met during the backoff time: the MAC entity may perform the Random Access Resource selection procedure; otherwise the MAC entity may perform the Random Access Resource selection procedure after the backoff time.

In an example, upon completion of the Random Access procedure, the MAC entity may: discard explicitly signaled contention-free Random Access Resources except contention-free Random Access Resources for beam failure recovery request, if any; flush the HARQ buffer used for transmission of the MAC PDU in the Msg3 buffer.

Figure 19:
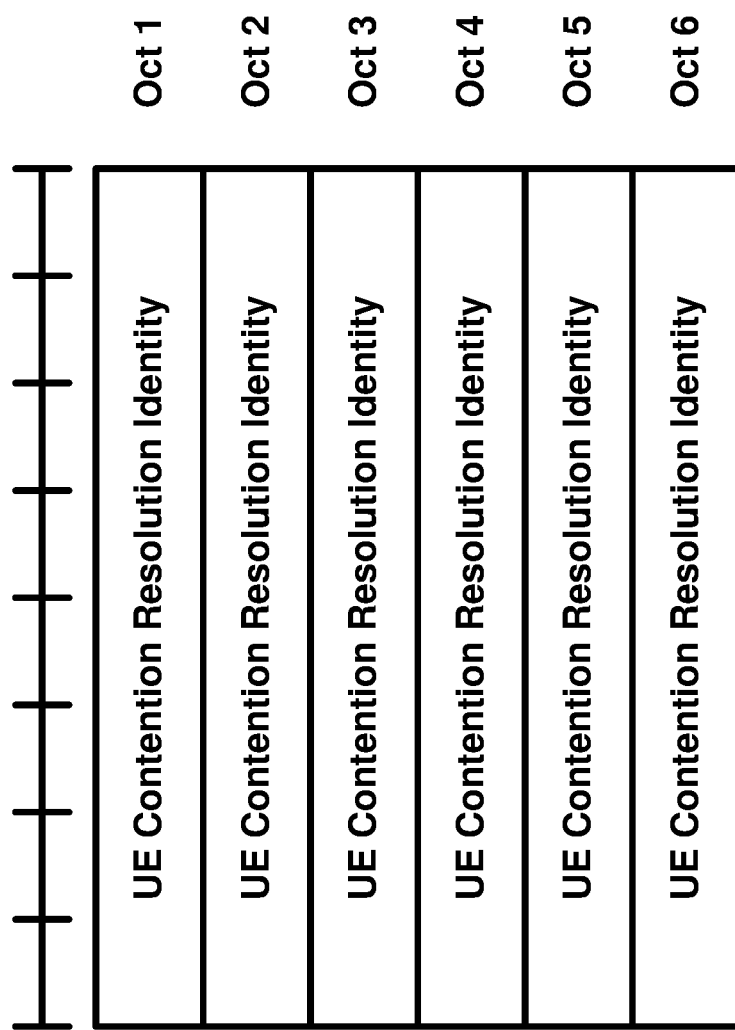
FIG. 19 shows an example wireless device contention resolution MAC CE in accordance with several of various embodiments of the present disclosure.

In an example, a UE Contention Resolution Identity MAC CE may be identified by MAC subheader with an LCID associated with the UE Contention Resolution MAC CE. In an example, as shown in FIG. 19, the UE Contention Resolution MAC CE may have a fixed 48-bit size and may comprise a single field. The field may be for a UE Contention Resolution Identity. This field may contain the UL CCCH SDU. If the UL CCCH SDU is longer than 48 bits, this field may contain the first 48 bits of the UL CCCH SDU.

Reduced capability wireless devices may have lower complexity such as reduced number of TX/RX antennas, reduced UE Bandwidth, half-Duplex-FDD, relaxed UE processing time, and relaxed UE processing capability. Operation of reduced capability wireless devices in a wireless network may degrade the performance (e.g., in terms of throughput, latency, etc.) of normal (e.g., non-reduced capability) wireless devices. There is a need to enhance existing solutions for wireless devices to access/camp on cells in a wireless network. Example embodiments enhance existing processes for wireless devices to access/camp on cells in a wireless network.

In an example, a wireless device may be in an RRC_IDLE state. The wireless device may perform cell search procedures to find one or more cells, camp on the one or more cells and/or access the one or more cells. The wireless device may achieve synchronization and decode PBCH by detecting and decoding SS/PBCH blocks. The PBCH may carry master information block (MIB) that includes part of the minimum system information and the MIB may include search space/CORESET for receiving scheduling information of SIB1 that includes the remaining minimum system information (RMSI).

In an example, a first type of the wireless devices may be associated with the wireless device capabilities (e.g., hardware capabilities). In an example, the first type wireless devices may be reduced capability wireless devices. In an example, the first type wireless device may be wireless devices with reduced complexity features including reduced number of RX/TX antennas and/or reduced bandwidth and/or half-duplex FDD duplexing method and/or relaxed UE processing time and/or relaxed UE processing capability. The reduced capability wireless devices may coexist with non-reduced capability (e.g., wireless devices that are not with reduced capability, e.g., normal wireless devices).

Figure 20A:
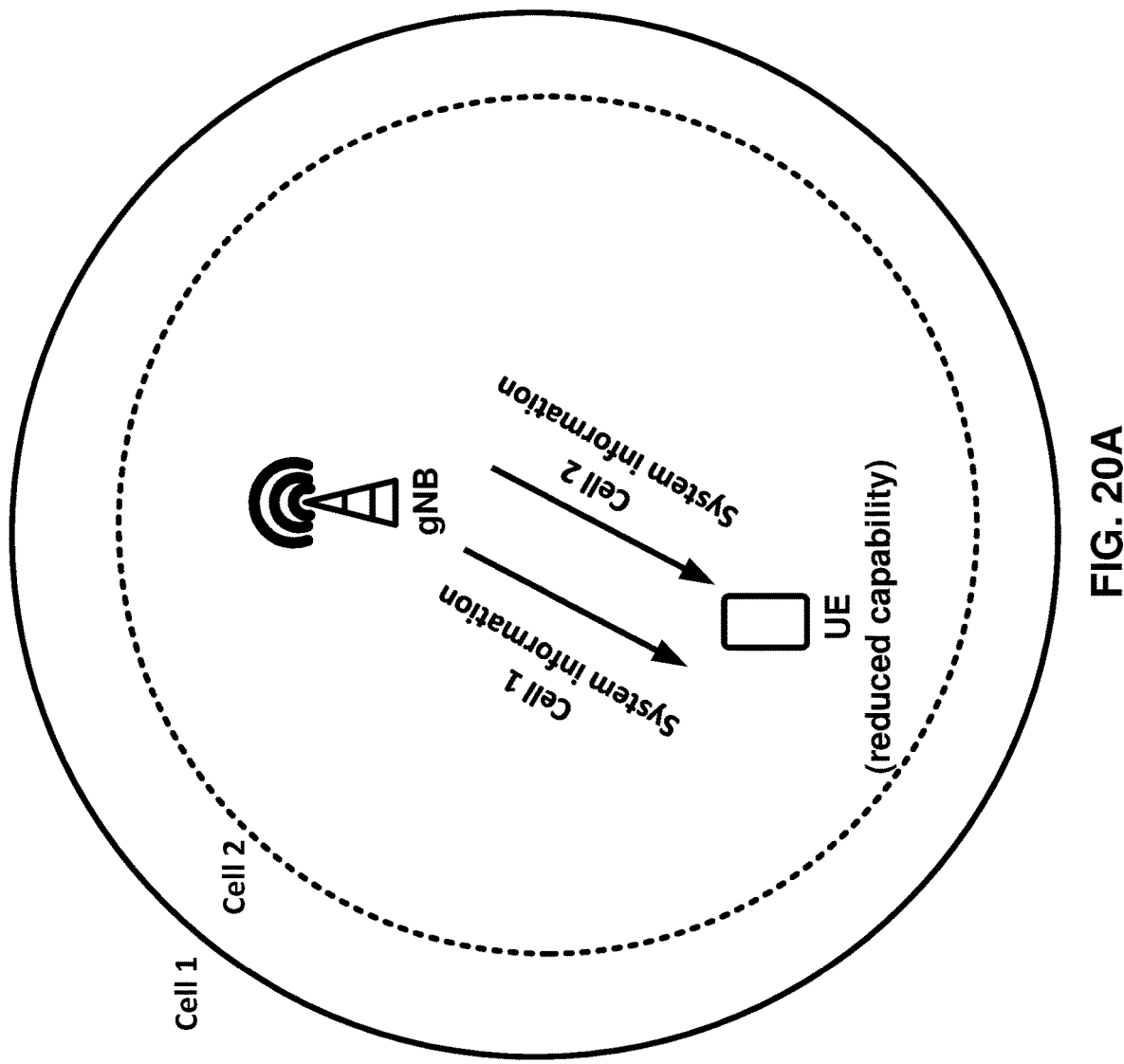
FIG. 20A shows example system information transmission in accordance with several of various embodiments of the present disclosure.
Figure 21:
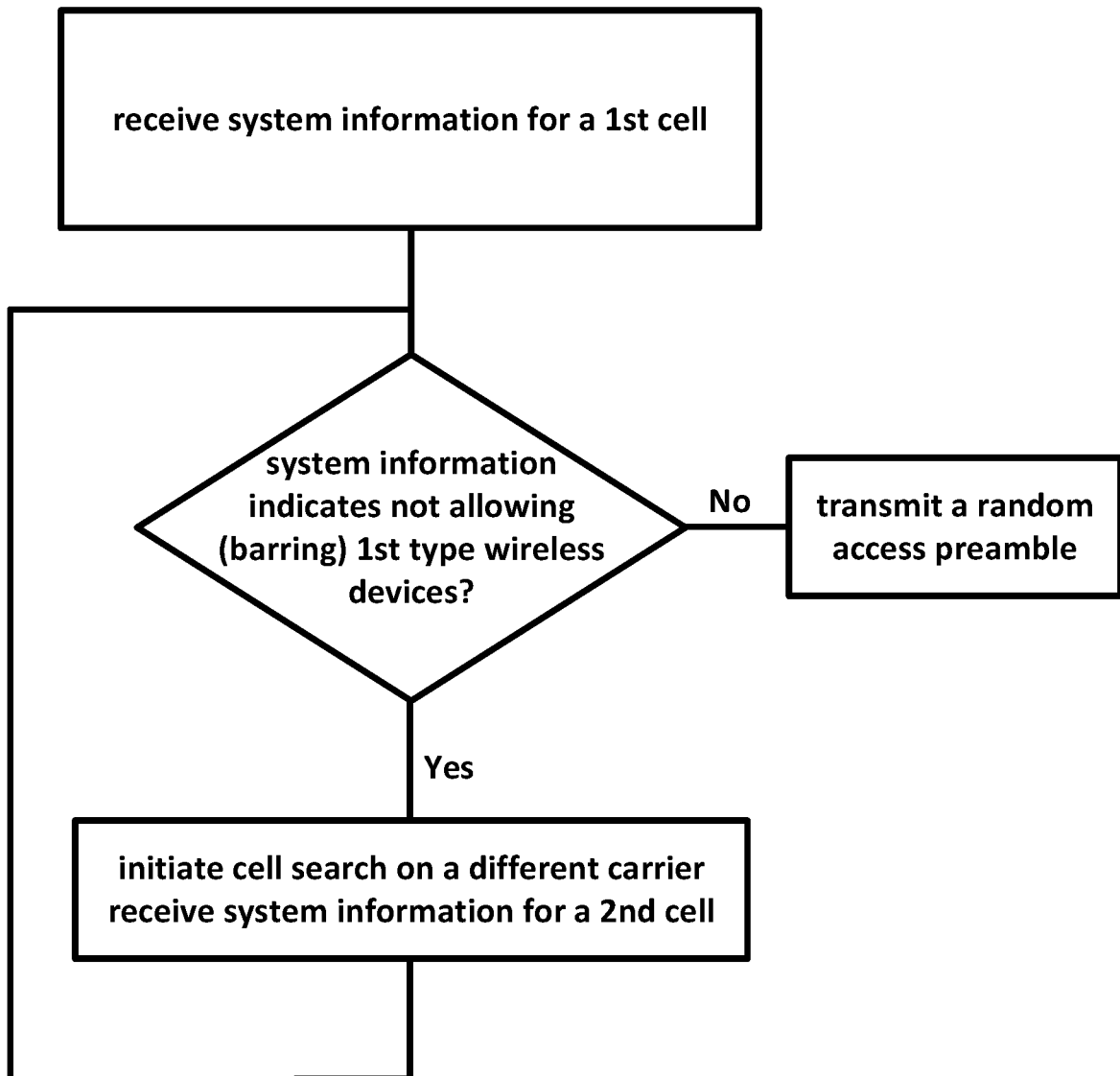
FIG. 21 shows an example process in accordance with several of various embodiments of the present disclosure.

In an example embodiment as shown in FIG. 20A, FIG. 20B and FIG. 21, a wireless device may receive/detect first system information of a first cell. The first system information may be broadcast system information. In an example, the first system information may be minimum system information (e.g., MIB and/or SIB1). The first system information may indicate that wireless devices of a first type (e.g., reduced capability wireless devices) are barred from (e.g., not allowed) accessing the first cell and/or camping on the first cell and/or attaching to the network via the first cell. For example, the first system information may comprise a parameter/IE indicating that the first type wireless devices are barred from the first cell. The first system information, by indicating that the wireless devices of the first type are barred from the first cell, may enable the network to reject and/or not admit the wireless devices of the first type on the first cell. The wireless device may be of the first type (e.g., may be a wireless device with reduced capability). Based on the receiving the first system information indicating that the wireless devices of the first type are barred from (e.g., not allowed) accessing and/or camping on the first cell, the wireless device may determine that the wireless device is barred from (e.g., not allowed) to access and/or camp on the first cell. The wireless device may initiate a cell search on a second carrier frequency based on the determining that the wireless device is barred from the first cell. The wireless device may receive/detect second system information of a second cell based on the cell search. The second system information may be broadcast system information. In an example, the second system information may be minimum system information (e.g., MIB and/or SIB1). In an example, as shown in FIG. 20A, the first cell and the second cell may be provided by the same base station. In an example, as shown in FIG. 20B, the first cell and the second cell may be provided by different base stations. The second system information may indicate that the first type wireless devices (e.g., reduced capability wireless devices) are allowed to access/camp on (e.g., are not barred from accessing/camping on) the second cell. For example, the second system information may comprise a parameter indicating that the first type wireless devices are allowed to access (not barred from) the second cell. For example, the second system information may indicate that the first type wireless devices are allowed to access (not barred from) the second cell based on the second system information not comprising a parameter indicating that the first type wireless devices are barred from the second cell. Based on the receiving the second system information, the wireless device may determine that the wireless device is allowed to access and/or camp on (e.g., is not barred from accessing and/or camping on) the second cell.

The wireless device may transmit a random access preamble on the second cell based on the determining that the wireless device is allow to access (not barred from) the second cell. In an example, the second system information may indicate a plurality of random access occasions/PRACH resources and the wireless device may transmit the random access preamble via a random access occasion/PRACH resource of the plurality of random access occasions/PRACH resources. In an example, the wireless device may start a random access process and transmit the random access preamble to transition from an RRC_IDLE state to an RRC_CONNECTED state or from an RRC_INACTIVE state to an RRC_CONNECTED state.

Figure 22:
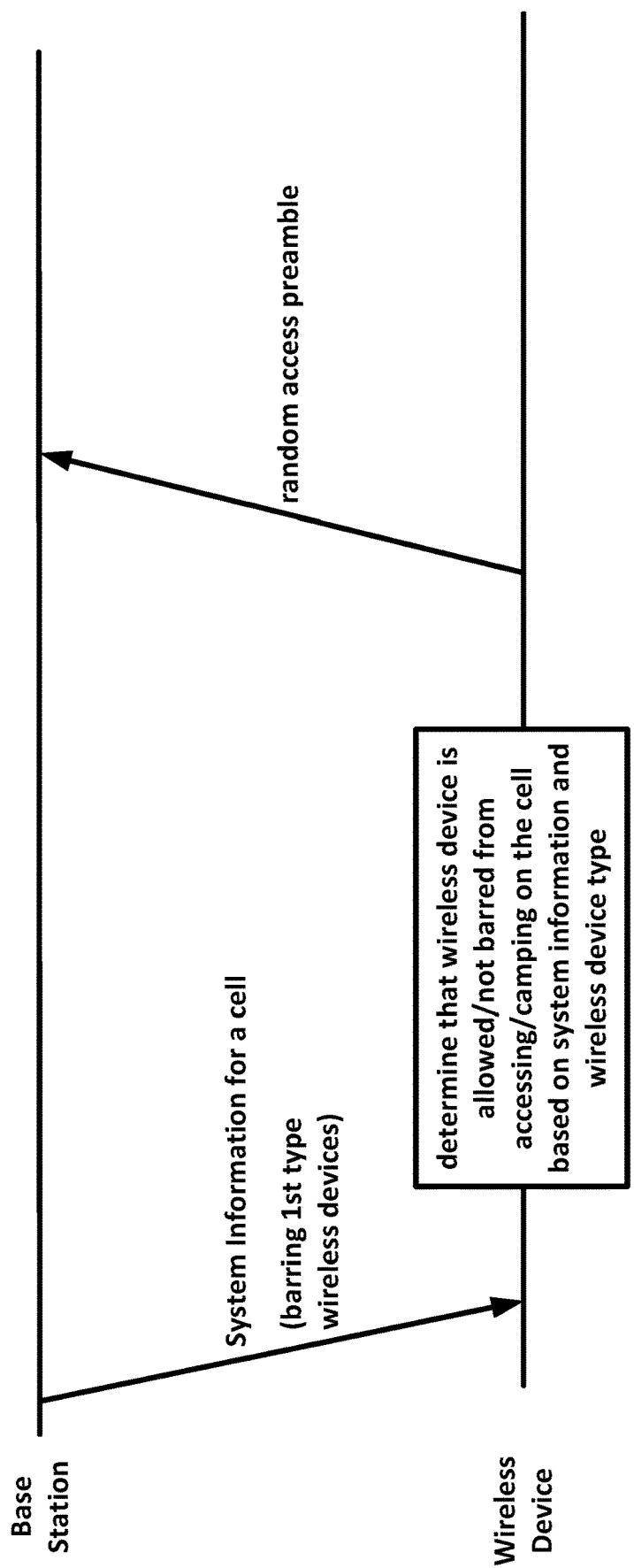
FIG. 22 shows an example process in accordance with several of various embodiments of the present disclosure.

In an example embodiment as shown in FIG. 22, a wireless device may receive/detect system information of a cell. The first system information may be broadcast system information. In an example, the system information may be minimum system information (e.g., MIB and/or SIB1). In an example, the system information may be other system information (e.g., SIB2-SIB9). The system information may indicate that the first type wireless devices (e.g., reduced capability wireless devices) are barred from accessing/camping on (e.g., are not allowed to access/camp on) the cell. For example, the system information may comprise a first parameter/IE, a first value of the first parameter/IE indicating that the barring (not allowing) the first type wireless devices (e.g., reduced capability wireless devices). A second value of the first parameter/IE may indicate barring (e.g., not allowing) wireless devices from accessing/camping on the cell irrespective of the wireless device type (e.g., wireless devices with reduced capability or wireless devices with non-reduced capability, e.g., normal wireless devices).

An example of an enhanced MIB is shown in FIG. 23, wherein a first value (e.g., 1stTypeBarred) of a first parameter/IE (e.g., cellBarred) may indicate that the first type wireless devices (e.g., reduced capability wireless devices) are barred from accessing/camping on the cell. In an example a second value (e.g., a barred) of the first parameter/IE may indicate that wireless devices, irrespective of their type (e.g., wireless devices with reduced capability or wireless devices with non-reduced capability, e.g., normal wireless devices), may be barred from accessing/camping on (e.g., not allowed to access/camp on) on the cell. In an example, a third value (e.g., notBarred) of the first parameter/IE may indicate that the wireless devices are allowed to access/camp on (e.g., not barred from accessing/camping on) the cell irrespective of the wireless device type (e.g., wireless devices with reduced capability or wireless devices with non-reduced capability, e.g., normal wireless devices).

In an example, at least a portion of the system information may be received via a physical downlink channel. In an example, the at least a portion of the system information may be MIB. The physical downlink channel may be associated with a scrambling sequence, for example, may be scrambled using the scrambling sequence. In an example, the scrambling sequence associated with the physical downlink channel may indicate that the first type wireless devices (e.g., reduced capability wireless devices) are barred from accessing/camping on the cell. In an example, the determining that the wireless device is barred form accessing/camping on the cell may be based on the scrambling sequence associated with the physical downlink channel. The physical downlink channel may be a physical broadcast channel (PBCH).

In an example, the system information may indicate barring (e.g., not allowing) access attempts associated with a first access category and/or one or first access identities and the first type wireless devices (e.g., wireless devices with reduced capability) may be associated with the first access category and the one or more access identities. Example access identities and/or access categories are shown in FIG. 17 and FIG. 18. Example embodiments may enhance the access categories and/or access identities, wherein at least an access category and/or at least an access identity is associated with a first type wireless device. (e.g., reduced capability wireless devices). In an example, one or more parameters in SIB1 may indicate that an access category and/or an access identity, associated with the first type wireless devices, e.g., the reduced capability wireless devices, are barred from accessing the cell. Example parameters/IEs of SIB1 (e.g., uac-BarringForCommon and/or uac-BarringPerPLMN-List and/or uac-BarringInfoList, etc.) are shown ion FIG. 24. The process for barring an access category and/or an access identity, associated with the first type wireless devices, e.g., reduced capability wireless devices, may be based on a unified access control process described earlier.

The wireless device may not be the first type wireless device (e.g., the wireless device may not be a reduced capability wireless device) and/or may be a second type wireless device (e.g., a normal wireless device that is not a reduced capability wireless device). Based on the received system information, the wireless device may determine that the wireless device is allowed to access/camp on (e.g., is not barred from accessing/camping on) the cell.

The wireless device may transmit a random access preamble based on the determining that the wireless device is allowed (not barred from) accessing/camping on the cell. In an example, the system information may indicate a plurality of random access occasions/PRACH resources. The wireless device may determine the plurality of random access occasions/PRACH resources and the random access preamble may be transmitted via a random access occasion/PRACH resource of the plurality of random access occasions/PRACH resources. In an example, the wireless device may be in an RRC_IDLE state and the transmitting the random access preamble may be for transitioning from the RRC_IDLE state to an RRC_CONNECTED state.

Figure 25:
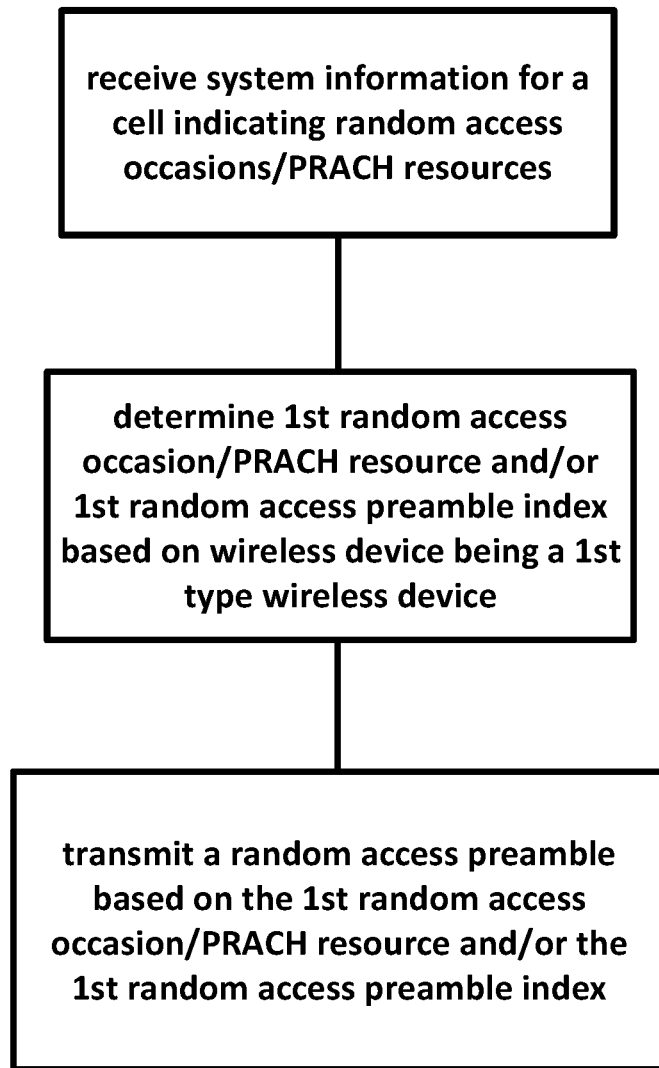
FIG. 25 shows an example process in accordance with several of various embodiments of the present disclosure.
Figure 26:
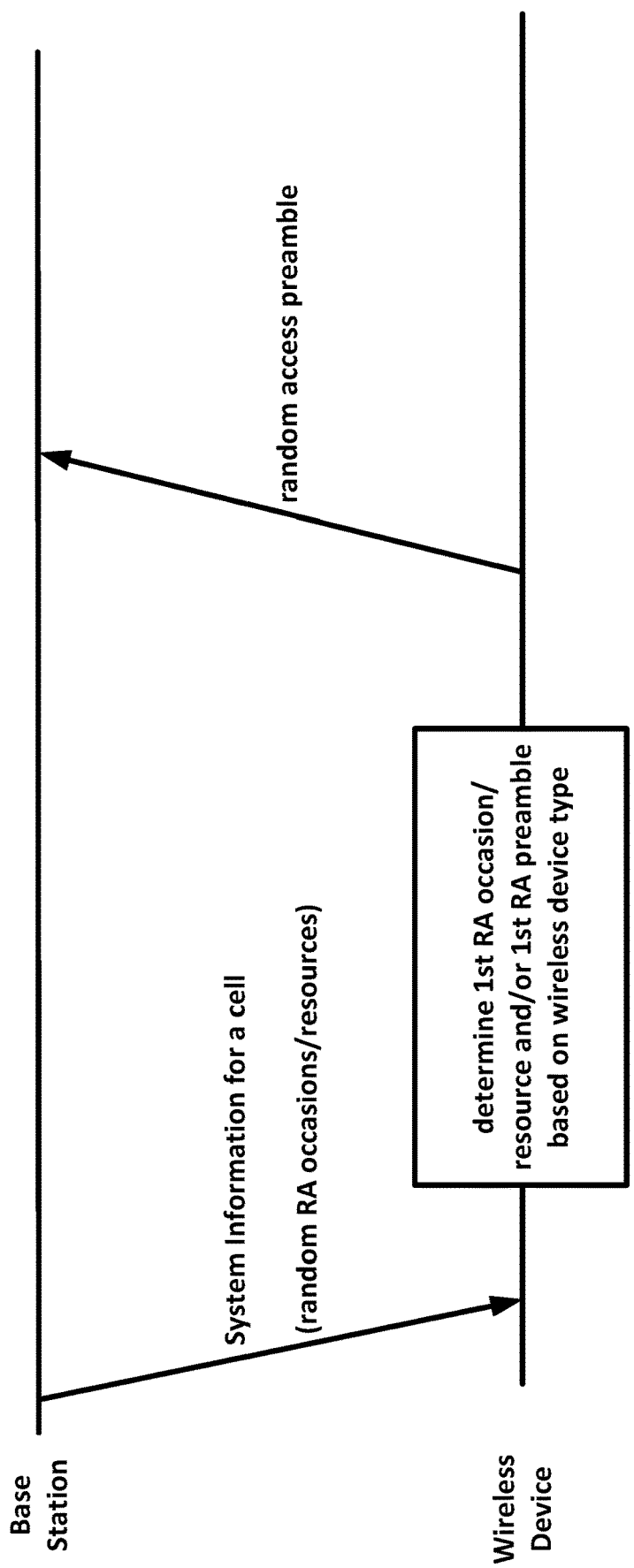
FIG. 26 shows an example process in accordance with several of various embodiments of the present disclosure.

In an example embodiment as shown in FIG. 25 and FIG. 26, a wireless device may receive system information of a cell. In an example, the system information may be minimum system information (e.g., MIB and/or SIB1). The system information may indicate a plurality of random access occasions/PRACH resources. For example, a MIB may comprise parameters one or more parameters indicating search space(s)/CORESET(s) (e.g., CORESET #0) for receiving scheduling information of SIB1 and SIB1 may comprise serving cell configuration parameters comprising RACH configuration parameters for the cell. The serving cell configuration parameters may indicate the plurality of random access occasions/PRACH resources on the cell.

In an example, the MIB may indicate a first CORESET for receiving scheduling information of a first system information block. The first system information block may comprise first system information for first type wireless devices (e.g., reduced capability wireless devices). The MIB may further indicate a second CORESET for receiving scheduling information for wireless devices that are not first type wireless devices (e.g., wireless devices that are not reduced capability wireless devices, e.g., normal wireless devices). In an example, as shown in FIG. 27, the MIB may comprise a first IE (e.g., pdcch-configSIB1FirstType) indicating the first CORESET and a second IE (e.g., pdcch-configSIB1) indicating the second CORESET. In an example, the first CORESET and the second CORESET may be indicated by the same IE in MIB (e.g., pdcch-configSIB1).

In an example, the system information may comprise SIB1 (e.g., remaining minimum system information), wherein the SIB1 may comprise one or more first parameter for first type wireless devices (e.g., reduced capability wireless devices) and one or more second parameters for wireless devices that are not first type wireless devices (e.g., wireless devices that are not reduced capability wireless devices, e.g., normal wireless devices). An example is shown in FIG. 28, wherein a first IE (e.g., ServingCellConfigCommon) may indicate the one or more first parameters and a second IE (e.g., ServingCEllConfigCommonFirstType) may indicate the one or more first parameters. For example, the one or more first parameters may indicate one or more first random access parameters and the one or more second parameters may indicate one or more second random access parameters. For example, the one or more first parameters may indicate one or more first random access occasions/PRACH resources and the one or more second parameters may indicate one or more second random access occasions/PRACH resources. For example, the one or more first parameters may indicate one or more first random access preamble indexes and the one or more second parameters may indicate one or more second random access preamble indexes.

The wireless device may be a first type wireless device (e.g., a reduced capability wireless device). Based on the wireless device being the first type wireless device, the wireless device may determine a first random access occasion/PRACH resource, from the plurality of random access occasions/PRACH resources, and/or the wireless device may determine a first random access preamble index. In an example, the system information may indicate one or more first random access occasions/PACH resources, of the plurality of random access occasions/PRACH resources, associated with first type wireless devices. The wireless device may determine the first random access occasion/PRACH resource form the first plurality of random access occasions/PRACH resources. In an example, the system information may indicate one or more first random access preambles associated with the first type wireless devices. The wireless device may determine the first random access preamble form the one or more first random access preambles. In an example, the first random access occasion/PRACH resource and/or the first random access preamble index may indicate that the wireless device is a first type wireless device (e.g., a reduced capability wireless device).

The wireless device may transmit a random access preamble based on the determining. The wireless device may transmit the random access preamble using the first random access preamble index and/or the wireless device may transmit the random access preamble via the first random access occasion/PRACH resource. Based on the first random access occasion/PRACH resource and/or the first random access preamble index indicating that the wireless device is a first type wireless device, the base station may determine that the wireless device is a first type wireless device. In an example, the wireless device may be in an RRC IDLE state and the transmitting the random access preamble may be for transitioning from the RRC IDLE state to an RRC connected state.

In an example, the first type wireless devices may be allowed on the cell. The wireless device may receive, from the base station, a random access response based on the first type wireless devices being allowed to access/camp on (not being barred from accessing/camping on) the cell. The random access response may comprise a temporary C-RNTI. In an example, a value of the temporary C-RNTI may be based on the wireless device being the first type wireless device.

In an example, the first type wireless devices may not be allowed to access/camp on (e.g., may be barred from accessing/camping on) the cell. Based on the first type wireless devices not being allowed to access/camp on (e.g., being barred from accessing/camping on) the cell, the base station may not transmit a random access response to the wireless device. In an example, based on the first type wireless devices not being allowed to access/camp on (e.g., being barred from accessing/camping on) the cell, the base station may transmit a first type of random access response to the wireless device.

In an example, the first random access occasion/PRACH resource and/or the first random access preamble index may indicate that the wireless device is a first type wireless device (e.g., a reduced capability wireless device) and may further indicate that the wireless device is in a first group of a plurality of groups associated with the first type wireless devices. In an example, the first group may be associated with one or more parameters and/or wireless device capabilities. The first group may indicate a first level of wireless device capability (e.g., in terms of number of RX/TX antennas and/or processing time and/or processing capability and/or supported bandwidth and/or duplexing method, etc.) within the reduced capability wireless devices. The base station may admit or not admit the wireless device (e.g., transmit or not transmit the random access response) based on the first group.

In an example, the first random access occasion/PRACH resource and/or the first preamble index may further indicate that the wireless device supports a first portion of bandwidth of the cell and/or a first portion of an active bandwidth part of the cell and/or a first bandwidth. For example, the first bandwidth may be a maximum supported bandwidth.

Figure 29:
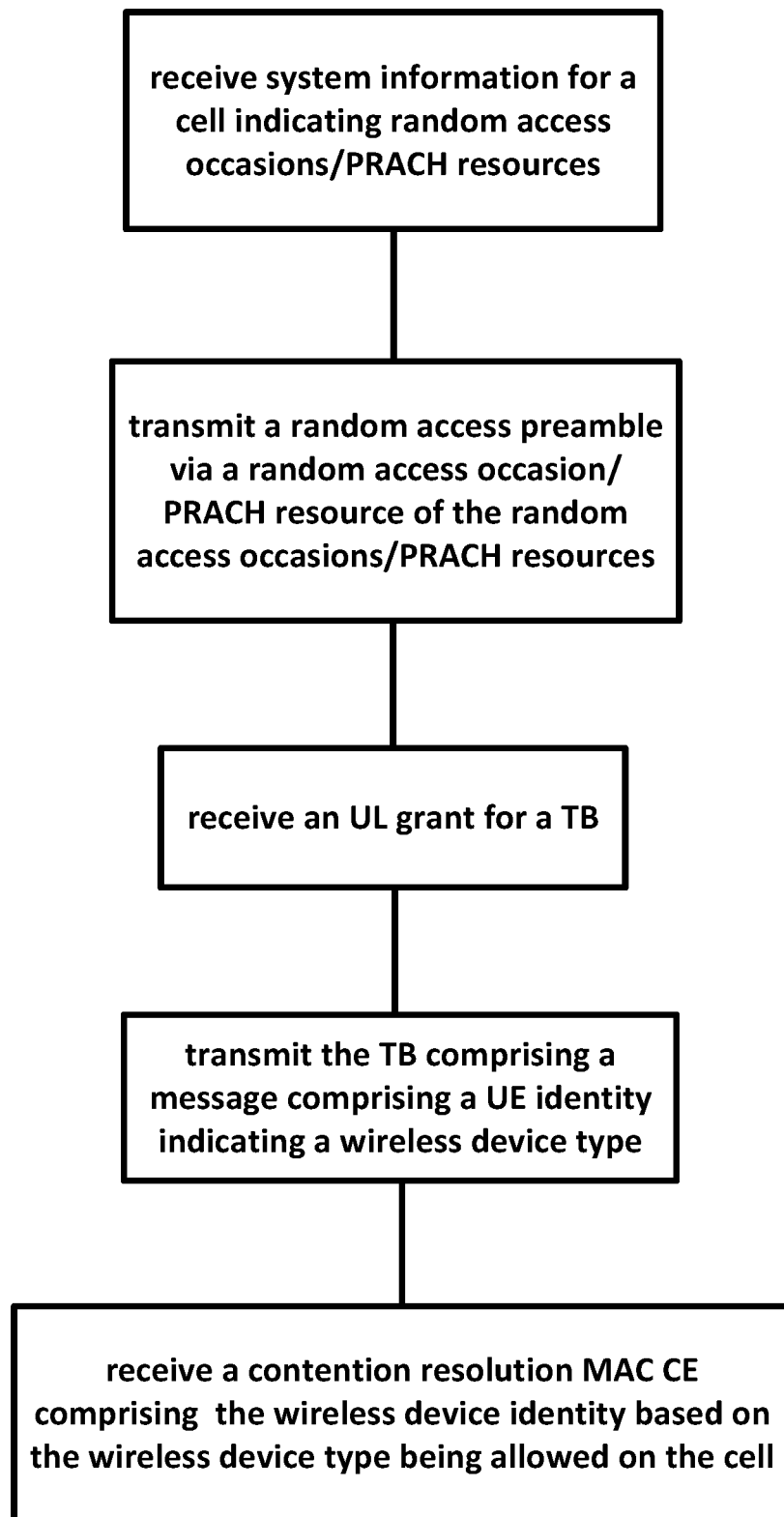
FIG. 29 shows an example process in accordance with several of various embodiments of the present disclosure.
Figure 30:
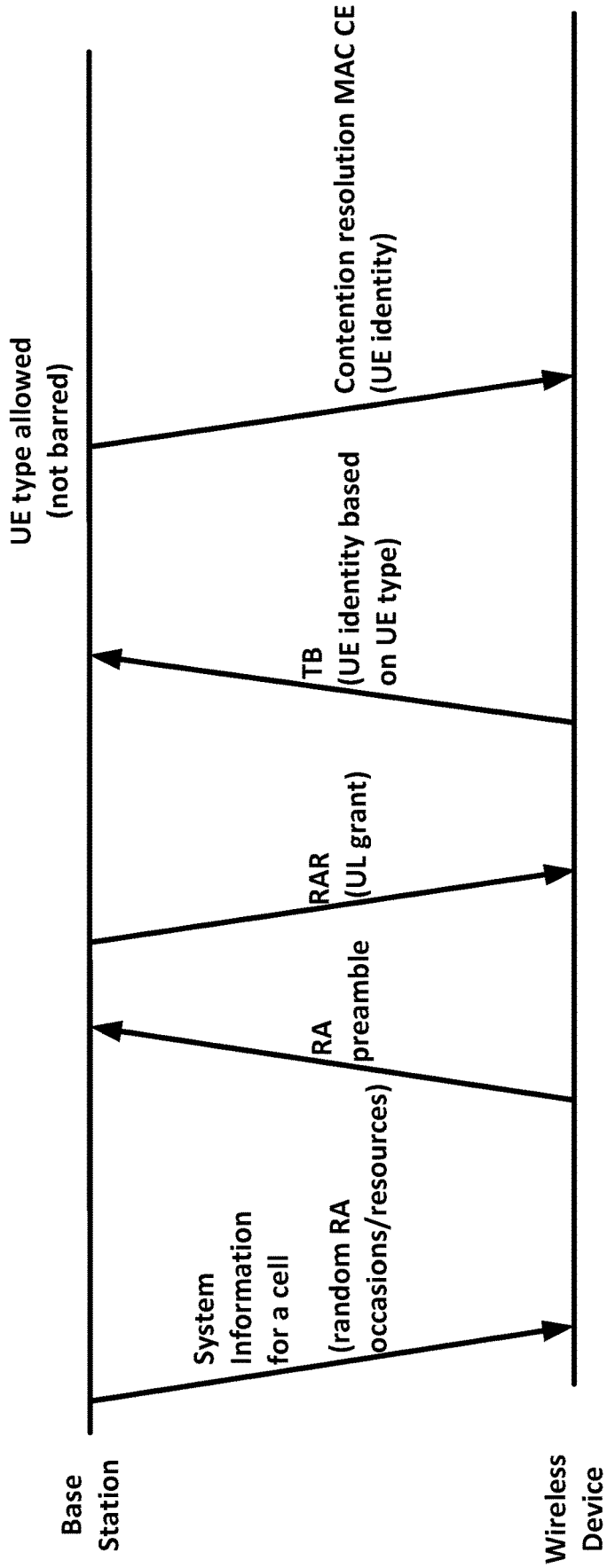
FIG. 30 shows an example process in accordance with several of various embodiments of the present disclosure.

In an example embodiment as shown in FIG. 29 and FIG. 30, a wireless device may receive system information of a cell. In an example, the system information may be minimum system information (e.g., MIB and/or SIB1). The system information may indicate a plurality of random access occasions/PRACH resources. For example, a MIB may comprise one or more parameters indicating search space(s)/CORESET(s) (e.g., CORESET #0) for receiving scheduling information of SIB1 and SIB1 may comprise serving cell configuration parameters comprising RACH configuration parameters for the cell. The serving cell configuration parameters may indicate the plurality of random access occasions/PRACH resources on the cell.

The wireless device may receive the system information and may determine the plurality of the random access occasions/PRACH resources. The wireless device may transmit a random access preamble via a random access occasion/PRACH resource of the plurality of random access occasions/PACH resources. For example, the wireless device may be in an RRC IDLE state and may transmit the random access preamble and start a random access process for transitioning from the RRC IDLE state to an RRC connected state.

The wireless device may receive a random access response. The random access response may comprise an uplink grant for transmission of a transport block (e.g., Msg3). The uplink grant may comprise transmission parameters (e.g., radio resources, MCS, etc.) of the transport block. In an example, the random access response message may further comprise at least one of a timing advance command and a temporary C-RNTI.

The wireless device may transmit the transport block comprising a message. The message may indicate a wireless device identity, wherein the wireless device identity may be based on a wireless device type. The wireless device may determine/select a wireless device identity to include in the message/transport block based on the wireless device type. In an example, the message may be an RRC setup request message. The RRC setup request message may be associated with a common control channel (CCCH) service data unit. In an example, the RRC setup request message may indicate an establishment cause.

The wireless device may be a first type wireless device (e.g., a reduced capability wireless device). The wireless device may include a wireless device identity in the message (e.g., the RRC setup request message) included in the transport block, the wireless device identity corresponding to/indicating the first type wireless device. In an example, the wireless device identity may correspond to/indicate the first type wireless device based on the wireless device identity being within a first range of values. In an example, the first range of values may be a pre-determined range. In an example, the first range of values may be indicated by the system information.

In an example, the wireless device identity may correspond to/indicate a first group of a plurality of group associated with the first type wireless devices. The wireless device identity may indicate that the wireless device is in the first group based on the wireless device identity being in a second range within the first range of values. The first range of values may be associated with the first type wireless devices. The second range may be associated with the first group. In an example, the first group may be associated with one or more parameters and/or one or more wireless device capabilities.

In an example, the wireless device identity (e.g., by indicating the first group) may indicate that the wireless device supports a first portion of the bandwidth of the cell and/or that the wireless device supports a first portion of an active bandwidth part of the cell and/or that the wireless device supports a first bandwidth (e.g., a maximum bandwidth).

The wireless devices with the first type (e.g., the reduced capability wireless devices) may be allowed to access/camp on (e.g., not barred from accessing/camping on) the cell. The base station may receive the transport block comprising the message comprising the wireless identity. The base station may determine that the wireless device is the first type wireless device based on the wireless device identity included in the message. Based on the wireless device type being the first type wireless device and the first type wireless devices being allowed to access/camp on (e.g., not being barred from accessing/campong on) the cell, the wireless device may receive a contention resolution MAC CE comprising the wireless device identity. A C-RNTI of the wireless device may be the temporary C-RNTI, indicated in the random access response, based on the wireless device contention resolution MAC CE comprising the wireless device identity. The wireless device may receive scheduling information via downlink control information that are associated with the C-RNTI (e.g., whose CRC is scrambled with the C-RNTI).

In an example embodiment, a wireless device may detect/receive first system information for a first cell, the first system information indicating barring (not allowing) first type wireless devices from accessing/camping on the first cell. In an example, the first type wireless devices may be reduced capability wireless device. The wireless device may determine, based on the first system information and based on the wireless device being of the first type, that the wireless device is barred (e.g., not allowed) to access/camp on the first cell. The wireless device may initiate a cell search on a second carrier frequency based on the determining that the wireless device is barred to access/camp on the first cell. The wireless device may detect/receive second system information for a second cell, the second system information indicating first type wireless devices are allowed to access/camp on (e.g., not barred from accessing/camping on) the second cell. The wireless device may determine, based on the second system information, that the wireless device is allowed to access/camp on (e.g., not barred from accessing/camping on) the second cell. The wireless device may transmit a random access preamble on the second cell based on the determining that the wireless device is allowed to access/camp on the second cell. In an example, the first system information is broadcast system information. In an example, the second system information is broadcast system information.

In an example embodiment, a wireless device may detect/receive system information for a cell, the system information indicating barring (e.g., not allowing) first type wireless devices from accessing/camping on the cell. The wireless device may determine, based on the system information and based on the wireless device not being of the first type (e.g., being of a second type different from the first type) that the wireless device is allowed to access/camp on the cell (e.g., not barred from accessing/camping on the cell). The wireless device may transmit a random access preamble on the cell based on the determining.

In an example, the first type may be a reduced capabilities wireless device.

In an example, the second type may be a normal wireless device and may not be a reduced capabilities wireless device.

In an example, the wireless device may be in a radio resource control (RRC) idle state; and the transmitting the random access preamble may be for transitioning from the RRC idle state to RRC Connected state.

In an example, the system information may comprise minimum system information.

In an example, the system information may be in a master information block (MIB).

In an example, the system information may be in a system information block (SIB).

In an example, the system information may be in a system information block 1 (SIB1).

In an example, the wireless device may determine random access occasions/PRACH resources based on the system information; and the wireless device may transmit the random access preamble via a first random access occasion/PRACH resource of the random access occasions/PRACH resources.

In an example, the system information may comprise a first parameter, a first value of the first parameter indicating the barring the first type wireless devices from accessing/camping on the cell (e.g., not allowing the first type wireless devices to access/camp on the cell). In an example, a second value of the first parameter may indicate barring wireless devices from accessing/camping on the cell irrespective of the wireless device type (not allowing wireless devices to access/camp on the cell irrespective of the wireless device type).

In an example, a master information block (MIB) may comprise a cellBarred parameter, a first value of the cellBarred parameter indicating the barring the first type wireless devices from accessing/camping on the cell (e.g., not allowing the first type wireless devices to access/camp on the cell). In an example, a second value of the cellBarred parameter may indicate barring wireless devices from accessing/camping on the cell irrespective of the wireless devices type (not allowing wireless devices to access/camp on the cell irrespective of the wireless devices type). In an example, a third value of the cellBarred parameter may indicate that wireless devices are allowed to access/camp on the cell irrespective of the wireless devices type.

In an example, at least a portion of the system information may be transmitted via a downlink physical channel; and a scrambling sequence associated with the downlink physical channel may indicate the barring the first type wireless devices from accessing/camping on the cell (e.g., not allowing the first type wireless devices to access/camp on the cell). In an example, the downlink physical channel may be a physical broadcast channel (PBCH). In an example, the at least a portion of the system information may be MIB.

In an example, the system information may indicate barring (e.g., not allowing) access attempts associated with a first access category and/or one or more first access identities; and the first type wireless devices may be associated with the first access category and/or the one or more first access identities. In an example, one or more first parameters in SIB1 may indicate barring (e.g., not allowing) access attempts associated with the first access category and/or the one or more first access identities.

In an example embodiment, a wireless device may detect/receive system information for a cell, the system information indicating a plurality of random access occasions/PRACH resources on the cell. Based on the wireless device being a first type wireless device, the wireless device may determine a first random access occasion/PRACH resource, from the plurality of random access occasions/PRACH resources, and/or a first random access preamble index. The wireless device may transmit a random access preamble based on the determining.

In an example, the wireless device may be a reduced capability wireless device.

In an example, the first preamble index and/or the first random access occasion/PRACH resource may indicate that the wireless device is a first type wireless device. In an example, the wireless device may receive random access response based on the first type wireless devices being allowed to access/camp on (e.g., not being barred from accessing/camping on) the cell. In an example, the random access response may comprise a temporary C-RNTI, wherein a value of the temporary C-RNTI may be based on the wireless device being the first type wireless device.

In an example, the wireless device may not receive a random access response based on the first type wireless device being barred from accessing/camping on (not being allowed to access/camp on) the cell. In an example, the first preamble index and/or the first random access occasion/PRACH resource may indicate that the wireless device is in a first group of plurality of groups associated with the first type wireless devices. In an example, the first group may be associated with one or more parameters and/or wireless device capabilities. In an example, the first preamble index and/or the first random access occasion/PRACH resource may further indicate that the wireless device supports a first portion of bandwidth of the cell. In an example, the first preamble index and/or the first random access occasion/PRACH resource may further indicate that the wireless device supports a first portion of an active bandwidth part of the cell. In an example, the first preamble index and/or the first random access occasion/PRACH resource may further indicate that the wireless device supports a first bandwidth. In an example, the first bandwidth may be a maximum bandwidth.

In an example, the wireless device may be in a radio resource control (RRC) idle state. The wireless device may transmit the random access preamble for transitioning from the RRC idle state to an RRC Connected state.

In an example, the system information may comprise minimum system information.

In an example, the system information may be in a system information block 1 (SIB1).

In an example, the system information may indicate first plurality of random access occasions/PRACH resources, of the plurality of random access occasions/PRACH resources, associated with first type wireless devices. The first random access occasion/PRACH resource may be from the first plurality of random access occasions/PRACH resources.

In an example, the system information may indicates one or more first random access preambles associated with first type wireless devices. The first random access preamble index may be from the one or more first random access preambles.

In an example, the system information may comprise a MIB. The MIB may indicate: a first CORESET for receiving scheduling information of a first system information block comprising first system information for first type wireless devices; and a second CORESET for receiving scheduling information of a second system information block comprising second information for wireless devices that are not first type wireless devices. In an example, the MIB may comprise: a first IE indicating the first CORESET; and a second IE indicating the second CORESET. In an example, the MIB may comprise an IE may indicate the first CORESET and the second CORESET.

In an example, the system information may comprise a SIB. The SIB1 may comprise one or more first parameters for first type wireless devices; and the SIB1 may comprise one or more second parameters for wireless devices that are not first type wireless devices. In an example, the one or more first parameters indicate first RACH parameters; and the one or more second parameters indicate second RACH parameters.

In an example embodiment, a wireless device may detect/receive system information for a cell, the system information indicating a plurality of random access occasions/PRACH resources on the cell. The wireless device may transmit a random access preamble via a random access occasion/PRACH resource of the plurality of random access occasions/PRACH resources. The wireless device may receive a random access response indicating an uplink grant for transmission of a transport block. The wireless device may transmit the transport block comprising a message comprising a wireless device identity, the wireless device identity indicating a wireless device type. Based on the wireless device type being a first wireless device type and the first wireless device type being allowed on the cell (e.g., wireless devices with the first wireless device type not being barred from accessing/camping on the cell), the wireless device may receive a wireless contention resolution MAC CE comprising the wireless device identifier.

In an example, the message may be a radio resource control (RRC) setup request message. In an example, the RRC setup request message may be based on a common control channel (CCCH) service data unit.

In an example, the first wireless device type may be a reduced capability wireless device.

In an example, the wireless device identity may indicate the first wireless device type based on the wireless device identity being within a first range of values.

In an example, the wireless device identity may indicate that the wireless device is in a first group of plurality of groups associated with the first type wireless devices. In an example, the wireless device identity may indicate that the wireless device is in the first group based on the wireless device identity being in a second range within a first range of values. The first range of values may be associated with the first type wireless devices. The second range may be associated with the first group. In an example, one or more parameters and/or wireless device capabilities may be associated with the first group.

In an example, the wireless device identity may indicate that the wireless device supports a first portion of bandwidth of the cell. In an example, the wireless device identity may indicate that the wireless device supports a first portion of an active bandwidth part of the cell. In an example, the wireless device identity may indicate that the wireless device supports a first bandwidth. In an example, the first bandwidth may be a maximum bandwidth.

In an example, the wireless device may be in an RRC idle state. The transmitting the random access preamble may be for transitioning from the RRC idle state to an RRC Connected state.

In an example, the system information may comprise minimum system information.

In an example, the system information may be in a system information block 1 (SIB1).

In an example, the RRC setup request message may further comprise an establishment cause.

In an example, the random access response further comprises at least one of a timing advance command a temporary C-RNTI. In an example, a C-RNTI of the wireless device is the wireless device identity is the temporary C-RNTI based on the wireless device contention resolution MAC CE comprising the wireless device identity. In an example, the wireless device may receive scheduling information via downlink control information, wherein the downlink control information is associated with the C-RNTI.

Different types of wireless devices, for example wireless devices with reduced capability and wireless devices that are not of reduced capability, may operate in a wireless communications network. An operator may desire to limit access and enforce access control procedures based on the wireless device type including based on whether a wireless device is with reduced capability or is not with reduced capability. Existing solutions may not provide efficient mechanisms for identification and/or indication of a wireless device type (e.g., with reduced capability or not with reduced capability) and enforcing access control mechanism. There is a need to enhance the existing mechanisms for identification/indication of wireless device types and/or access control based on wireless device types. Example embodiments enhance existing mechanisms for identification/indication of wireless device types and/or access control based on wireless device types.

Figure 31:
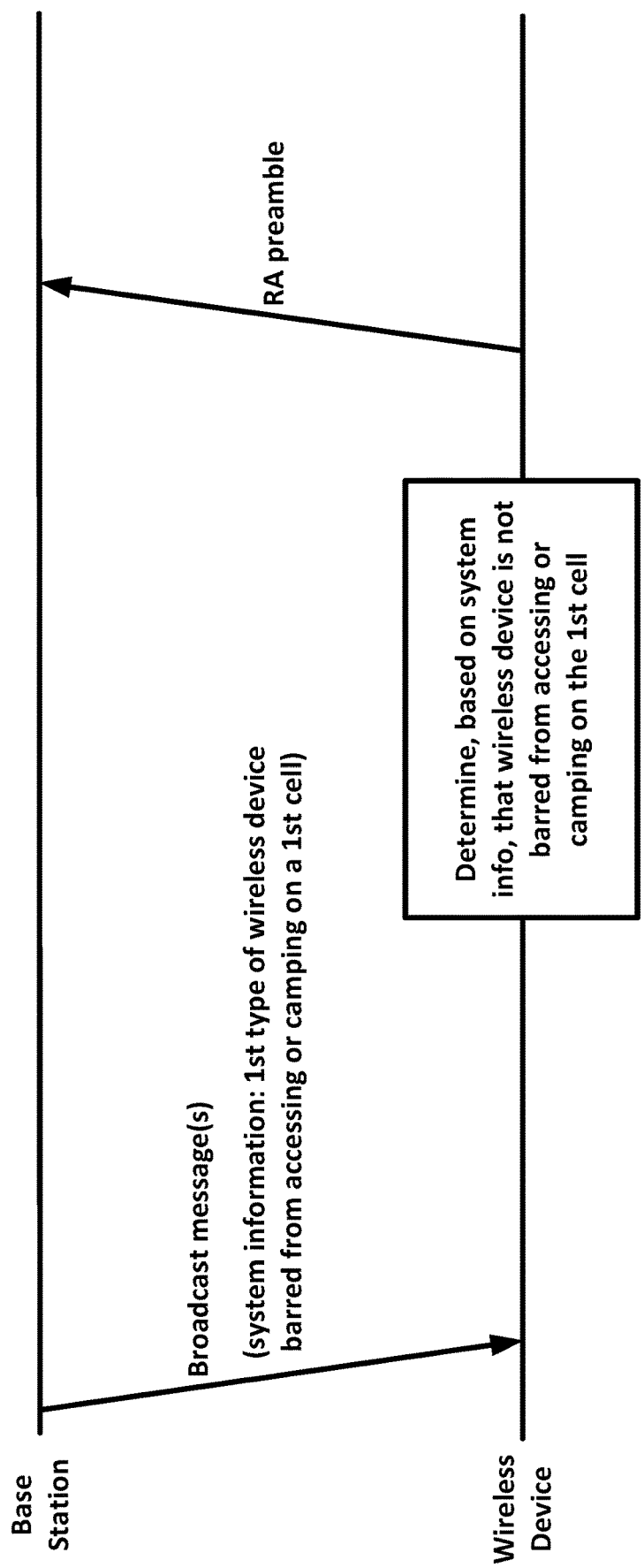
FIG. 31 shows an example process in accordance with several of various embodiments of the present disclosure.

In an example embodiment as shown in FIG. 31, a wireless device may receive one or more broadcast messages (e.g., comprising a master information block (MIB) and/or one or more system information blocks (SIB s), e.g., a SIB1). The one or more broadcast messages may comprise system information. The wireless device may receive at least a portion/subset of the one or more broadcast channels via a broadcast channel (e.g., via a physical broadcast channel, PBCH). In an example, the wireless device may receive a portion/subset of the one or more broadcast messages via a downlink shared channel (e.g., a physical downlink shared channel (PDSCH)).

The system information may indicate that a wireless device of a first type (for example a wireless device with reduced capabilities, e.g., a wireless device that supports reduced number of UE RX/TX antennas and/or reduced UE Bandwidth and/or half-Duplex-FDD and/or relaxed UE processing time and/or relaxed UE processing capability and/or reduced PDCCH monitoring and/or with radio resource management (RRM) relaxation, etc.) is barred from accessing (e.g., is not allowed to access) or camping on a first cell. The system information may indicate that a wireless device that is not of the first type (e.g., is not a reduced capability wireless device) is not barred from accessing or camping on the first cell. In an example, the system information may comprise a parameter indicating that a wireless device of a first type (e.g., wireless device with reduced capability) is barred from accessing or camping on the first cell or that a wireless device that is not of the first type (e.g., is not a wireless device with reduced capability) is not barred from accessing or camping on the first cell. In an example, a first value of the parameter may indicate that a wireless device of the first type (e.g., wireless device with reduced capability) is barred from accessing or camping on the first cell or that a wireless device that is not of the first type (e.g., is not a wireless device with reduced capability) is not barred from accessing or camping on the first cell. In an example, a second value of the parameter may indicate that a wireless device of the first type (e.g., wireless device with reduced capability) is not barred from accessing or camping on the first cell. In an example, a third value of the parameter may indicate that a wireless device (e.g., irrespective of the wireless device type) is barred from accessing or camping on the first cell.

The wireless device may not be of the first type. For example, the wireless device may not be a wireless device with reduced capability. In response to receiving the system information and the wireless device not being of the first type (e.g., the wireless device not being a reduced capability wireless device), the wireless device may determine that the wireless device is not barred from accessing or camping on the first cell and is allowed to access or camp on the first cell.

The wireless device may initiate a random access process for accessing or camping on the first cell. The wireless device may transmit a random access preamble for accessing or camping on the first cell. The wireless device may transmit the random access preamble via the first cell. The wireless device may transmit the random access preamble via a first random access resource. In an example, the system information may comprise random access configuration parameters indicating random access resources comprising the first random access resource used for transmission of the random access preamble. In an example, the random access configuration parameters may indicate a plurality of random access preambles comprising the random access preamble. The wireless device may determine the first random access resource and/or the random access preamble based on the system information. In an example, the wireless device may be in an RRC idle state or an RRC inactive state and the transmission of the random access preamble may be for transitioning from the RRC idle state or the RRC inactive state to an RRC connected state.

Figure 32:
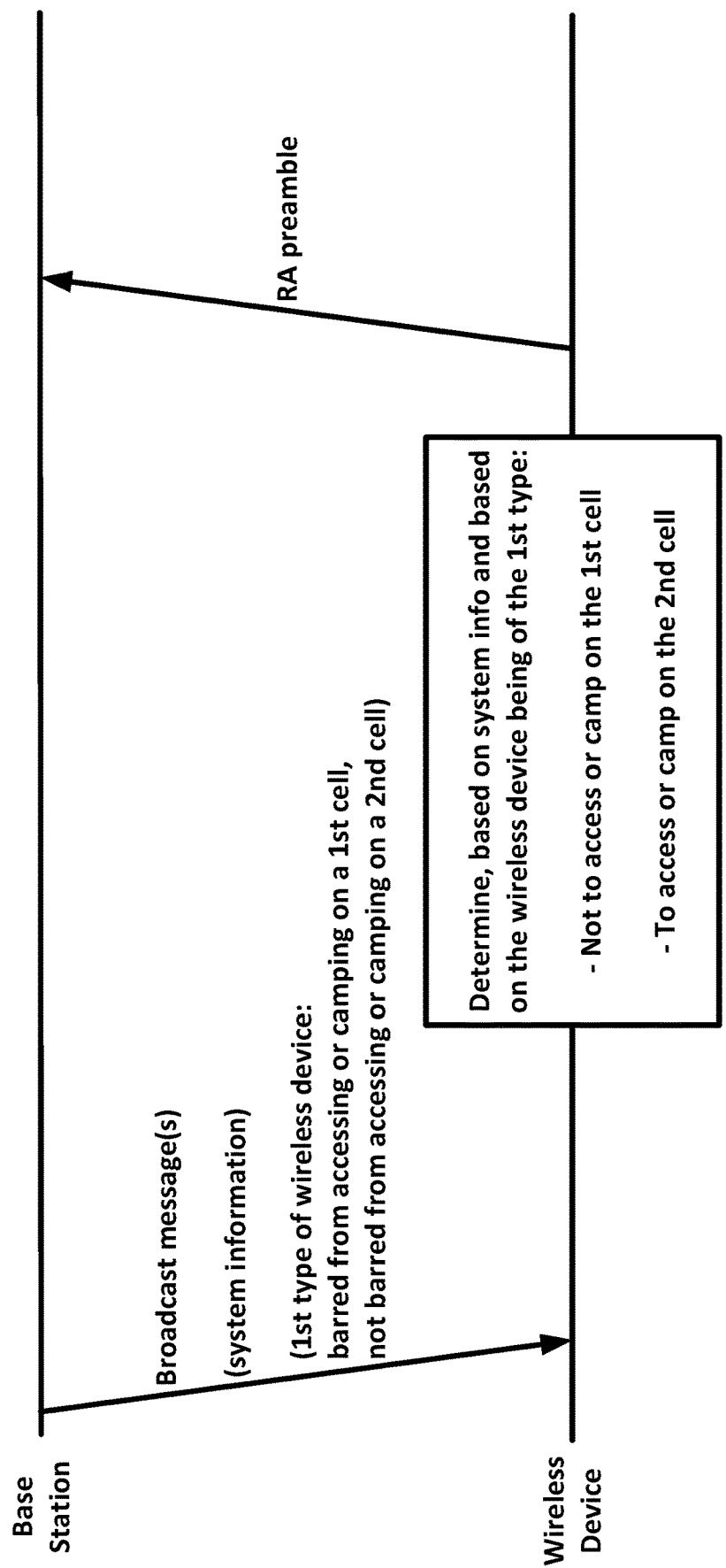
FIG. 32 shows an example process in accordance with several of various embodiments of the present disclosure.

In an example embodiment as shown in FIG. 32, a wireless device may receive one or more broadcast messages (e.g., comprising a master information block (MIB) and/or one or more system information blocks (SIB s), e.g., a SIB1). The one or more broadcast messages may comprise system information. The wireless device may receive at least a portion/subset of the one or more broadcast channels via a broadcast channel (e.g., via a physical broadcast channel, PBCH). In an example, the wireless device may receive a portion/subset of the one or more broadcast messages via a downlink shared channel (e.g., a physical downlink shared channel (PDSCH)).

The system information may indicate that a wireless device of a first type (for example a wireless device with reduced capabilities, e.g., a wireless device that supports reduced number of UE RX/TX antennas and/or reduced UE Bandwidth and/or half-Duplex-FDD and/or relaxed UE processing time and/or relaxed UE processing capability and/or reduced PDCCH monitoring and/or with radio resource management (RRM) relaxation, etc.) is barred from accessing (e.g., is not allowed to access) or camping on a first cell. The system information may indicate that a wireless device of the first type (for example, a wireless device with reduced capability) is not barred from accessing (e.g., is allowed to access) or camping on a second cell. In an example, the system information may comprise first system information, associated with the first cell, and second system information associated with the second cell. The first cell and the second cell may be provided by one base station or may be provided by multiple base stations. For example, the first cell may be provided by a first base station and the second cell may be provided by a second base station.

In an example, the system information (e.g., the first system information) may comprise a parameter indicating that a wireless device of a first type (e.g., wireless device with reduced capability) is barred from accessing or camping on the first cell or that a wireless device that is not of the first type (e.g., is not a wireless device with reduced capability) is not barred from accessing or camping on the first cell. In an example, a first value of the parameter may indicate that a wireless device of the first type (e.g., wireless device with reduced capability) is barred from accessing or camping on the first cell or that a wireless device that is not of the first type (e.g., is not a wireless device with reduced capability) is not barred from accessing or camping on the first cell. In an example, a second value of the parameter may indicate that a wireless device of the first type (e.g., wireless device with reduced capability) is not barred from accessing or camping on the first cell. In an example, a third value of the parameter may indicate that a wireless device (e.g., irrespective of the wireless device type) is barred from accessing or camping on the first cell.

In an example, the system information (e.g., the second system information) may comprise a parameter indicating that a wireless device of a first type (e.g., wireless device with reduced capability) is not barred from accessing or camping on the second cell. In an example, a value of the parameter may indicate that a wireless device of the first type (e.g., wireless device with reduced capability) is not barred from accessing or camping on the second cell.

The wireless device may be of the first type. For example, the wireless device may be a wireless device with reduced capability. In response to receiving the system information and the wireless device being of the first type (e.g., the wireless device being a reduced capability wireless device), the wireless device may determine not to access or camp on the first cell and the wireless device may determine to access or camp on the second cell.

The wireless device may initiate a random access process for accessing or camping on the second cell. The wireless device may transmit a random access preamble for accessing or camping on the second cell and based on the determining to access or camp on the second cell. The wireless device may transmit the random access preamble via the second cell. The wireless device may transmit the random access preamble via a first random access resource. In an example, the system information may comprise random access configuration parameters indicating random access resources comprising the first random access resource used for transmission of the random access preamble. In an example, the random access configuration parameters may indicate a plurality of random access preambles comprising the random access preamble. The wireless device may determine the first random access resource and/or the random access preamble based on the system information. In an example, the wireless device may be in an RRC idle state or an RRC inactive state and the transmission of the random access preamble may be for transitioning from the RRC idle state or the RRC inactive state to an RRC connected state.

Figure 33:
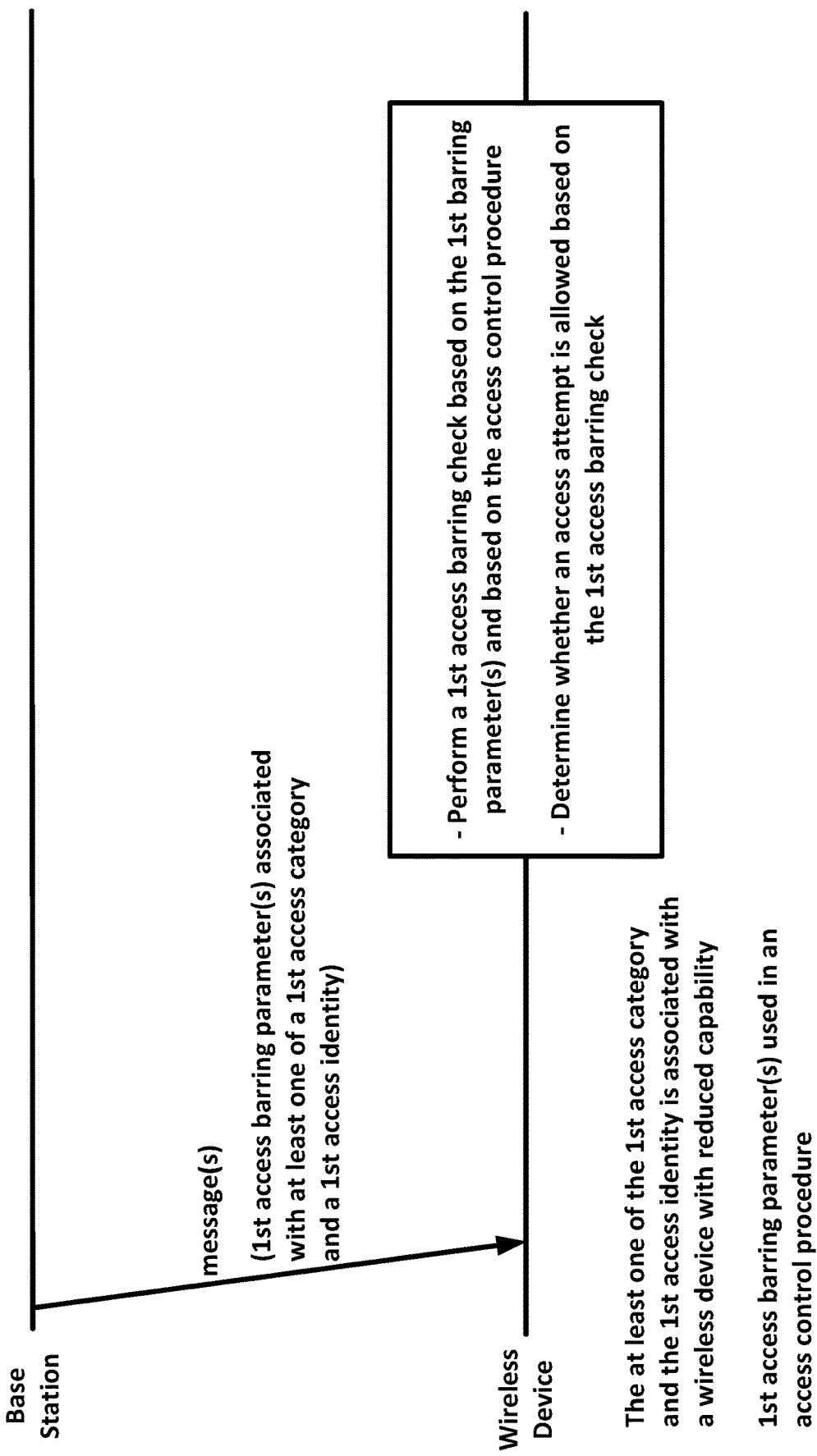
FIG. 33 shows an example process in accordance with several of various embodiments of the present disclosure.

In an example embodiment as shown in FIG. 33, a wireless device may receive one or more messages (e.g., one or more RRC messages, one or more broadcast messages (e.g., a MIB and/or a SIB, e.g., SIB1) comprising system information, etc.) comprising one or more first access barring parameters. In an example, the wireless device may be in an RRC connected state. In an example, the wireless device may be in an RRC idle state or an RRC inactive state.

The one or more first access barring parameters may be associated with at least one of a first access category and a first access identity. In an example, a plurality of access identities, comprising the first access identity, may be associated with the first category. A first parameter of the one or more first access barring parameters may comprise a plurality of bits, wherein a bit, of the plurality of bits, may be associated with the first access identity. A value of the first bit may indicate whether access attempt is allowed for the first access identity. For example, a value of 0 of the first bit may indicate that access attempt is not allowed for the first access identity.

The one or more first access barring parameters may comprise at least one of an access barring factor parameter and a barring time parameter. The access barring factor parameter may indicate a probability that an access attempt is allowed in an access attempt procedure. For example, the wireless device may determine/generate a random number (e.g., using a random number generator) and may determine that an access attempt, in an access barring check, is allowed or barred based on comparing the random number with the probability indicated by the access barring parameter. The barring time parameter may indicate a time duration (e.g., a minimum time duration) between a first access attempt (e.g., via a first access barring check) and a second access attempt (e.g., via a second access barring check). In an example, the one or more first access barring parameters may be specific to a PLMN. In an example, at least a portion/subset of the one more first access barring parameters may be shared among multiple PLMNs.

The at least one of the first access category and the first access identity may be associated with a wireless device of a first type, for example a wireless device with reduced capability (e.g., a wireless device that supports reduced number of UE RX/TX antennas and/or reduced UE Bandwidth and/or half-Duplex-FDD and/or relaxed UE processing time and/or relaxed UE processing capability and/or reduced PDCCH monitoring and/or with radio resource management (RRM) relaxation, etc.). The first access category and the first access identity may be associated with and used in an access control procedure (e.g., a unified access control (UAC) procedure). The access control procedure (e.g., the UAC procedure) may be used to perform access barring check for access attempts associated with a given Access Category and one or more Access Identities. A plurality of access categories, comprising the first access category, and a plurality of access identities, comprising the first access identity, may be associated with and used in the access procedure. In an example, the one or more messages may comprise a plurality access barring parameters, associated with a plurality of access categories and/or access identities, wherein the plurality of access barring parameters comprise the one or more first access barring parameters associated with the at least one of the first access category and the first access identity.

The wireless device may perform an access barring check. The wireless device may perform the access barring check using the one or more first access barring parameters and based on the access control procedure (e.g., the UAC procedure). In an example, the wireless device may the first type wireless device (e.g., the reduced capability wireless device) and the wireless device may perform the access barring check using the one or more first access barring parameters based on the wireless device being of the first type (e.g., of recued capability). The wireless device may determine whether an access attempt is barred or allowed based on the access barring check. The wireless device may attempt to access a cell based on determining that the access attempt is allowed based on the access barring check.

Figure 34:
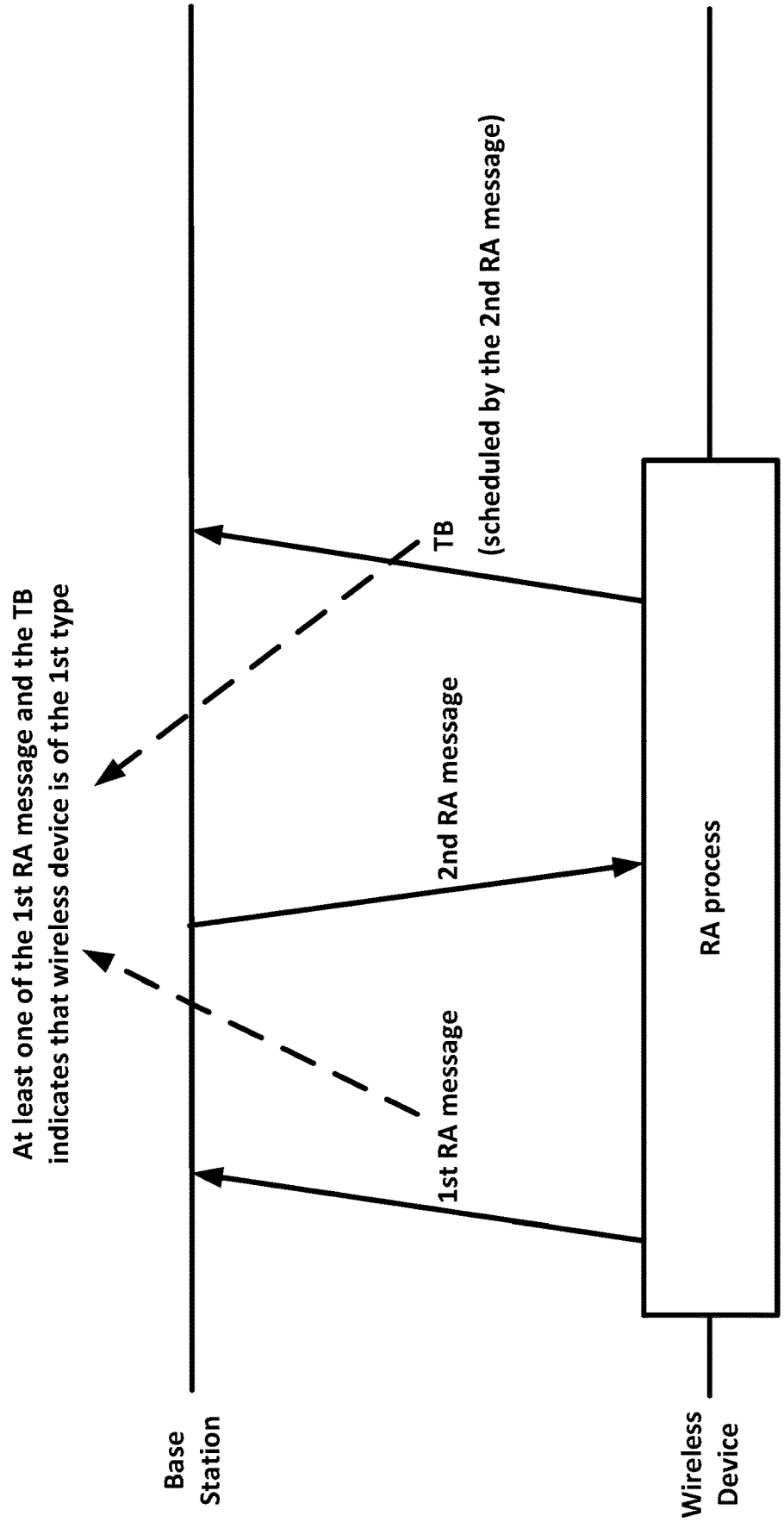
FIG. 34 shows an example process in accordance with several of various embodiments of the present disclosure.

In an example embodiment as shown in FIG. 34, a wireless device may initiate a random access process. The wireless device may be of a first type (for example a wireless device with reduced capabilities, e.g., a wireless device that supports reduced number of UE RX/TX antennas and/or reduced UE Bandwidth and/or half-Duplex-FDD and/or relaxed UE processing time and/or relaxed UE processing capability and/or reduced PDCCH monitoring and/or with radio resource management (RRM) relaxation, etc.). In an example, the wireless device may initiate the random access process while the wireless device is in an RRC connected state. In an example, the wireless device may initiate the random access process while the wireless device is in an RRC idle state or an RRC inactive state. In an example, the wireless device may initiate the random access process for transitioning from an RRC idle state or an RRC inactive state to an RRC connected state. In an example, the wireless device may receive system information (e.g., via one or more broadcast messages) indicating a plurality of random access resources and/or a plurality of random access preambles. The random access process may be initiated by transmitting a random access preamble (e.g., from the plurality of random access resources) via a random access resource (e.g., of the plurality of random access resources).

The wireless device may transmit or receive one or more random access messages for the random access process. The wireless device may transmit a first random access message and may receive a second random access message during the random access process. The transmission of the first random access message may be before or after the reception of the second message. The second random access message may comprise scheduling information for transmission of a transport block and the transport block may be scheduled by the second random access message. At least one of the first random access message and the transport block, scheduled by the second random access message may indicate that the wireless device is of the first type. The transmission of the transport block may be during the random access process or after the random access process is completed.

In an example, the first random access message may be a Msg1 in a four step random access process or a Msg A in a two-step random access process. For example, a random access preamble or a random access resource used for transmission of the random access preamble may indicate that the wireless device is of a first type. For example, the association/mapping between a random access preamble or a random access resource used for transmission of the random access preamble and the wireless device type (e.g., wireless device with reduced capability or wireless device that is not with reduced capability) may be indicated by one or more RRC messages (e.g., based on one or more RRC parameters of the one or more RRC messages) or one or more system information indicated by one or more broadcast messages (e.g., a MIB or a SIB). The wireless device may receive the one or more RRC messages or the one or more broadcast messages and may determine the random access resources and/or the random access preambles associated with and indicating the wireless devices of the first type. The wireless device may use a random access resource/preamble from the random access resources/preambles associated with/indicating that the wireless device is of the first type and may transmit the Msg1/MsgA based on the random access resource/preamble.

In an example, the wireless device may receive system information (e.g., via one or more broadcast messages) and/or configuration parameters (e.g., via one or more RRC messages) indicating a first plurality of random access resources and/or a first plurality of random access preambles are associated with wireless devices of a first type (e.g., reduced capability wireless device). The wireless device may transmit a first random access preamble (e.g., from the first plurality of random access preambles) via a first random access resource (e.g., from the first plurality of random access resources) indicating that the wireless device is of the first type (e.g., reduced capability).

In an example, in response to transmitting the Msg1/MsgA indicating that the wireless device is of the first type (e.g., reduced capability), the wireless device may receive a random access response (RAR). The RAR may indicate that the wireless device is allowed access or is not barred from accessing/camping on a first cell. In an example, receiving the RAR may indicate that the wireless device of the first type (e.g., reduced capability) is allowed access or is not barred from accessing/camping on the first cell. In an example example, a value of an RNTI (e.g., a temporary C-RNTI) that is included in the RAR may be based on the wireless device being of the first type (e.g., reduced capability).

In an example, the first random access message may be a Msg3 in a four step random access process. For example, the Msg3 may comprise an identity of the wireless device indicating that the wireless device is of the first type. The wireless device may receive a contention resolution MAC CE comprising the identity of the wireless device. The reception of the contention resolution MAC CE comprising the wireless device identity may indicate that the wireless devices of the first type is allowed access and/or is not barred from accessing/camping on the first cell.

In an example, the second random access message may be the RAR. The RAR may comprise scheduling information for transmission of the transport block that comprises Msg3. The Msg 3 may comprise an identity of the wireless device indicating that the wireless device is of the first type. The wireless device may receive a contention resolution MAC CE comprising the identity of the wireless device. The reception of the contention resolution MAC CE comprising the wireless device identity may indicate that the wireless devices of the first type is allowed access and/or is not barred from accessing/camping on the first cell.

In an example, the wireless device may receive system information (e.g., via one or more broadcast messages, e.g., a MIB) indicating parameters of a first CORESET and a second CORESET. The first CORESET may be for receiving scheduling information for a first system information block that comprises first system information associated with wireless devices of the first type (e.g., with reduced capability). The second CORESET may be for receiving scheduling information for a second system information block that comprises second system information associated with wireless devices that are not of the first type. For example, one or more first IEs in the system information (e.g., received via MIB) may indicate the first CORESET and one or more second IEs in the system information (e.g., received via MIB) may indicate the second CORESET. For example, an IE in the system information may indicate the first CORESET and the second CORESET.

In an example, the wireless device may receive system information (e.g., via one or more broadcast messages, e.g., a MIB) indicating parameters of a CORESET. The CORESET may be for receiving scheduling information for a system information block that comprises first system information associated with wireless devices of the first type (e.g., with reduced capability) and second system information block that comprises second system information associated with wireless devices that are not of the first type.

In an example, the wireless device may receive system information (e.g., via one or more broadcast messages, e.g., a MIB) comprising one or more first parameters for/associated with the wireless devices of a first type (e.g., reduced capability wireless devices) and one or more second parameters for/associated with the wireless devices that are not of the first type. In an example, the one or more first parameters may indicate first random access parameters and the one or more second parameters may indicate second random access parameters. In an example, the first random access parameters may indicate one or more first random access resources and/or preambles and the one or more second random access parameters may indicate one or more second random access resources and/or preambles.

In accordance with various exemplary embodiments in the present disclosure, a device (e.g., a wireless device, a base station and/or alike) may include one or more processors and may include memory that may store instructions. The instructions, when executed by the one or more processors, cause the device to perform actions as illustrated in the accompanying drawings and described in the specification. The order of events or actions, as shown in a flow chart of this disclosure, may occur and/or may be performed in any logically coherent order. In some examples, at least two of the events or actions shown may occur or may be performed at least in part simultaneously and/or in parallel. In some examples, one or more additional events or actions may occur or may be performed prior to, after, or in between the events or actions shown in the flow charts of the present disclosure.

Figure 35:
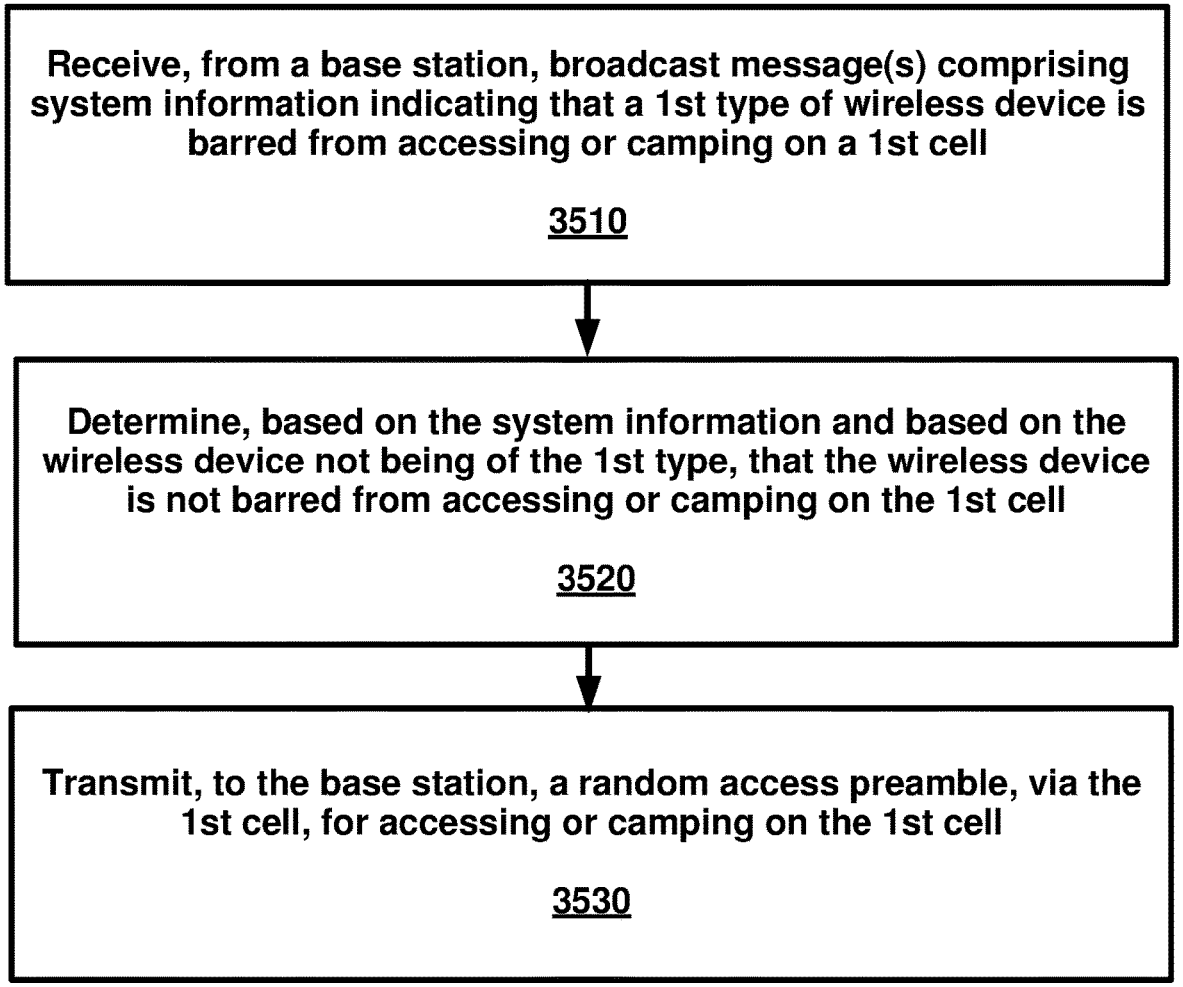
FIG. 35 shows an example flow diagram in accordance with several of various embodiments of the present disclosure.

FIG. 35 shows an example flow diagram in accordance with several of various embodiments of the present disclosure. At 3510, a wireless device may receive, from a base station, one or more broadcast messages comprising system information indicating that a first type of wireless device is barred from accessing or camping on a first cell. At 3520, the wireless device may determine, based on the system information and based on the wireless device not being of the first type, that the wireless device is not barred from accessing or camping on the first cell. At 3530, the wireless device may transmit to the base station, a random access preamble, via the first cell, for accessing or camping on the first cell.

In an example embodiment, the first type of the wireless device may be a reduced capability wireless device.

In an example embodiment, the one or more broadcast messages, received at 3510, may comprise at least one of a master information block and a system information block.

In an example embodiment, the wireless device may be in a radio resource control (RRC) idle state or an RRC inactive state. The transmitting the random access preamble, at 3530, may be for transitioning from the RRC idle state or the RRC inactive state to an RRC connected state.

In an example embodiment, the wireless device may determine random access resources based on the system information received at 3510. The transmitting the random access preamble, at 3530, may be via a first random access resource of the random access resources. In an example embodiment, the system information, received at 3510, may comprise random access configuration parameters indicating the random access resources.

In an example embodiment, the system information, received at 3510, may comprise a parameter with a first value. The first value of the parameter may indicate that the first type of wireless device is barred from accessing or camping on the first cell. In an example embodiment, a second value of the parameter may indicate that the first type of wireless device is not barred from accessing or camping on the first cell. In an example embodiment, a third value of the parameter may indicate that a wireless device is barred from accessing or camping on the first cell irrespective of a wireless device type.

Figure 36:
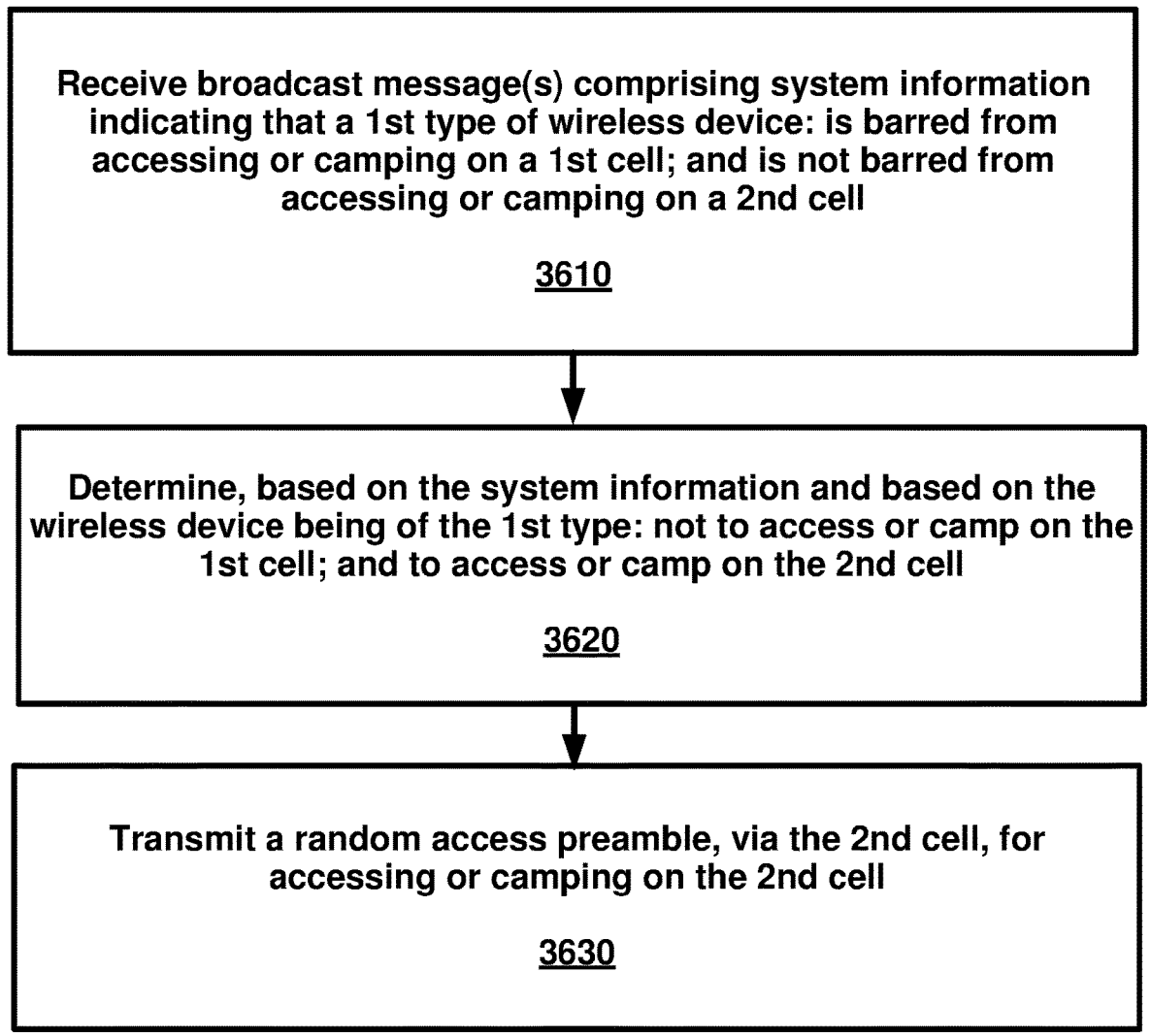
FIG. 36 shows an example flow diagram in accordance with several of various embodiments of the present disclosure.

FIG. 36 shows an example flow diagram in accordance with several of various embodiments of the present disclosure. At 3610, a wireless device may receive one or more broadcast messages comprising system information indicating that: a first type of wireless device is barred from accessing or camping on a first cell; and the first type of wireless device is not barred from accessing or camping on a second cell. At 3620, the wireless may determine, based on the system information and based on the wireless device being of the first type: not to access or camp on the first cell; and to access or camp on the second cell. At 3630, the wireless device may transmit a random access preamble, via the second cell, for accessing or camping on the second cell.

In an example embodiment, the first type of wireless device may be a reduced capability wireless device.

In an example embodiment, the one or more broadcast messages, received at 3610, may comprise at least one of a master information block and a system information block.

In an example embodiment, the wireless device may be in a radio resource control (RRC) idle state or an RRC inactive state. The transmitting the random access preamble, at 3630, may be for transitioning from the RRC idle state or the RRC inactive state to an RRC connected state.

In an example embodiment, the wireless device may determine random access resources based on the system information received at 3610. The transmitting the random access preamble, at 3630, may be via a first random access resource of the random access resources. In an example, the system information, received at 3610, may comprise random access configuration parameters indicating the random access resources.

In an example embodiment, the system information, received at 3610, may comprise a parameter with a first value, the first value of the parameter indicating that the first type of wireless device is barred from accessing or camping on the first cell. In an example embodiment, a second value of the parameter may indicate that the first type of wireless device is not barred from accessing or camping on the first cell. In an example, a third value of the parameter may indicate that a wireless device is barred from accessing or camping on the first cell irrespective of a wireless device type.

In an example embodiment, the first cell and the second cell may be provided by a first base station.

In an example embodiment, the first cell may be provided by a first base station; and the second cell may be provided by a second base station.

FIG. 37 shows an example flow diagram in accordance with several of various embodiments of the present disclosure. At 3710, a wireless device may receive one or more messages comprising one or more first access barring parameters associated with at least one of a first access category and a first access identity. The at least one of the first access category and the first access identity may be associated with a wireless device with reduced capability. The one or more first access barring parameters may be used in an access control procedure. At 3720, the wireless device may perform a first access barring check based on the one or more first access barring parameters and based on the access control procedure. At 3730, the wireless device may determine whether an access attempt is barred or allowed based on the access barring check.

In an example embodiment, the one or more first access barring parameters, received at 3710, may comprise at least one of: an access barring factor parameter; and a barring time parameter. In an example embodiment, the access barring factor parameter may indicate a probability that the access attempt is allowed based on the first access barring check. The barring time parameter may indicate a time duration to a second access attempt after a first access attempt, based on the first access barring check, being barred.

In an example embodiment, the wireless device may be of a reduced capability type. The performing the first access barring check based on the one or more first access barring parameters, at 3720, may be based on the wireless device being of the reduced capability type.

In an example embodiment, the one or more access barring parameters, received at 3710, may be specific to a first public land mobile network.

In an example embodiment, the one or more messages, received at 3710, may comprise a plurality of access barring parameters, comprising the one or more first access barring parameters, associated with a plurality of access categories comprising the first access category.

In an example embodiment, the one or more messages, received at 3710, may comprise one or more broadcast messages. In an example embodiment, the one or more broadcast messages may comprise at least one of a master information block and a system information block.

In an example embodiment, the first access identity may be one of a plurality of access identities associated with the first access category. The first parameter, of the one or more first access barring parameters, may comprise a plurality of bits. A first bit, of the plurality of bits, may be associated with the first access identity. A value of the first bit may indicate whether access attempt is allowed for the first access identity.

Figure 38:
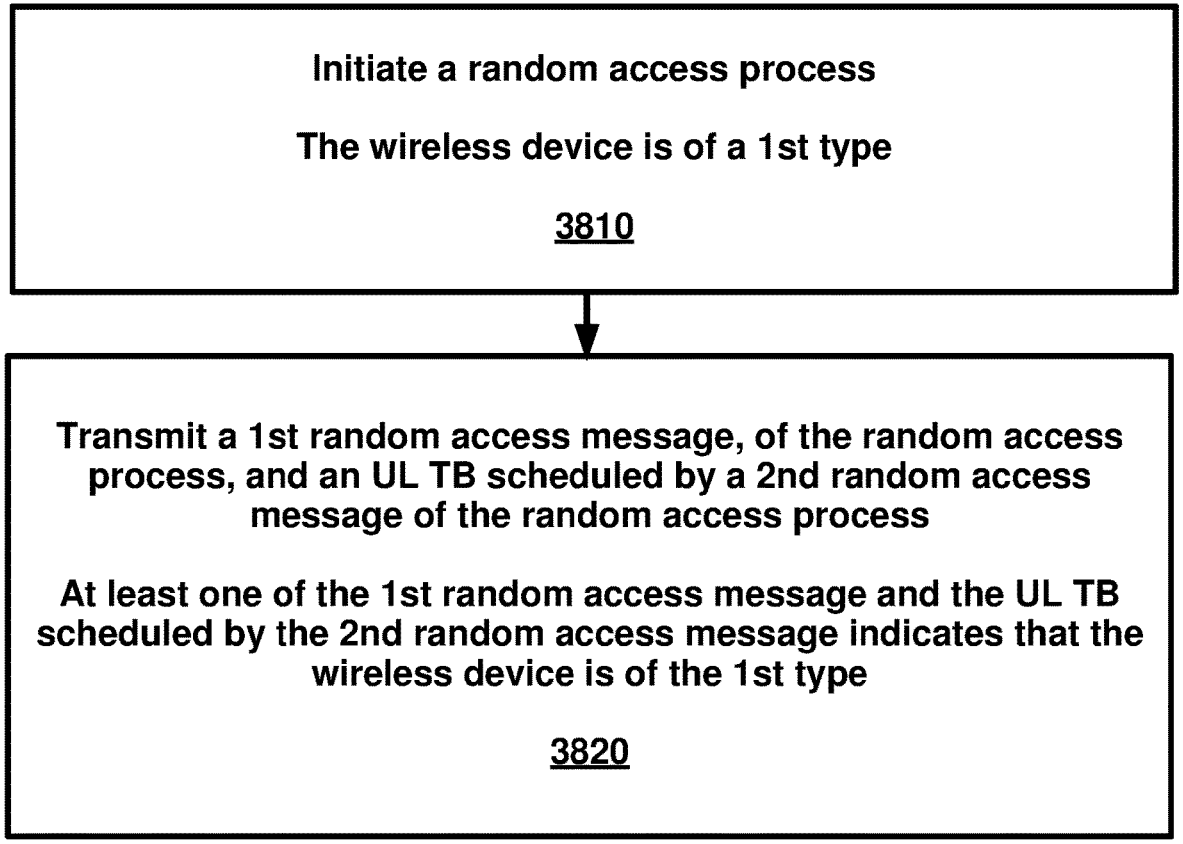
FIG. 38 shows an example flow diagram in accordance with several of various embodiments of the present disclosure.

FIG. 38 shows an example flow diagram in accordance with several of various embodiments of the present disclosure. At 3810, a wireless device may initiate a random access process. The wireless device may be of a first type. At 3820, the wireless device may transmit a first random access message, of the random access process, and a uplink transport block scheduled by a second random access message of the random access process. At least one of the first random access message and the uplink transport block scheduled by the second random access message may indicate that the wireless device is of the first type.

In an example embodiment, the first type may be a reduced capability wireless device.

In an example embodiment, the first random access message, of the random access process initiated at 3810, may be a message one (Msg1) in a four-step random access process. In an example embodiment, at least one of a random access preamble and a random access resource used for transmission of the random access preamble, of the random access process initiated at 3810, may indicate that the wireless device is of a the first type. In an example embodiment, the wireless device may receive a random access response based on the wireless device being allowed on a first cell. In an example embodiment, the random access response may comprise a radio network temporary identifier. A value of the radio network temporary identifier may be based on the wireless device being the first type wireless device.

In an example embodiment, the first random access message, initiated at 3810, may be a message three (Msg3) in a four-step random access process. In an example, the Msg3 may comprise an identity of the wireless device. The identity may indicate that the wireless device is of the first type. In an example embodiment, the wireless device may receive a control element indicating whether the wireless device is allowed or barred on a first cell. In an example embodiment, the control element may be a contention resolution control element. The contention resolution control element may comprise an identity of the wireless device indicating that the wireless device is allowed on the first cell.

In an example embodiment, the transport block, transmitted at 3820, may be used for transmission of a Msg3 of the random access process.

In an example embodiment, the wireless device may receive system information indicating a plurality of random access resources. The random access process, initiated at 3810, may comprise transmitting a first random access preamble via a first resource of the plurality of random access resources. In an example embodiment, the system information may indicate that a first plurality of random access resources, of the plurality of random access resources, are associated with the first type of wireless device. The first random access resource may be of the first plurality of random access resources.

In an example embodiment, the wireless device may receive system information indicating that a first plurality of random access preambles are associated with the first type of wireless device. The random access process, initiated at 3810, may comprise transmitting a first random access preamble of the first plurality of random access preambles.

In an example embodiment, the wireless device may receive system information indicating: a first control resource set (CORESET) for receiving scheduling information of a first system information block comprising first information for first type wireless devices; and a second CORESET for receiving scheduling information of a second system information block comprising second information for wireless devices that are not first type wireless devices. In an example embodiment, the system information may comprise a first information element indicating the first CORESET; and a second information element indicating the second CORESET. In an example embodiment, the system information may comprise an information element indicating the first CORESET and the second CORESET.

In an example embodiment, the wireless device may receive system information comprising: one or more first parameters for wireless devices of the first type; and one or more second parameters for wireless devices that are not of the first type. In an example embodiment, the one or more first parameters may indicate first random access parameters; and the one or more second parameters indicate second random access parameters. In an example embodiment, the first random access parameters indicate first random access resources or first random access preambles; and the second random access parameters indicate second random access resources or second random access preambles.

Various exemplary embodiments of the disclosed technology are presented as example implementations and/or practices of the disclosed technology. The exemplary embodiments disclosed herein are not intended to limit the scope. Persons of ordinary skill in the art will appreciate that various changes can be made to the disclosed embodiments without departure from the scope. After studying the exemplary embodiments of the disclosed technology, alternative aspects, features and/or embodiments will become apparent to one of ordinary skill in the art. Without departing from the scope, various elements or features from the exemplary embodiments may be combined to create additional embodiments. The exemplary embodiments are described with reference to the drawings. The figures and the flowcharts that demonstrate the benefits and/or functions of various aspects of the disclosed technology are presented for illustration purposes only. The disclosed technology can be flexibly configured and/or reconfigured such that one or more elements of the disclosed embodiments may be employed in alternative ways. For example, an element may be optionally used in some embodiments or the order of actions listed in a flowchart may be changed without departure from the scope.

An example embodiment of the disclosed technology may be configured to be performed when deemed necessary, for example, based on one or more conditions in a wireless device, a base station, a radio and/or core network configuration, a combination thereof and/or alike. For example, an example embodiment may be performed when the one or more conditions are met. Example one or more conditions may be one or more configurations of the wireless device and/or base station, traffic load and/or type, service type, battery power, a combination of thereof and/or alike. In some scenarios and based on the one or more conditions, one or more features of an example embodiment may be implemented selectively.

In this disclosure, the articles "a" and "an" used before a group of one or more words are to be understood as "at least one" or "one or more" of what the group of the one or more words indicate. The use of the term "may" before a phrase is to be understood as indicating that the phrase is an example of one of a plurality of useful alternatives that may be employed in an embodiment in this disclosure.

In this disclosure, an element may be described using the terms "comprises", "includes" or "consists of" in combination with a list of one or more components. Using the terms "comprises" or "includes" indicates that the one or more components are not an exhaustive list for the description of the element and do not exclude components other than the one or more components. Using the term "consists of" indicates that the one or more components is a complete list for description of the element. In this disclosure, the term "based on" is intended to mean "based at least in part on". The term "based on" is not intended to mean "based only on". In this disclosure, the term "and/or" used in a list of elements indicates any possible combination of the listed elements. For example, "X, Y, and/or Z" indicates X; Y; Z; X and Y; X and Z; Y and Z; or X, Y, and Z.

Some elements in this disclosure may be described by using the term "may" in combination with a plurality of features. For brevity and ease of description, this disclosure may not include all possible permutations of the plurality of features. By using the term "may" in combination with the plurality of features, it is to be understood that all permutations of the plurality of features are being disclosed. For example, by using the term "may" for description of an element with four possible features, the element is being described for all fifteen permutations of the four possible features. The fifteen permutations include one permutation with all four possible features, four permutations with any three features of the four possible features, six permutations with any two features of the four possible features and four permutations with any one feature of the four possible features.

Although mathematically a set may be an empty set, the term set used in this disclosure is a nonempty set. Set B is a subset of set A if every element of set B is in set A. Although mathematically a set has an empty subset, a subset of a set is to be interpreted as a non-empty subset in this disclosure. For example, for set A={subcarrier1, subcarrier2}, the subsets are {subcarrier1}, {subcarrier2} and {subcarrier1, subcarrier2}.

In this disclosure, the phrase "based on" may be used equally with "based at least on" and what follows "based on" or "based at least on" indicates an example of one of plurality of useful alternatives that may be used in an embodiment in this disclosure. The phrase "in response to" may be used equally with "in response at least to" and what follows "in response to" or "in response at least to" indicates an example of one of plurality of useful alternatives that may be used in an embodiment in this disclosure. The phrase "depending on" may be used equally with "depending at least on" and what follows "depending on" or "depending at least on" indicates an example of one of plurality of useful alternatives that may be used in an embodiment in this disclosure. The phrases "employing" and "using" and "employing at least" and "using at least" may be used equally in this in this disclosure and what follows "employing" or "using" or "employing at least" or "using at least" indicates an example of one of plurality of useful alternatives that may be used in an embodiment in this disclosure.

The example embodiments disclosed in this disclosure may be implemented using a modular architecture comprising a plurality of modules. A module may be defined in terms of one or more functions and may be connected to one or more other elements and/or modules. A module may be implemented in hardware, software, firmware, one or more biological elements (e.g., an organic computing device and/or a neurocomputer) and/or a combination thereof and/or alike. Example implementations of a module may be as software code configured to be executed by hardware and/or a modeling and simulation program that may be coupled with hardware. In an example, a module may be implemented using general-purpose or special-purpose processors, digital signal processors (DSPs), microprocessors, microcontrollers, application-specific integrated circuits (ASICs), programmable logic devices (PLDs) and/or alike. The hardware may be programmed using machine language, assembly language, high-level language (e.g., Python, FORTRAN, C, C++ or the like) and/or alike. In an example, the function of a module may be achieved by using a combination of the mentioned implementation methods.

What is claimed is:

1. A method comprising:
   receiving, by a wireless device, system information indicating one or more first random access parameters;
   initiating, by the wireless device and based on the one or more first random access parameters, a random access process comprising:
   transmitting a transport block comprising a radio resource control (RRC) setup request message, wherein:
   the RRC setup request message is associated with an identity;
   the identity indicates that the wireless device is a reduced capability wireless device; and
   the reduced capability wireless device is associated with reduced capabilities compared to a non-reduced capability wireless device.

2. The method of claim 1, wherein the reduced capabilities comprise one or more of:
   a reduced bandwidth;
   a reduced number of antennas;
   a half-duplex operation;
   a relaxed processing time; and
   a relaxed processing capability.

3. The method of claim 1, wherein the identity is based on a wireless device type.

4. The method of claim 1, wherein the one or more first random access parameters are for reduced capability wireless devices.

5. The method of claim 1, wherein the receiving the one or more first random access parameters is based on a system information block message.

6. The method of claim 1, further comprising receiving one or more second random access parameters that are for non-reduced capability wireless devices.

7. The method of claim 1, wherein the RRC setup request message is associated with a common control channel (CCCH) logical channel.

8. A wireless device comprising:
one or more processors; and
memory storing instructions that, when executed by the one or more processors, cause the wireless device to:
  receive system information indicating one or more first random access parameters;
  initiate, based on the one or more first random access parameters, a random access process comprising:
    transmitting a transport block comprising a radio resource control (RRC) setup request message, wherein:
      the RRC setup request message is associated with an identity;
      the identity indicates that the wireless device is a reduced capability wireless device; and
      the reduced capability wireless device is associated with reduced capabilities compared to a non-reduced capability wireless device.

9. The wireless device of claim 8, wherein the reduced capabilities comprise one or more of:
a reduced bandwidth;
a reduced number of antennas;
a half-duplex operation;
a relaxed processing time; and
a relaxed processing capability.

10. The wireless device of claim 8, wherein the identity is based on a wireless device type.

11. The wireless device of claim 8, wherein the one or more first random access parameters are for reduced capability wireless devices.

12. The wireless device of claim 8, wherein receiving the one or more first random access parameters is based on a system information block message.

13. The wireless device of claim 8, wherein the instructions, when executed by the one or more processors, further cause the wireless device to receive one or more second random access parameters that are for non-reduced capability wireless devices.

14. The wireless device of claim 8, wherein the RRC setup request message is associated with a common control channel (CCCH) logical channel.

15. A system comprising:
a base station; and
a wireless device comprising: one or more processors; and memory storing instructions that, when executed by the one or more processors, cause the wireless device to: receive, from the base station, system information indicating one or more first random access parameters; initiate, based on the one or more first random access parameters, a random access process comprising: transmitting a transport block comprising a radio resource control (RRC) setup request message, wherein: the RRC setup request message is associated with an identity; the identity indicates that the wireless device is a reduced capability wireless device; and the reduced capability wireless device is associated with reduced capabilities compared to a non-reduced capability wireless device.

16. The system of claim 15, wherein the reduced capabilities comprise one or more of:
a reduced bandwidth;
a reduced number of antennas;
a half-duplex operation;
a relaxed processing time; and
a relaxed processing capability.

17. The system of claim 15, wherein the identity is based on a wireless device type.

18. The system of claim 15, wherein the one or more first random access parameters are for reduced capability wireless devices.

19. The system of claim 15, wherein receiving the one or more first random access parameters is based on a system information block message.

20. The system of claim 15, wherein the RRC setup request message is associated with a common control channel (CCCH) logical channel.

* * * * *